(12) United States Patent
Yamaji et al.

(10) Patent No.: US 8,351,758 B2
(45) Date of Patent: Jan. 8, 2013

(54) PLAYBACK DEVICE, PLAYBACK METHOD AND PROGRAM

(75) Inventors: Osamu Yamaji, Osaka (JP); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 12/706,229

(22) Filed: Feb. 16, 2010

(65) Prior Publication Data

US 2010/0226628 A1 Sep. 9, 2010

Related U.S. Application Data

(60) Provisional application No. 61/153,697, filed on Feb. 19, 2009.

(30) Foreign Application Priority Data

Feb. 17, 2009 (JP) ................................ 2009-033573

(51) Int. Cl.
*H04N 13/04* (2006.01)
(52) U.S. Cl. .......................................... 386/201; 348/51
(58) Field of Classification Search ................... 386/353
See application file for complete search history.

(56) References Cited

U.S. PATENT DOCUMENTS

| | | | |
|---|---|---|---|
| 4,523,226 A * | 6/1985 | Lipton et al. ..................... 348/49 |
| 4,562,463 A * | 12/1985 | Lipton ............................ 348/56 |
| 5,612,735 A * | 3/1997 | Haskell et al. ................... 348/43 |
| 5,801,705 A | 9/1998 | Kato et al. |
| 6,111,598 A * | 8/2000 | Faris ................................ 348/57 |
| 6,188,442 B1 * | 2/2001 | Narayanaswami ............ 348/564 |
| 6,333,757 B1 * | 12/2001 | Faris ................................ 348/60 |
| 6,449,005 B1 * | 9/2002 | Faris ................................ 348/60 |
| 6,587,112 B1 * | 7/2003 | Goeltzenleuchter et al. .. 345/532 |
| 6,831,648 B2 * | 12/2004 | Mukherjee et al. ........... 345/504 |
| 7,002,618 B2 * | 2/2006 | Lipton et al. .................... 348/51 |
| 7,319,720 B2 * | 1/2008 | Abrams, Jr. .............. 375/240.12 |
| 8,004,558 B2 * | 8/2011 | Prechtl et al. ................... 348/48 |
| 2007/0097208 A1 | 5/2007 | Takemoto et al. |
| 2010/0021141 A1 | 1/2010 | Yamashita et al. |
| 2010/0021145 A1 | 1/2010 | Oashi et al. |
| 2010/0046747 A1 | 2/2010 | Oashi et al. |

FOREIGN PATENT DOCUMENTS

| | | |
|---|---|---|
| JP | 6-113340 | 4/1994 |
| JP | 9-139957 | 5/1997 |
| JP | 2000-102037 | 4/2000 |
| JP | 2002-073003 | 3/2002 |
| JP | 2004-356789 | 12/2004 |
| JP | 2006-244654 | 9/2006 |
| WO | 2009/157159 | 12/2009 |

OTHER PUBLICATIONS

Search report from P.C.T., mail date is Apr. 20, 2012.

* cited by examiner

*Primary Examiner* — Thai Tran
*Assistant Examiner* — Sitaramarao S Yechuri
(74) *Attorney, Agent, or Firm* — Greenblum & Bernstein, P.L.C.

(57) ABSTRACT

A playback time axis of a video stream is composed of a plurality of frame periods. To overlay a rendered image with a stereoscopic video image to be displayed in the i-th frame period, a process of writing to a left-view plan memory and a process of writing to a right-view plane memory both need to be completed before the start of the i-th frame period. To simultaneously request the two rendering processes, the argument of an application interface includes a pair of specifications, one specifying writing to the left-view plane memory and the other specifying writing to the right-view plane memory.

3 Claims, 35 Drawing Sheets

☐ ···Transparent pixel
   Expressed by RGB values describing transparent color
▨■ ···Colored pixel
   Expressed by RGB values describing non-transparent color

FIG. 8A java.awt.Graphics#fillRect

1st argument: Rendering position (x1, y1) (x2, y2)
2nd argument: Rendering color (R, G, B)

FIG. 8B java.awt.Graphics#drawImage

1st argument: Rendering position (x1, y1) (x2, y2)
2nd argument: Image to be rendered (Image1)

FIG. 8C

StereoGraphics#drawImage

1st argument: Rendering position on left image plane (x1, y1) (x2, y2)
2nd argument: Image to be rendered on left image plane (Image 1)
3rd argument: Rendering position on right image plane (x3, y3) (x4, y4)
4th argument: Image to be rendered on right image plane (Image 2)

FIG. 9A

| Type | Rectangle fill (java.awt.Graphics#fillRect) |
|---|---|
| Rendering position | x1=50, y1=100, x2=250, y2=170 |
| Rendering color | Red (R=255, G=0, B=0) |

FIG. 9B

| Type | Image copy (java.awt.Graphics#drawImage) |
|---|---|
| Rendering position | x1=50, y1=100, x2=250, y2=170 |
| Image to be rendered | Bitmap image 1 (W200, H70) |

FIG. 9C

| Type | Simultaneous L and R right image copy (StereoGraphics#drawImage) |
|---|---|
| Rendering position on left image plane | x1=50, y1=100, x2=250, y2=170 |
| Image to be rendered on left image plane | Bitmap image 1 (W200, H70) |
| Rendering position on right image plane | x3=55, y3=100, x4=255, y4=170 |
| Image to be rendered on right image plane | Bitmap image 2 (W200, H70) |

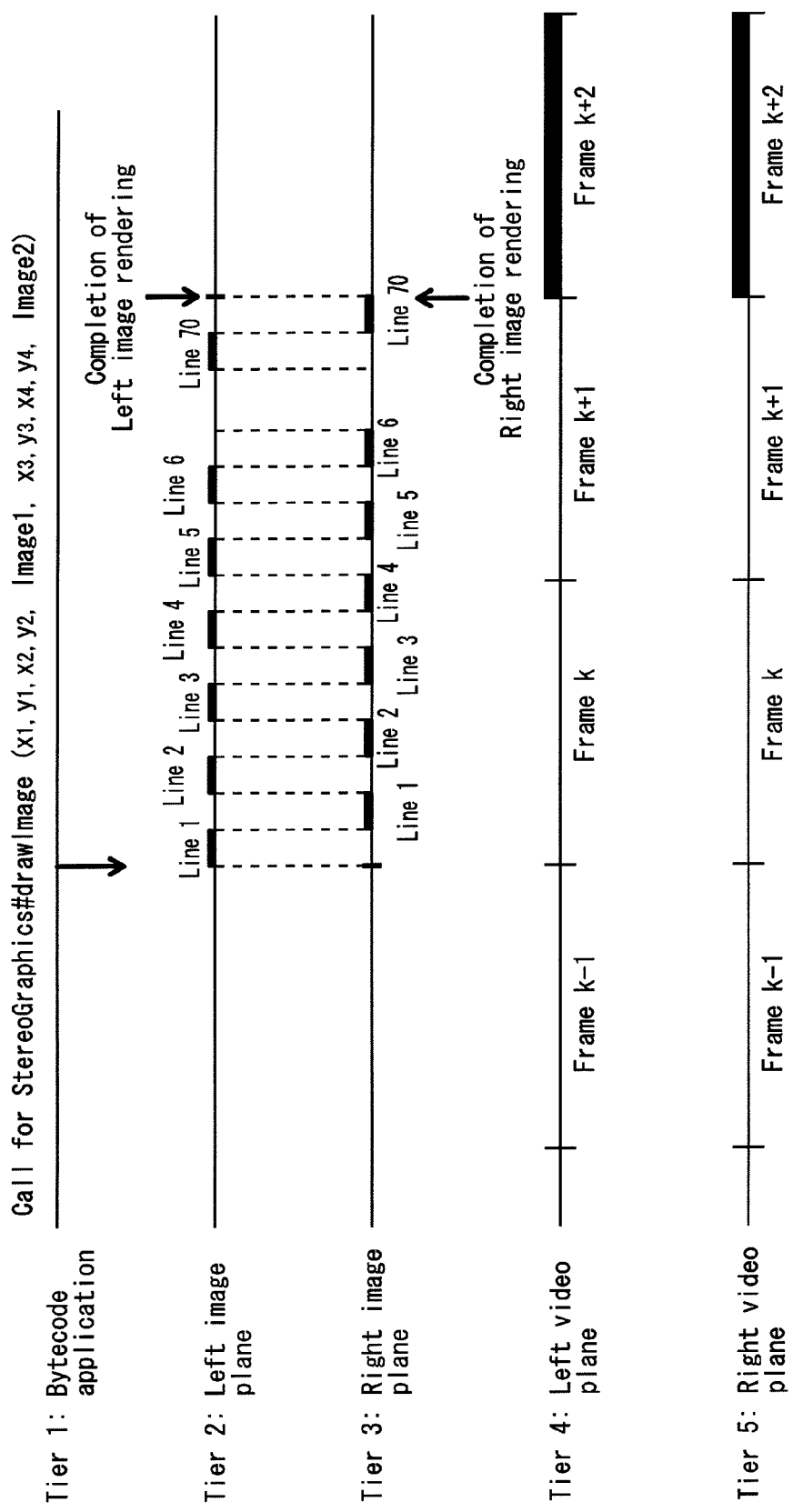

FIG. 30A

L-R simultaneous rendering request 903

| Type | L-R simultaneous image copy |
|---|---|
| Rendering position on left image plane | x1=50, y1=100, x2=250, y2=170 |
| Image to be rendered on left image plane | Bitmap image 1 (W200, H70) |
| Rendering position on right image plane | x1=55, y1=100, x2=255, y2=170 |
| Image to be rendered on right image plane | Bitmap image 1 (W200, H70) |

FIG. 30B 901

| Type | Image copy (java.awt.Graphics#drawImage) |
|---|---|
| Rendering plane | Left image plane |
| Rendering position | x1=50, y1=100, x2=250, y2=170 |
| Image to be rendered | Bitmap image 1 (W200, H70) |

FIG. 30C 902

| Type | Image copy (java.awt.Graphics#drawImage) |
|---|---|
| Rendering plane | Right image plane |
| Rendering position | x1=55, y1=100, x2=255, y2=170 |
| Image to be rendered | Bitmap image 1 (W200, H70) |

FIG. 30D

Rendering request (display update) 904

| Type | display update (java.awt.Toolkit#sync) |
|---|---|

FIG. 34A

1401  Rendering request (image copy)

| Type | Image copy (java.awt.Graphics#drawImage) |
|---|---|
| Rendering plane | Image plane (top-and-bottom configuration) |
| Rendering position | x1=200, y1=300, x2=1200, y2=1800 |
| Image to be rendered | Bitmap image 1 (W1000, H1500) |

FIG. 34B

1402  L-R simultaneous rendering request (L-R simultaneous image copy)

| Type | L-R simultaneous image copy | |
|---|---|---|
| Rendering position on left image plane | x1=200, y1=300, x2=1200, y2=1080 | Copying of image part cropped to coincide with left image plane |
| Image to be rendered on left image plane | Rectangle region (x1=0, y1=0, x2=1000, y2=780) of bitmap image 1 (W1000, H1500) | |
| Rendering position on right image plane | x1=200, y1=0, x2=1200, y2=720 | Copying of image part cropped to coincide with right image plane |
| Image to be rendered on right image plane | Rectangle region (x1=0, y1=780, x2=1000, y2=1500) of bitmap image 1 (W1000, H1500) | |

PLAYBACK DEVICE, PLAYBACK METHOD AND PROGRAM

BACKGROUND OF THE INVENTION (1) Field of the Invention

The present invention relates to the technical field of stereoscopic playback.

(2) Description of the Related Art

Stereoscopic playback refers to a technique of realizing stereoscopic viewing with the use of a pair of videos as seen from different view points, one of which is for right view and the other for left view. While stereoscopic display can be realized by various methods, the basic principles are to present different display images to the left eye and the right eye of a viewer in a manner to exploit the parallax between the eyes to create an optical illusion of stereoscopic images.

In one exemplary method, stereoscopic display is realized with the use of a pair of shutter glasses. According to this method, video images presented on the display device for right eye and left eye are alternately updated at high speed. The shutter glasses are controlled to alternately block the view of the right eye and left eye of the viewer, in synchronism with the timing of updating the video images. In this way, it is achieved that each image presented for the left eye is perceived only by the left eye, where as each image presented for right eye is perceived only by the right eye.

Currently, the main applications of stereoscopic playback of video streams are found in the use for movie theaters, for example. In the future, however, it is expected that stereoscopic playback of video streams is increasingly enjoyed with the use of consumer playback devices.

Especially to be noted is that packaged media such as BD-ROM and the like includes, in addition to video images, background images, subtitles, and rendered images to be presented on separate planes. Thus, a display device can display composite video images created by overlaying a plurality of planes. By presenting the background images, subtitles, and rendered images in a manner to realize stereoscopic viewing, highly interactive stereoscopic playback is realized. In addition, the adopted method ensures that video images and subtitles are synchronized on a frame-by-frame basis with the video output signal of the playback device, so that clear dynamic images are played back without flickering.

Citation List

Patent Document

Patent Document 1: Japanese Patent Application Publication No. 9-139957

Patent Document 2: Japanese Patent Application Publication No. 2000-102037

SUMMARY OF THE INVENTION

Problems to be Solved by the Invention

It is desired to activate an application during playback of a stereoscopic content, so that GUI is rendered by the application in synchronism with video playback. In this way, user operations during playback of a stereoscopic content can be made with ease. Such a need arises in view of existing BD-ROM contents implementing highly sophisticated processing in which an application executes in synchronism with playback of a BD-ROM content to render GUI. Content creators desire to realize similar processing for a stereoscopic content.

Rendering by an application involves generation of a bitmap pattern and writing of the bitmap pattern pixel by pixel to the right or left plane memory. By repeating the rendering process, a visual effect of animation is presented to the viewer when a menu is opened. Yet, the frame period for displaying a rendered image may be reached before all the pixels are written. In such a case, an incomplete image is displayed. The arrival of a frame period before all the pixels are written will give a rise to a problem called "tearing" in which an image still being written is displayed and thus screen flickers.

In monoscopic playback, tearing may fall within acceptable limits to the viewers. In stereoscopic playback, however, tearing will be seriously annoying to the viewers. More specifically, part of the displayed image where rendering of both the left and right plane memories is completed produces stereoscopic viewing effect, where as part of the displayed image where rendering is incomplete results in tearing so that no stereoscopic viewing is produced. In addition, different images are presented to the left and right eyes of the viewer, which never occurs in real life. For example, suppose that rendering of an image of a menu to be presented to the left eye is completed, where as an image of the menu to be presented to the right eye is incomplete regarding the lower half thereof. When the two images of the menu are presented to the respective eyes in stereoscopic playback, the left and right eyes view inconsistent images regarding the lower half of the menu, which causes visual discomfort to the viewer.

In stereoscopic playback, tearing is more problematic because inconsistency between the left and right images is more noticeable to the viewer. Without a reliable measure to prevent such inconsistency, it is difficult to commercialize playback devices for executing stereoscopic playback. One possible way to address the technical difficulty is to completely parallelize the respective writing processes to the left and right image planes. However, at the time of developing a player model of playback devices, it is not desirable that the writing to the respective image planes is required to be performed through completely parallel processing. Such a requirement decreases flexibility in implementation of playback devices. In addition, such a requirement is not desirable in terms of cost competitiveness as it leaves little room for hardware simplification.

Accordingly, an object of the present invention is to provide, without limiting the implementation flexibility, a playback device configured to minimize the occurrence of inconsistency between left and right images, which results from tearing.

Means for Solving the Problems

In order to achieve the object stated above, one aspect of the present invention provides a playback device including: a playback unit operable to decode a video stream stored on a recording medium to execute stereoscopic playback of the video stream; a platform unit operable to activate an application program; a plurality of plane memories; and a rendering unit operable to write images into the plane memories in response to a call for an application program interface from the application. One of the plane memories is a left-view plane memory and another is a right-view plane memory. An argument of the call for the application program interface includes a pair of specifications, one specifying writing to the left-view plane memory and the other specifying writing to the right-view plane memory.

Advantageous Effect of the Invention

At the time when an application program interface is called, the present invention is arranged to ensue that a pair of write specifications, one for the left-view plane memory and the other for the right-view plane memory, is passed from a bytecode application. With this arrangement, the playback device is implemented to alternately perform a process of writing pixels to the right-view plane memory and a process of writing pixels to the left-view plane memory. With this implementation, even if a frame period is reached before the pixel writing for the frame is completed, the respective writing processes for the left-view and right-view plane memories have progressed to about the same extent. That is, even if tearing occurs, the levels of tearing occurred in the left and right images are about the same. That is, inconsistency between the images presented to the right eye and to the left eye is avoided or kept to an extent within a range not annoying to the viewer.

Further, the playback device may be implemented to complete writing of one of the left and right image planes first and then start writing the other image plane. Even with this implementation, the arrangement of the present invention ensures to avoid delay resulting from not timely receiving necessary parameters from an application. Thus, the chances are increased that the writing of both the left and right image planes for a specific frame period is completed before the arrival of the frame period.

As above, the playback device may alternately perform the writing of the respective image planes line by line or perform the writing of the left image plane first and then the right image plane. In either case, the probability of occurrence of inconsistency between the respective images presented to the left and right eyes is reduced. That is, the playback device minimizes the risk of inconsistency between the left and right images that would occur due to tearing, without limiting the implementation flexibility.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 8A, 8B and 8C show application program interfaces each used for writing of a rendered image;

FIGS. 9A, 9B and 9C show specific examples of rendering requests that can be defined with application program interfaces shown in FIGS. 8A, 8B and 8C;

FIG. 13 shows how the writing processes to the left and right image planes are performed;

FIGS. 30A, 30B and 30C are views showing an L-R simultaneous rendering request C and rendering requests A and B;

FIGS. 34A and 34B show a rendering request and an L-R simultaneous rendering request.

DESCRIPTION OF THE PREFERRED EMBODIMENTS

The following describes embodiments of a recording medium and a playback device having the above-described means for solving the problems, with reference to the drawings.

Figure 1:
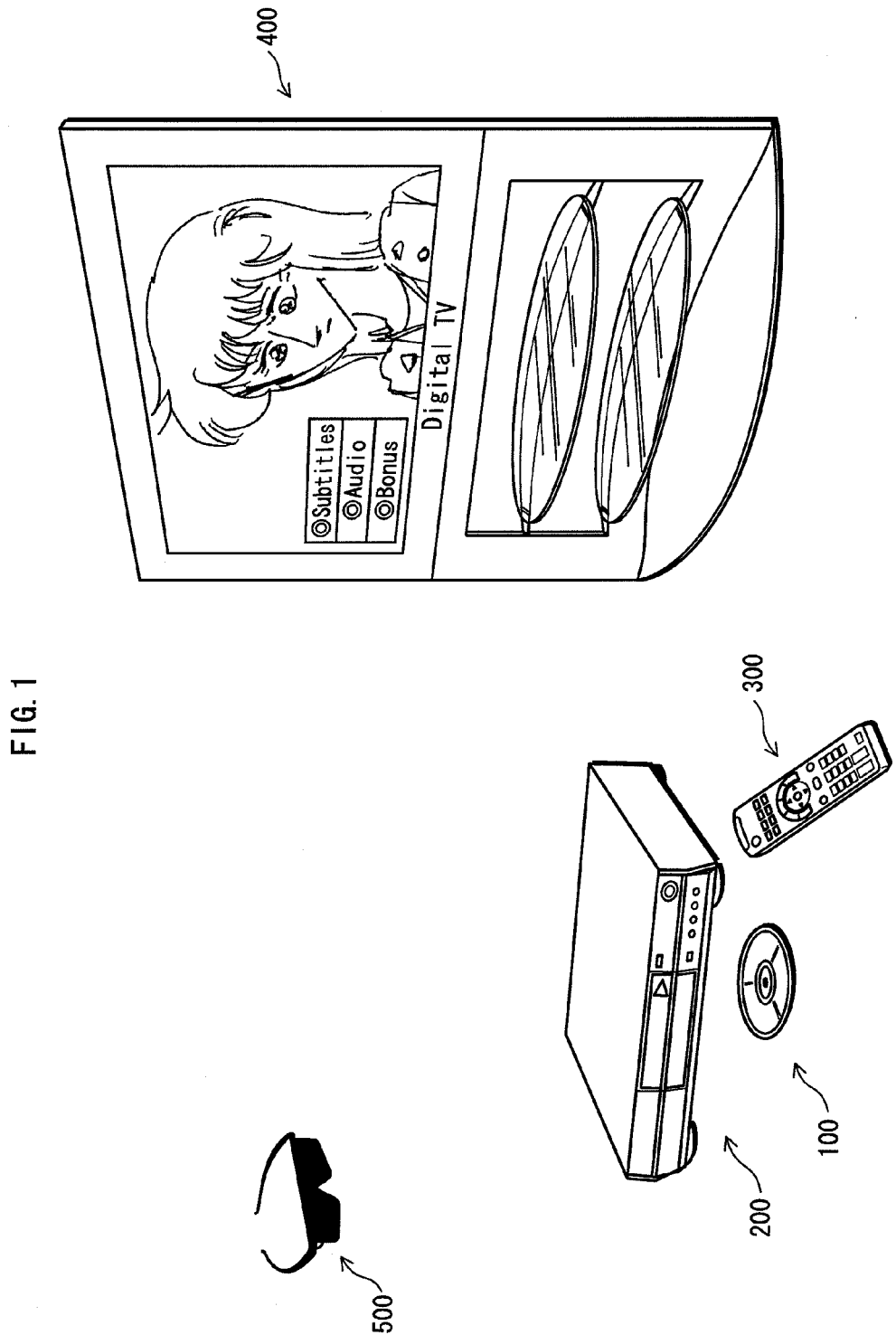
FIG. 1 shows one example of the usage pattern of a playback device.

FIG. 1 shows one example of the usage pattern of such a recording medium and such a playback device. As shown in the figure, a recording medium 100 and a playback device 200 constitute a home theater system, together with a remote controller 300, a television set 400, and a pair of shutter glasses 500. The home theater system is provided for use by a user.

The recording medium 100 supplies, for example, a movie to the home theater system.

The playback device 200 is connected to the television set 400 and plays back the recording medium 100. The playback is executed by alternately outputting video images for left eye (L-images) and video images for right eye (R-images). Videos playable by the playback device 200 in this manner include 2D videos and 3D videos. A 2D video is composed of images expressed by pixels defined on the assumption that a plane containing, for example, the screen of display device is an X-Y plane. 2D video images may be also referred to as monoscopic images.

In contrast, a 3D video is composed images expressed by pixels defined on the assumption that a straight line orthogonal to the X-Y plane mentioned above is the axis (in the present embodiment, the straight line orthogonal to the X-Y plane is defined as the axis (Z axis)). In addition, the locations of the pixels describing each image on the X-Y plane are determined in a manner given below in the present embodiment. By virtue of this configuration, a 3D video is stereoscopically perceived as being closer or further back than the screen.

The remote controller 300 is a device for receiving user operations made on hierarchically organized GUI. In order to receive such user operations, the remote controller 300 is provided with various keys including a menu key for calling a menu constituting GUI, an arrow key for moving a focus among GUI components constituting the menu, an enter key for activating the GUI component currently focused, and a return key for going back to a superordinate page of the hierarchically organized menu, and numeric keys.

The display device 400 receives video output from the playback device 200 and alternately outputs L-images and R-images with the same timing. The respective timings are brought into agreement by setting the frame rate at which video images are output to be equal to the frame rate at which display is switched. Alternatively, the frame rate at which display is switched may be multiplied in order to reduce the burden imposed on the viewer's eyes. In this case, the display device 400 accumulates a pair of L-image and R-image that are output in a row and switches the accumulated images at high speed. As a result, display is executed at high frame rate. The following description is given on the precondition that a pair of an L-image and an R-image output in the stated order is processed as a set by the display device. However, it should be naturally appreciated that the output order of L- and R-images may be reversed without any change to the configuration.

The shutter glasses 500 are composed of liquid crystal shutters and a control unit and enables the user to realize stereoscopic viewing by using binocular parallax. The liquid crystal shutters of the shutter glasses 500 are made with liquid crystal lenses having the property that the optical transmittance varies with the voltage applied thereto. The control unit of the shutter glasses 500 receives from the playback device a synchronous signal indicating the switching between the output of R- and L-images and switches between the first and second states according to the synchronous signal.

In the first state, the application voltage is controlled so that the liquid crystal lens for the right eye becomes non-transparent and that the liquid crystal lenses for left eye becomes transparent. In this state, an L-image is perceived by the left eye but not by the right eye.

In the second state, the application voltage is controlled so that the liquid crystal lens for the right eye becomes transparent and that the liquid crystal lens for the left eye become non-transparent. In this state, an R-image is perceived by the right eye but not by the left eye.

In general, an R-image and an L-image in a stereo pair represent the right view and left view in such a manner that the same object appears slightly differently due to the difference between positions at which the respective images are captured.

By making an adjustment such that the apparent difference corresponds to the difference as perceived by the left and right eyes (i.e., corresponds to the binocular parallax), the human perception system creates an illusion of a stereoscopic image. Accordingly, the shutter glasses 500 are controlled to switch between the first state and the second stat in synchronism with the switching between R-image output and L-image output, the viewer creates an illusion of depth in an monoscopic image (i.e., flat image). The following now describes the time interval at which R- and L-images are displayed.

More specifically, when monoscopically displayed, each pair of an R-image and an L-image are slightly different from each other and the difference t corresponds to the human parallax. By sequentially presenting such images alternately at short intervals, the human visual system perceives the images stereoscopically. The duration of this time interval should be short enough for the human visual system to create an optical illusion that a three-dimensional (i.e., stereoscopic) image is displayed. In the present embodiment, each frame period, which is a display cycle used by the television set 400 when playing back a video stream is divided into two. The halves of each frame period are allocated one to an R-image and the other to an L-image, so that the R- and L-images are alternated at the time intervals each having a duration corresponding to half a frame period. A half a frame period allocated for displaying an image to the left eye is referred to as a "left-view period", where as a half a frame period allocated for displaying an image to the right eye is referred to as a "right-view period". When one frame period is equal to $\frac{1}{24}$ second, then the left-view period and the right-view period are each equal to $\frac{1}{48}$ second. When one frame period is equal to $\frac{1}{60}$ second, then the left-view period and the right-view period are each equal to $\frac{1}{120}$ second.

(First Embodiment)

Figure 2:
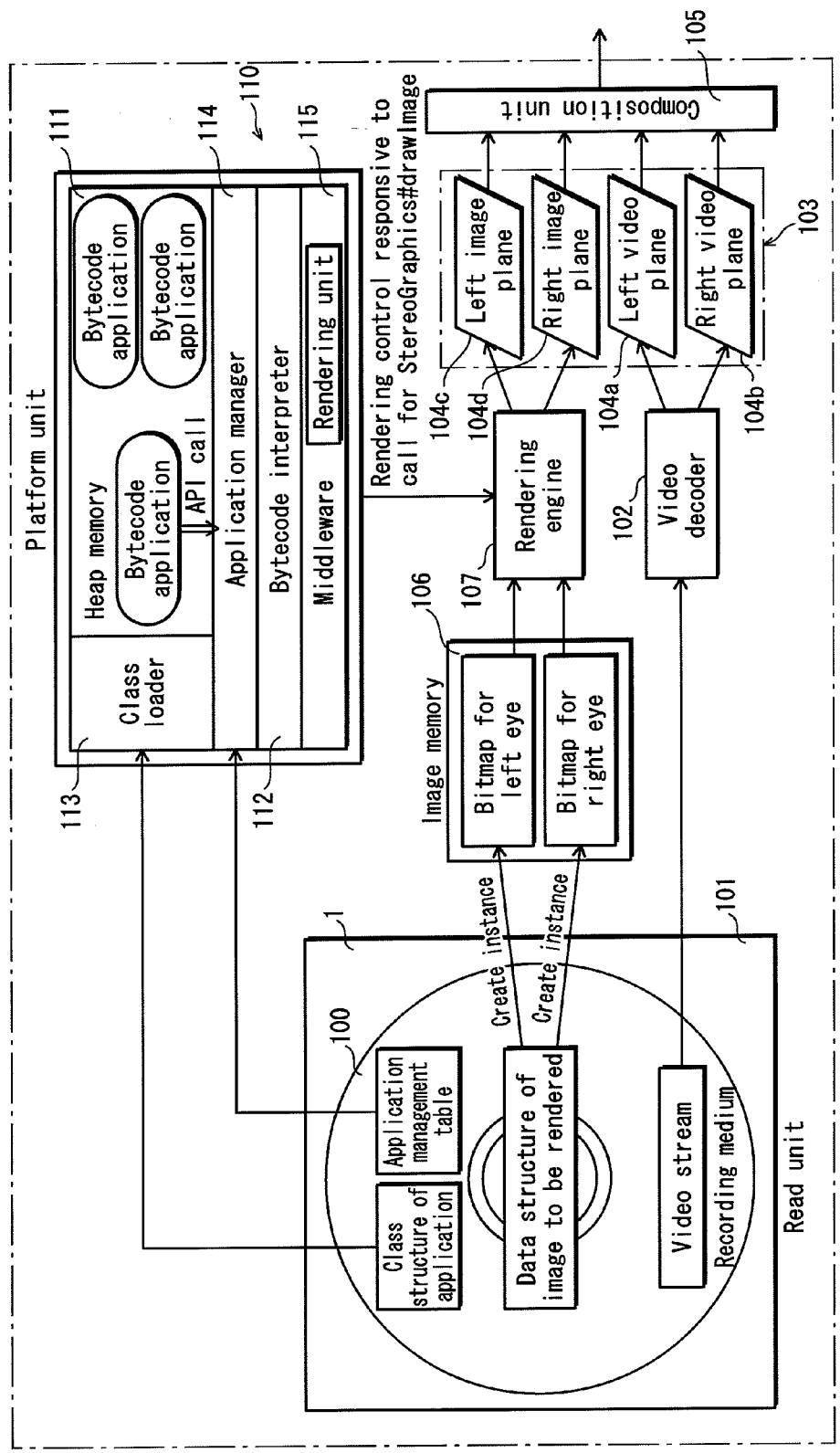
FIG. 2 shows the basic internal structure of the playback device having the means for solving the problem.

From among a plurality of embodiments of a playback device having the above-described means for solving the problems, the following describes an embodiment of a playback device which employs image planes each composed of a single buffer. FIG. 2 shows the basic internal structure of the playback device. As shown in the figure, a playback device 200 includes a read unit 101, a video decoder 102, a plane memory set 103 (which includes video planes 104a and 104b and image planes 104c and 104d), a composition unit 105, an image memory 106, a rendering engine 107, a platform unit 110, a heap memory 111, a bytecode interpreter 112, a class loader 113, an application manager 114, and middleware 115.

The read unit 101 reads, from the recording medium 100, a video stream, data structures of images to be rendered, class structures of bytecode applications and an application management table. The read video stream is supplied to the video decoder 102.

The video decoder 102 decodes the read video stream into uncompressed pictures and writes the uncompressed pictures into the plane memory set 103.

The plane memory set 103 includes a plurality of plane memories. A plane memory is used to store pieces of pixel data together describing a full-screen image on a line-by-line basis and to output the pieces of pixel data according to horizontal and vertical synchronous signals. The individual plane memories are used to store a full-screen image of one of video, subtitles, GUI, and background image obtained as a result of decoding.

These plane memories are organized in a layer model and the data stored in the individual plane memories is used for layer composition. The layer composition is done by overlaying, for all combinations, two plane memories of different hierarchical levels in the layer model, by superimposing corresponding pixel values stored in the two plane memories.

The left video plane 104a and the right video plane 104b are included in the plane memory set and used to store a video picture for left eye and a video picture for right eye, respectively.

The left image plane 104c and the right image plane 104d are included in the plane memory set and each used to store an uncompressed image to be overlaid with the picture stored on a corresponding one of the video planes. The left image plane 104c is a left-view plane memory used to store image data to be presented to the left eye. The right image plane 104d is a right-view plane memory used to store image data to be presented to the right eye. In the present embodiment, each of the left and right image planes is composed of a single buffer. Thus, the screen display presented by each image plane is updated by overwriting a rendered image currently stored on each image plane with a new image. Since, the image on each buffer and displayed immediately previously is directly overwritten with a new image to be subsequently displayed, during the time the overwriting process is still in progress, tearing occurs in which a mixture of the previously displayed image and the new image appears on the screen.

The composition unit 105 performs layer composition of the plurality of plane memories.

The image memory 106 is memory used to store an image object, which is created as an instance of a data structure stored on the recording medium 100. Such an image object is a bitmap image represented by RGB values. A bytecode application specifies a bitmap image with the use of an instance variable. In the 3D mode, the image memory 106 separately stores an image object for right eye and an image object for left eye.

The rendering engine 107 performs a rendering process of the left image plane 104c and of the right image plane 104d. The image rendering by the rendering engine 107 is done by copying am image object stored in the image memory 106 to the image planes 104c and 104d. The image object to be copied is specified with the use of an instance variable.

The platform unit 110 is composed of: a built-in program stored on non-volatile memory, such as ROM; and hardware components (including MPU, registers, and peripheral circuits) that execute the built-in program. The platform unit 110 runs a bytecode application, which is an instance of a class structure stored on the recording medium 100. Note that a bytecode application refers to an executable program obtained by compiling a class structure written in an object-oriented programming language. The bytecode application is described in machine-independent code (bytecode). One typical example of a bytecode application is a Java application.

The heap memory 111 is a stack area used for storing bytecode describing a bytecode application and system parameters used by the bytecode application. A bytecode application that executes on the heap memory 111 renders images at variable frame rates, such as $\frac{1}{30}$ second, $\frac{1}{15}$ second, and $\frac{1}{5}$ second. These frame rates are not integral multiple of the frame rates of video playback, such as $\frac{1}{24}$ seconds and $\frac{1}{60}$ seconds. Thus, the bytecode application detects the rendering timing using the clock of the playback device and performs the writing at the rendering timing.

The bytecode interpreter 112 converts a bytecode application stored on the heap memory 111 into native code and causes an MPU to execute the converted native code.

The class loader 113 creates, in the heap memory 111, an instance from a class structure of an application stored in the recording medium 100. In this way, the bytecode application is loaded.

The application manager 114 executes application signaling for activating and terminating a bytecode application, after verifying the authenticity of the bytecode application based on the application management table.

The middleware 115 is an operating system for built-in devices that provide various functions to the bytecode application executing on the platform unit. A function is provided by calling a member function of a package implemented by the middleware. The package implemented by the middleware includes a library of programs used for rendering processes on the left image plane 104c and the right image plane 104d by the rendering engine 107. Examples of the rendering processes include drawing of graphical objects such as lines and rectangles with a specified color, filling of a specified area, and copying and pasting of a specified image. The middleware 115 is provided with a rendering unit that executes image rendering using the functions included in the library. The bytecode application successively issues requests for appropriate rendering processes to realize various processes of rendering graphics. One example of the package is java.awt and application program interfaces for image rendering are methods of the java.awt package. In addition, extension methods, which are methods not provided by the java.awt package, are usable as APIs for image rendering. Examples of image rendering processes include drawing of lines and rectangles, filling of a specified area, copying and pasting of a specified image. The respective image rendering processes are identified by information specifying the type of a image rendering process.

In the present embodiment, the following is assumed. That is, to render a full-screen image on an image plane performed in response to a request from a bytecode application, the middleware requires execution cycles that correspond to n frames. This duration of n frames is equal to the turn-around time taken between an API call by the bytecode application and a response by the middleware. The turn-around time involves overhead between the platform unit-middleware-hardware. Generally with Java application implementation, a rendering instruction is issued immediately upon the need arises (in Frame k, for example) and the rendered image is displayed with a delay corresponding to a predetermined number of frames after the issuance of the instruction. Typically, Java applications are not aware of such delay in display.

Accordingly, the rendering to both the left and right image planes always involves the delay time corresponding to 2×n frames. For example, in order to display rendered images of a stereo pair in Frame k, the issuance of a StereoGraphics#drawImage method in Frame k results in the display of the rendered image with the delay corresponding to "2×n frames" from Frame k.

The following describes with more details the processes performed by the above components, with reference to the drawings.

Figure 3:
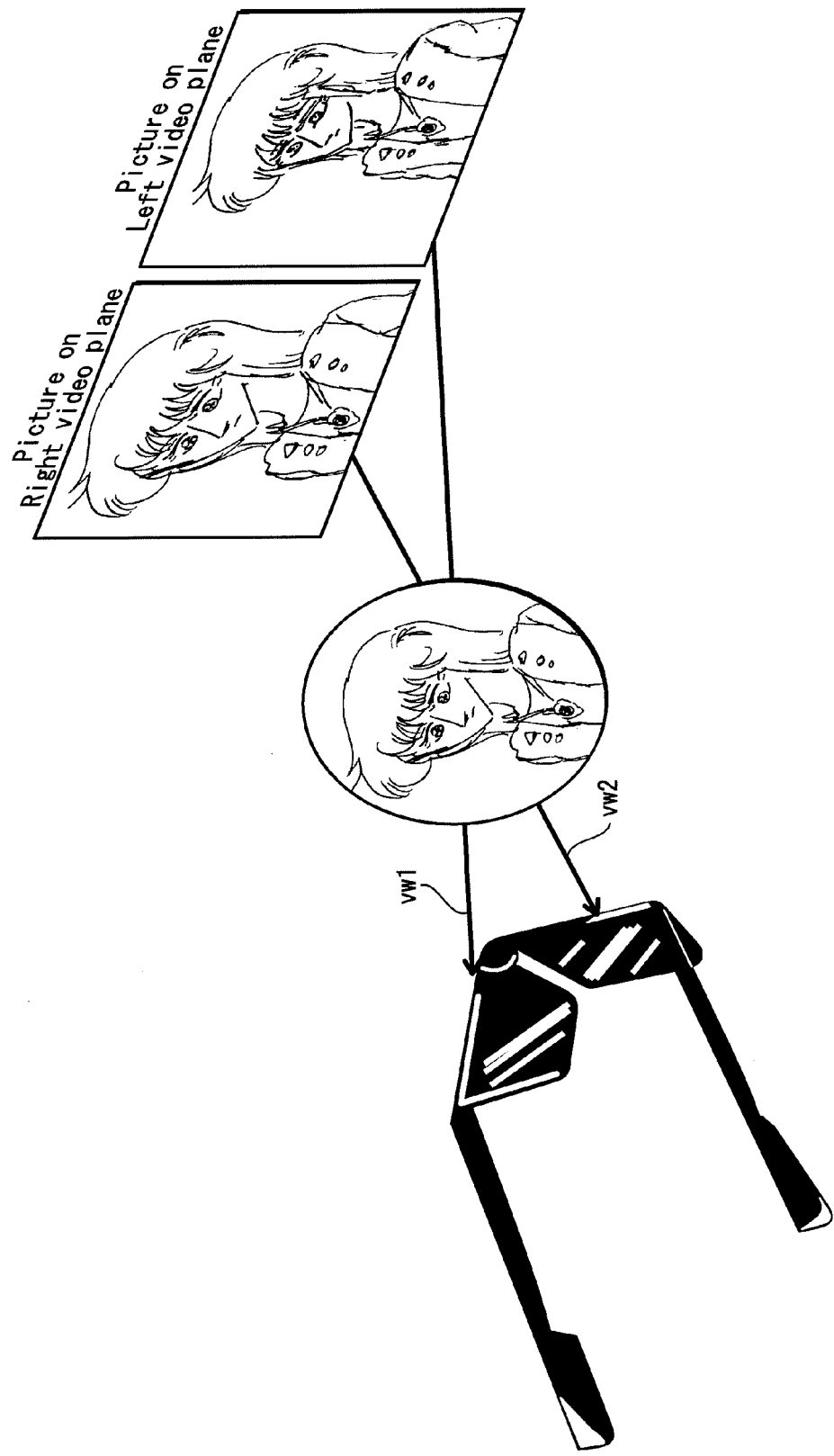
FIG. 3 illustrates how picture data stored on video planes 104a and 104b is perceived by a user wearing shutter glasses 500.

FIG. 3 illustrates how picture data stored on the video planes 104a and 104b is perceived by a user wearing the shutter glasses 500.

In the figure, an arrow vw1 indicates that the video image enters the user's viewpoint during a left-view period, whereas arrow vw2 indicates that the video image enters the user's viewpoint during a right-view period. As indicated by the arrow vw1, during the left-view period, the image stored on the left video plane enters the user's left eye through a corresponding one of the shutter glasses 500. Similarly, during the right-view period, as indicated by the arrow vw2, the image stored on the right video plane enters the user's right eye through a corresponding one of the shutter glasses 500.

Figure 4A:
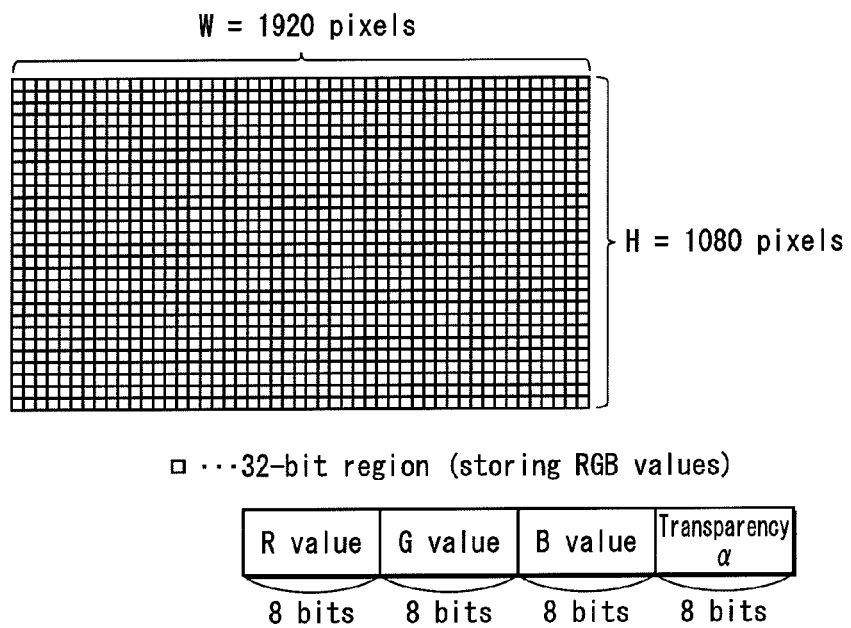
FIGS. 4A and 4B show the internal structures of the image planes 104c and 104d.
Figure 4B:
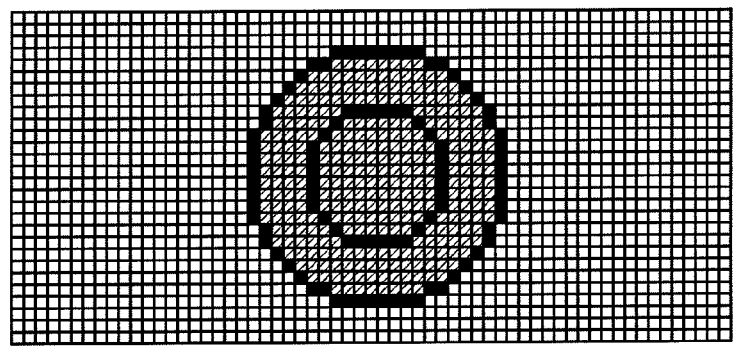

FIGS. 4A and 4B show the internal structures of the image planes 104c and 104d. As shown in FIG. 4A, when the resolution is set to 1920×1080, each of the image planes 104c and 104d is composed of 1920×1080 32-bit storage elements. This means that the image planes 104c and 104d has memory allocation enough to store a 32-bit R-G-B-a value per pixel at 1920×1080 resolution. Each 32-bit R-G-B-a value stored in a storage element is composed of an 8-bit R value, an 8-bit G value, an 8-bit B value and an 8-bit a (transparency) value. A memory plane capable of for storing a full-screen image has a capacity of 8 Mbytes. Thus, in order to implement double buffering for each of the left and right plane memories, the required memory size amounts to 8 Mbytes×4. In addition, double buffering requires transfer between the pair of buffers at the time of switching displayed images, which means that transfer of 8 Mbytes data frequently takes place, so that a wide memory bandwidth needs to be secured. In view of the above, each image plane according to the present embodiment is composed of a single buffer.

FIG. 4B shows pixel data stored on the image planes 104c and 104d. As shown in the figure, the graphics data stored on each of the image planes 104c and 104d consists of pixel data corresponding to the foreground and pixel data corresponding to the background. An a value representing a transparent color is stored in the storage elements corresponding to the background. When overlaid with the video plane, the video image on the video plane can be seen through the transparent background image. On the other hand, R, G and B pixel values representing colors other than a transparent color are stored in the storage elements corresponding to the foreground, and the images are rendered by these R, G and B values.

As a result of plane composition by the composition unit 105, the contents stored on a different plane is seen through the part corresponding to transparent pixels. The existence of such a transparent part makes plane composition possible.

Figure 5A:
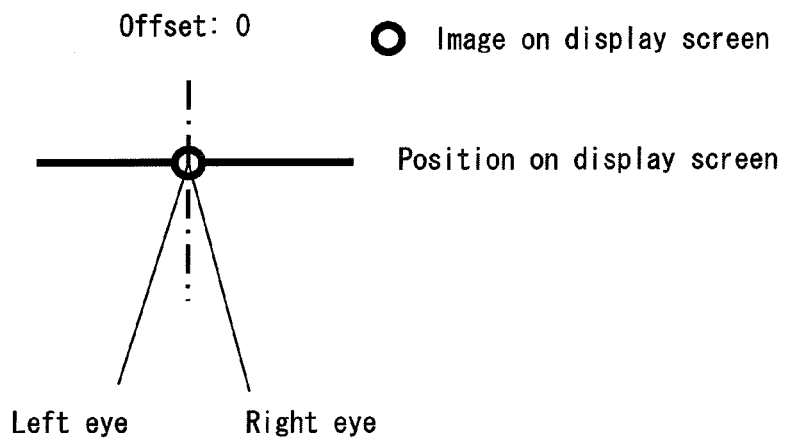
FIGS. 5A, 5B and 5C are views for explaining the principles in which an image appears closer than the display screen when the plane offset code is positive (when a graphics image is shifted to the right in the left-view period, and a graphics image is shifted to the left in the right-view period)
Figure 5B:
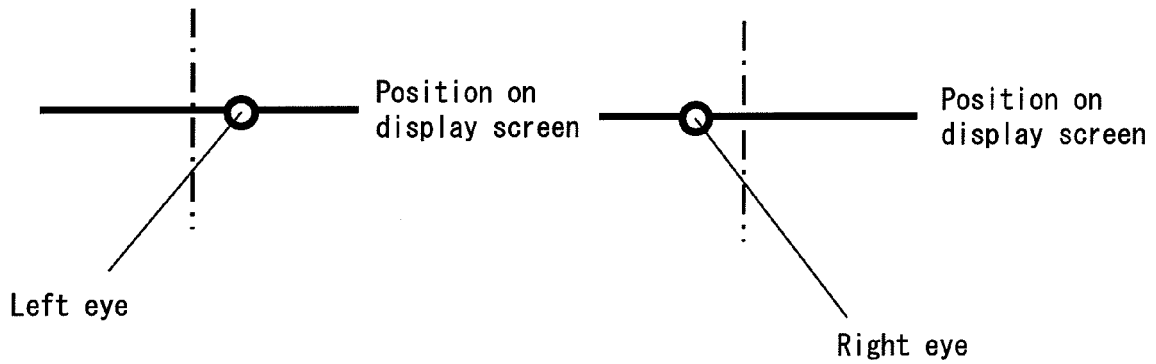
Figure 5C:
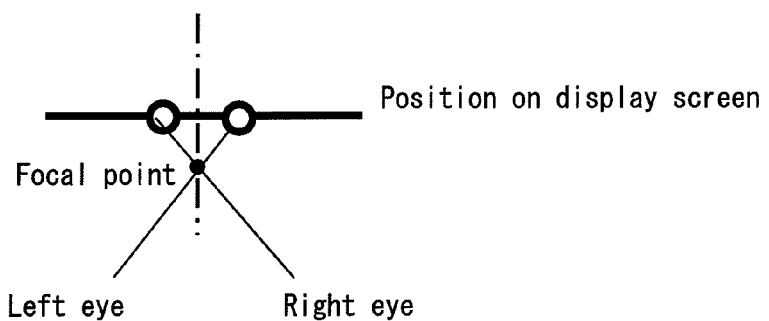

FIGS. 5A, 5B and 5C are views for explaining the principles in which an image appears closer than the display screen when the plane offset code is positive (when a graphics image is shifted to the right in the left-view period, and a graphics image is shifted to the left in the right-view period).

In each of FIGS. 5A, 5B and 5C, a circle indicates an image displayed on the display screen. First, in the 2D mode, the image seen by the right eye and by the left eye is in the same position. Therefore, when the image is viewed by both eyes, the position of focus is located on the display screen (FIG. 5A).

On the other hand, in the left-view period of the 3D mode, the image seen by the left eye is seen at a position shifted to the right of the zero-offset position. At this time, the liquid crystal shutter glasses block the right eye from seeing anything. Conversely, the image seen by the right eye is seen at a position shifted to the left of the zero-offset position. At this time, the liquid crystal shutter glasses block the left eye from seeing anything (FIG. 5B).

People focus their vision using both eyes and perceive an image as being located at the position of focus. Accordingly, by alternately switching over a short time interval, via the liquid crystal shutter glasses 500, between a state in which an image is visible only to the left eye and a state in which an image is visible only to the right eye, a person's eyes focus on a position closer than the display screen. As a result, the person perceives an image as being located at the position of focus, i.e. closer than the display screen (FIG. 5C).

Figure 6A:
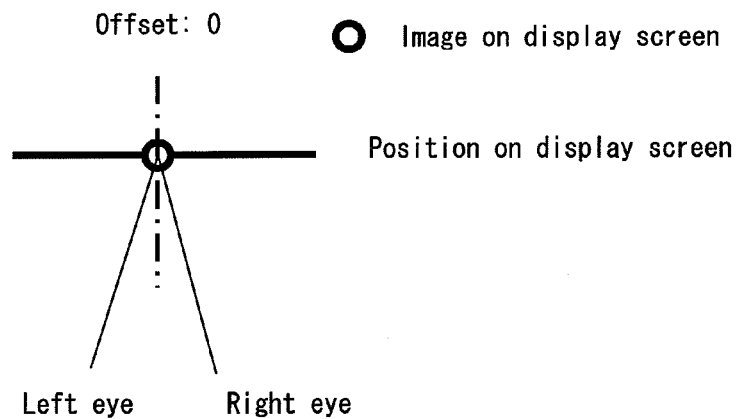
FIGS. 6A, 6B and 6C are views for explaining the principles in which an image appears further back than the display screen.
Figure 6B:
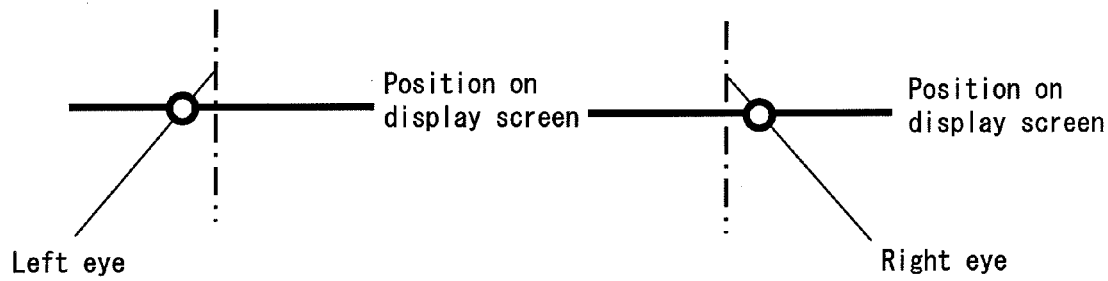
Figure 6C:
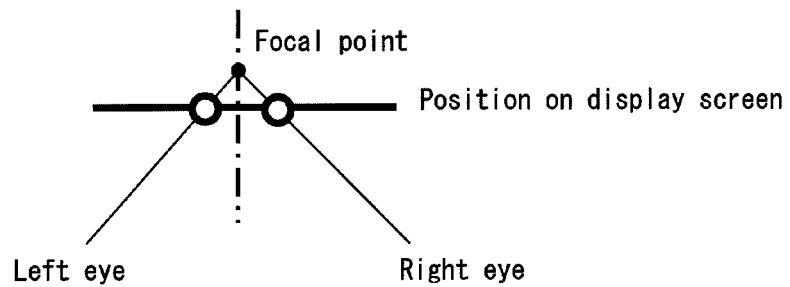

FIGS. 6A, 6B and 6C are views for explaining the principles in which an image appears further back than the display screen.

In each of 6A, 6B and 6C, a circle indicates an image displayed on the display screen. First, in the 2D mode, the image seen by the right eye and by the left eye is in the same position. Therefore, when the image is viewed by both eyes, the position of focus is located on the display screen (FIG. 6A).

On the other hand, in the left-view period of the 3D mode, the image seen by the left eye is seen at a position shifted to the left of the zero-offset position. At this time, the liquid crystal shutter glasses block 500 the right eye from seeing anything. Conversely, the image seen by the right eye is seen at a position shifted to the right of the zero-offset position. At this time, the liquid crystal shutter glasses 500 block the left eye from seeing anything (FIG. 6B).

By alternately switching over a short time interval, via the liquid crystal shutter glasses 500, between a state in which an image is visible only to the left eye and a state in which an image is visible only to the right eye, a person's eyes focus on a position further back than the display screen. As a result, the person perceives an image as being located at the position of focus, i.e. further back than the display screen (FIG. 6C).

Figure 7B:
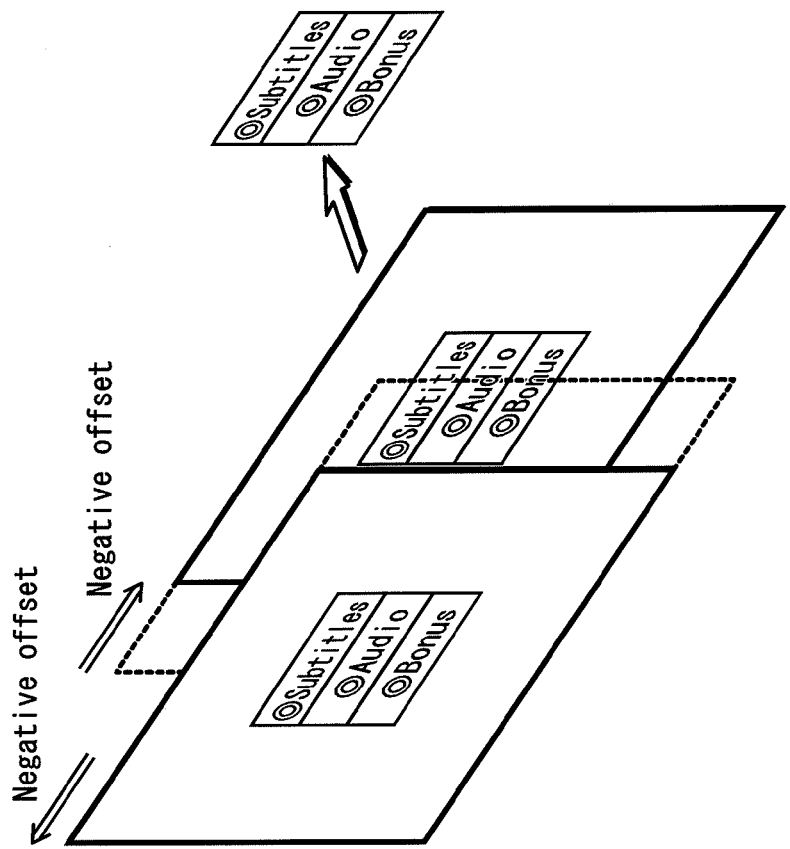
FIGS. 7A and 7B show an example of how the appearance of the image planes differ depending on whether the offset is positive or negative.
Figure 7A:
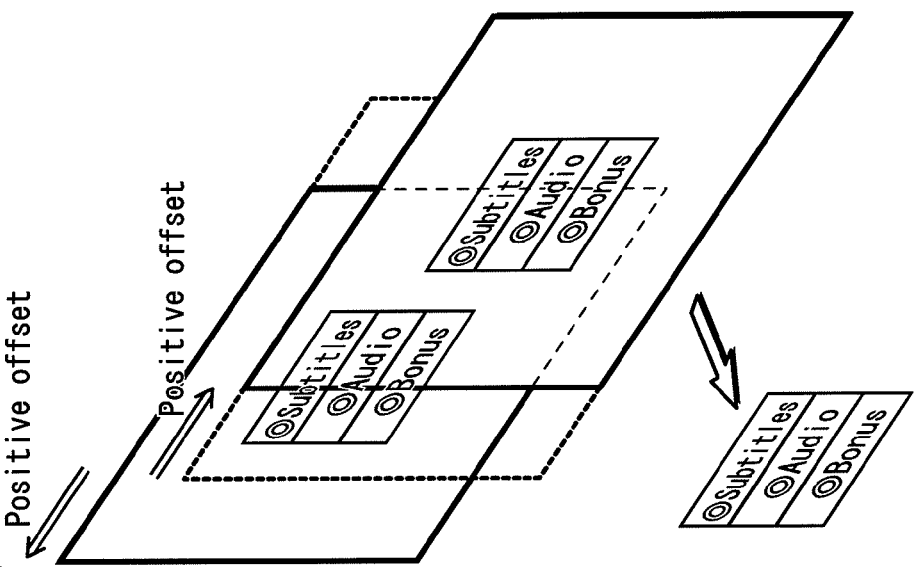

FIGS. 7A and 7B show an example of how the appearance of the image planes differ depending on whether the offset is positive or negative.

FIG. 7A shows the example in which the rendered image is shifted to the right in the left-view period, and the rendered image is shifted to the left in the right-view period. As a result, the subtitles during left-view output appear to the right of the subtitles during right-view output, as shown in FIGS. 5A-5C. In other words, the point of convergence (position of focus) is closer than the screen, and thus the subtitles also appear closer.

FIG. 7A shows the example in which the rendered image is shifted to the left in the left-view period, and the rendered image is shifted to the right in the right-view period. As a result, the subtitles during left-view output appear to the left of the subtitles during right-view output, as shown in FIGS. 6A-6C. In other words, the point of convergence (position of focus) is further back than the screen, and thus the subtitles also appear further back.

FIGS. 8A, 8B and 8C show application program interfaces each used for writing of a rendered image.

In FIG. 8A, a java.awt.Graphics#fillRect method is an application program interface used for calling the function of filling a rectangular region specified by a first argument with a color specified by a second argument. (To be more precise, the rendering color is the current color specified by a java.awt.Graphics#setColor method. For the sake of simplicity, the following describes that the color is specified by the second argument.) The rendering with this function is usable for the left image plane 104*c* and the right image plane 104*d* as well as for a rendering plane created independently by a BD-J application for a temporary use (Buffered Image). The position of the rectangle region is defined by a combination of the coordinates of the top-left pixel (x1, y1) and the coordinates of the lower-right pixel (x2, y2) of the rectangle region. The rendering with this function is usable for the left image plane 104*c* and the right image plane 104*d* as well as for a rendering plane created independently by a BD-J application for a temporary use (Buffered Image).

In FIG. 8B, a java.awt.Graphics#drawImage method is an API used for calling the function of writing an image specified by the second argument into a position specified by the first argument. More precisely, an additional argument specifying a rectangular region used to clip part of the specified image may be passed. Yet, description of such an argument is omitted here.

A StereoGraphics#drawImage method is an API used for calling the function for writing an image specified by the second argument into the left image plane at a rectangle region specified by the first argument and also for writing an image specified by the fourth argument into right image plane at a rectangle region specified by the third argument.

Each rectangular region is expressed by a combination of the coordinates of the top-left pixel (x1, y1) and the coordinates of the lower-right pixel (x2, y2) of the rectangular region. In addition, an image object to be rendered may be an instance (bitmap image) created from the data structure in JPEG or PNG format or a buffered image.

As described above, the java.awt.Graphics#drawImage method is for the process of copying an image. Yet, with this method, only one rectangle area can be specified for copying. On the other hand, the StereoGraphics#drawImage method is for copying a stereo pair of left and right images at once, so that a pair of rendering positions and a pair of rendering images are specified. Here, the left image plane 104*c* and the right image plane 104*d* are always set as the target planes for the rendering caused by this method. Accordingly, arguments specifying the target image planes are not included in the arguments of the StereoGraphics#drawImage method. It is noted that the BD-Java standards do not include the process of simultaneous copying of left and right images caused to be performed by the StereoGraphics#drawImage method. Therefore, in order to implement the StereoGraphics#drawImage method on a BD-ROM playback device, an addition of an extension method, such as the StereoGraphics#drawImage method, is necessary.

FIGS. 9A, 9B and 9C show specific examples of rendering requests that can be defined with application program interfaces shown in FIGS. 8A, 8B and 8C. The example shown in FIG. 9A corresponds to an API which is the java.awt.Graphics#fillRect method. The figure shows in tabular form the specific settings of a rendering rectangle region in which an image is rendered as well as of a rendering color. In the following description, each rendering request defined with an API is expressed in the same manner as FIG. 9A. With the java.awt.Graphics#fillRect method, the rendering rectangle region is expressed by two sets of X and Y coordinates in the image plane coordinate system. In this example, the rendering rectangle region is expressed by (X1=50, Y1=100) and (X2=250, Y2=170). The rendering color is expressed by the RGB values, which in this example are (R=255, G=0, B=0).

The example shown in FIG. 9B corresponds to an API which is the java.awt.Graphics#drawImage method. The figure shows in tabular form the specific settings of a rectangle region in which an image is rendered as well as of an image to be rendered. With the java.awt.Graphics#drawImage method, the rendering rectangle region is expressed by two sets of X and Y coordinates in the image plane coordinate system. In this example, the rectangle region is expressed by (X1=50, Y1=100) and (X2=250, Y2=170) and the image to be rendered is expressed with the use of an instance variable assigned to the instance of a data structure. In the example shown in the figure, the instance variable "bitmap image 1" is assigned to the instance of a data structure composed of 200×70 pixels.

The example shown in FIG. 9C corresponds to an API which is the StereoGraphics#drawImage method. The figure shows in tabular form the specific settings of two rectangular regions in each of which an image is rendered as well as of images to be rendered in the respective rectangular regions. With the StereoGraphics#drawImage method, the rectangular region on the left image plane is expressed by two sets of X and Y coordinates in the image plane coordinate system. In this example, the rectangle region on the left image plane is expressed by (X1=50, Y1=100) and (X2=250, Y2=170) and the image to be rendered is expressed by an instance variable assigned to the instance of a data structure. In the example shown in the figure, the instance variable "bitmap image 1" is assigned to the instance of a data structure composed of 200×70 pixels.

In addition, the rectangle region on the right image plane is expressed by two sets of X and Y coordinates in the image plane coordinate system. In this example, the rectangle region on the right image plane is expressed (X3=55, Y3=100) and (X4=255, Y4=170), and the instance variable "bitmap image 2" is assigned to the instance of a data structure composed of 200×70 pixels.

Figure 10:
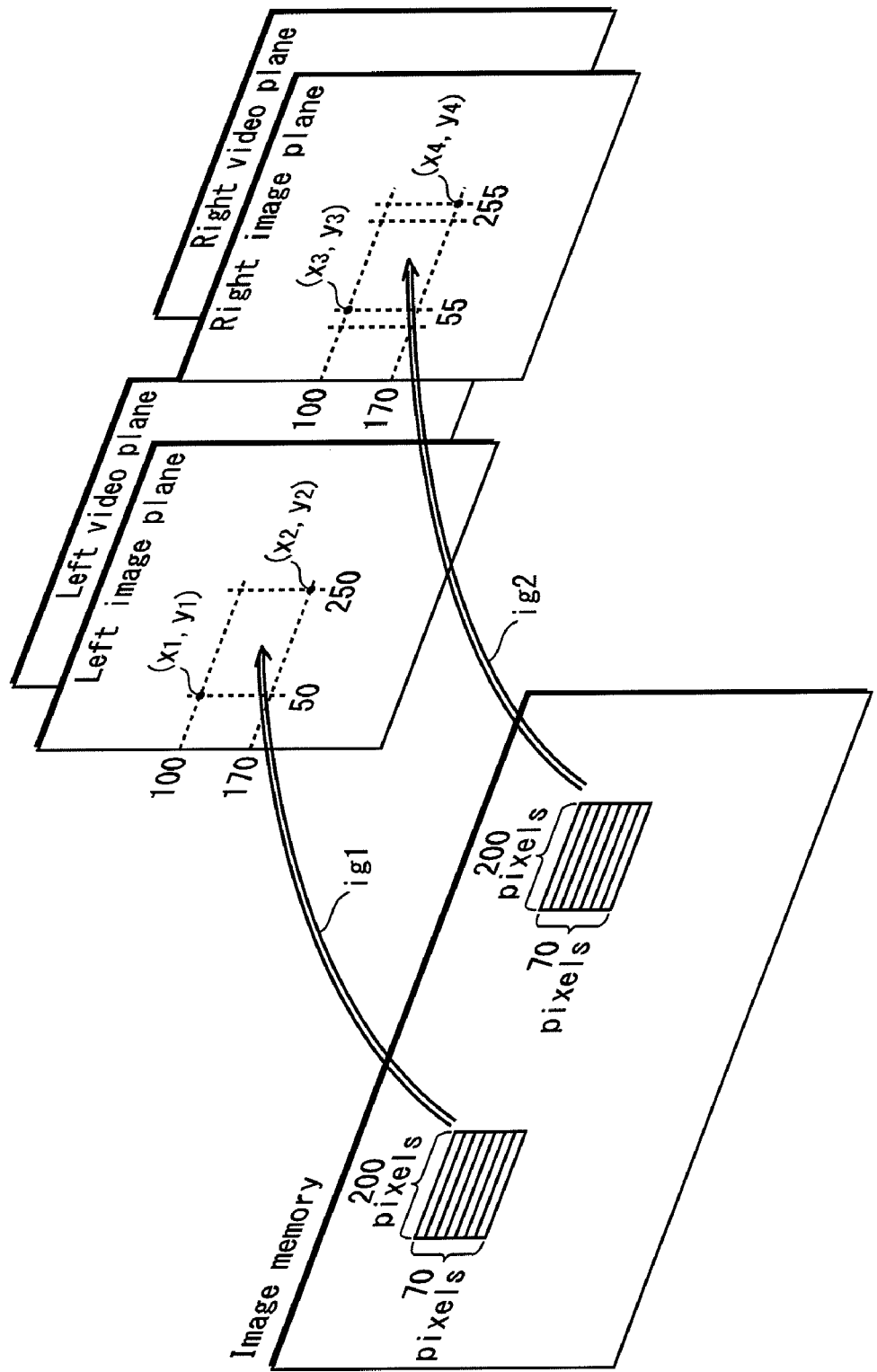
FIG. 10 schematically shows the writing performed in response to a call for the StereoGraphics#drawImage method with the arguments set as shown in FIG. 9C.

FIG. 10 schematically shows the writing performed in response to a call for the StereoGraphics#drawImage method with the arguments set as shown in FIG. 9C. In FIG. 10, the image memory storing the rendered images is shown closer, where as the left image plane overlaid with the left video plane as well as the right image plane overlaid with the right video plane are shown further back. In the figure, the specific X and Y coordinates of the respective rendering rectangles defined as in FIG. 9 are plotted on the left and right image planes.

As shown in the figure, the X coordinates plotted on the respective image planes are slightly different form each other. Thus, the rendered images are copied to the respective image planes so that the positions of the images on the respective planes are slightly shifted to the right or left. In the figure, an arrow ig1 indicates coping of an image from the left image memory to the left image plane, and an arrow ig2 indicates copying of an image from the right image memory to the right image plane. In this example, the position at which the R-image is rendered is shifted to the right from the position at which the L-image is rendered in the amount corresponding to five pixels. Consequently, the displayed image is perceived by the viewer as being further back than the screen. In this example, different bitmap images are specified as R-image and L-image to improve the stereoscopic viewing effect. Yet, the R-image and L-image may be the same bitmap image.

Figure 11:
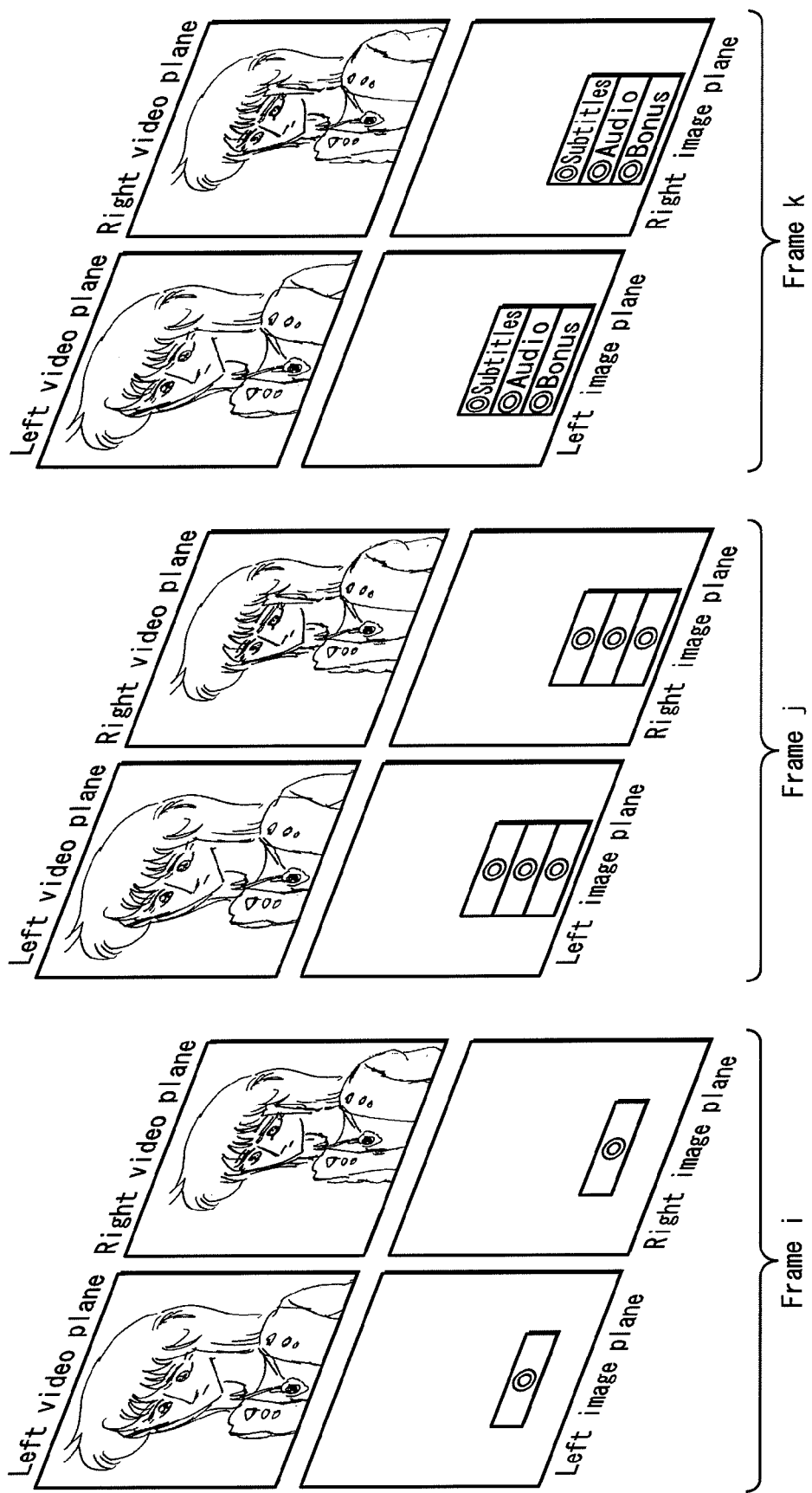
FIG. 11 shows, for each of Frames i, j and k, the images written on left and right video planes and on the left and right image planes.

FIG. 11 shows, for each of Frames i, j and k, the images written on left and right video planes and on the left and right image planes. For Frame i, one button material is rendered.

For Frame j, three button materials are rendered. For Frame k, three button materials are written together with letters that read subtitles, audio, and bonus.

Figure 12:
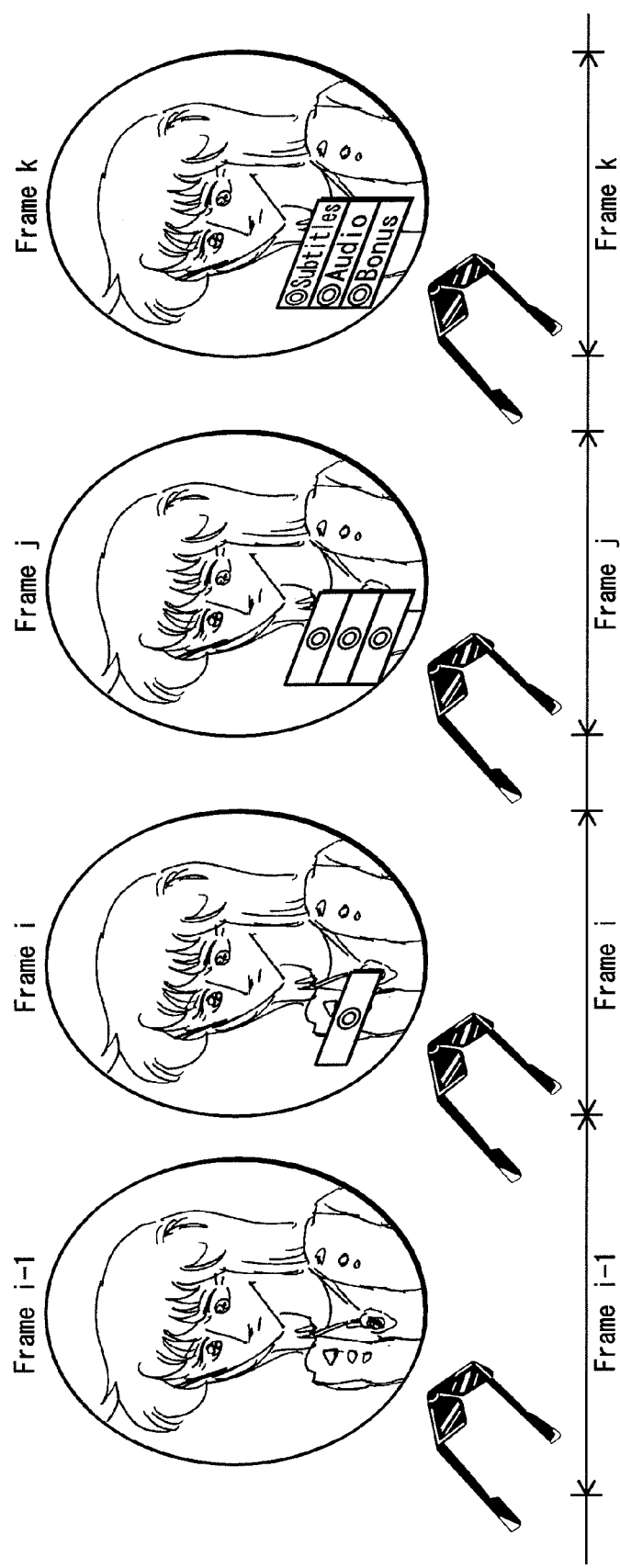
FIG. 12 shows an effete sequence that is presented when Frames i, j and k.

FIG. 12 shows an effete sequence that is presented when Frames i, j and k shown in FIG. 11 are played. Since Frames j and k are written as described above, one button material appears in Frame i, then three button materials appear in Frame j, finally a set of letters appears next to each button material in Frame k, whereby a menu is completed.

Note that the left and right image planes are alternately rendered on a line-by-line basis from the top. As a result of this line-by-line rendering, even if tearing occurs in the worst case, it is ensured that the tearing occurs at about the same part of both the left and right image planes.

FIG. 13 shows how the writing processes to the left and right image planes are performed. In the figure, Tier 1 shows the time axis of operation of a bytecode application, Tier 2 shows the left image memory, Tier 3 shows the right image memory, Tier 4 shows the left video plane, and Tier 5 shows the right video plane. Image writing is performed in Frame k+1 and Frame k+2, which sequentially follow Frame k. Lines 1, 2 and 3-70 shown in the figure represent the processes in which pieces of pixel data are sequentially written to the respective image planes. More specifically, Line 1 of the left image plane is written, followed by writing of Line 1 of the right image plane. Then, Line 2 of the left image plane is written, followed by writing of Line 2 of the right image plane. That is, the respective images are written to the respective planes alternately in the units of lines.

For the convenience sake of description, it is assumed that the bytecode application needs two frame periods before starting image writing to the left and right image planes. That is, when the bytecode application in Tier 1 calls the StereoGraphics#drawImage in Frame k, the rendering completes in Frame k+2, which is two frame periods after the calling.

Figure 14B:
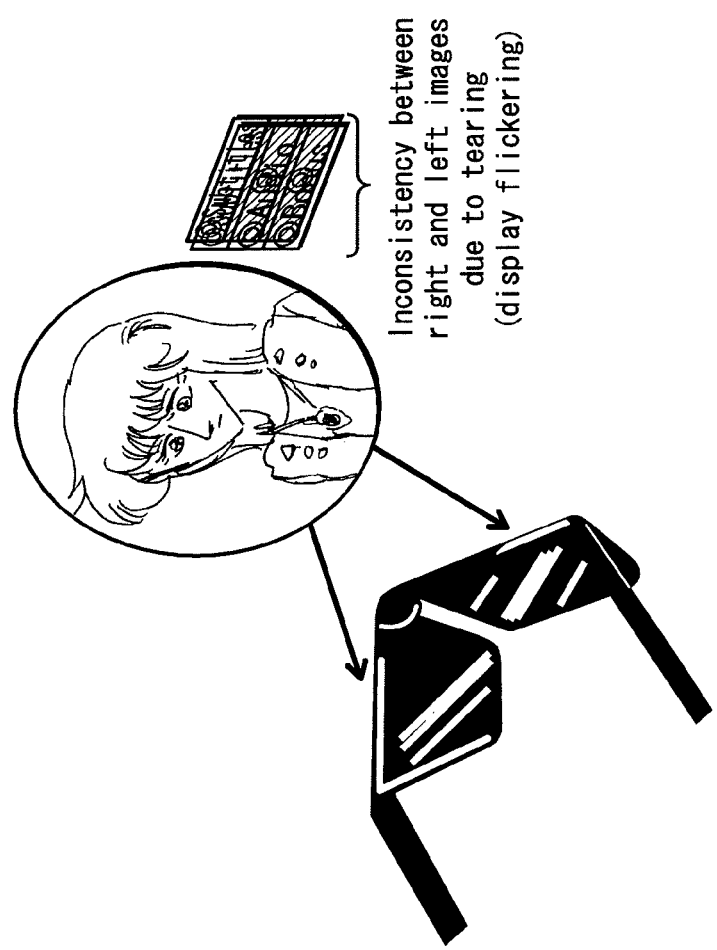
FIGS. 14A and 14B show the display presented as a result of image writing performed without using the StereoGraphics#drawImage method.
Figure 14A:
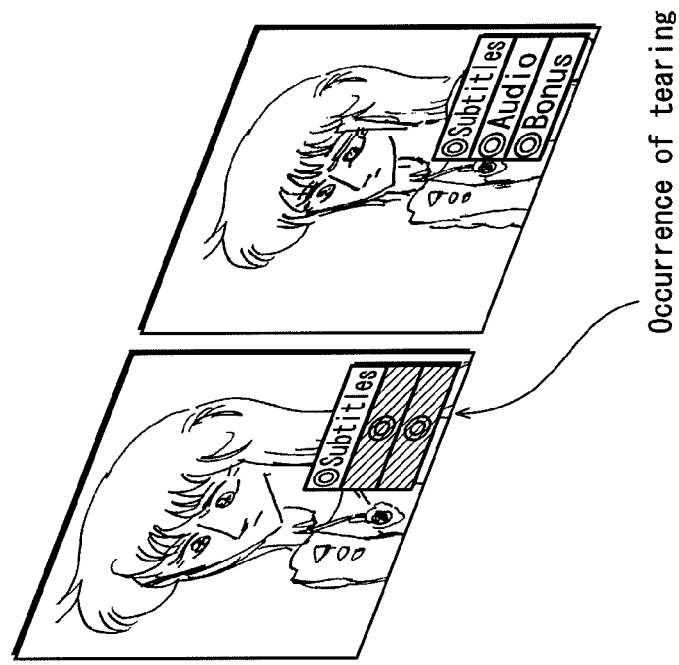

FIGS. 14A and 14B show the display presented as a result of image writing performed without using the StereoGraphics#drawImage method. That is, the left and right image planes are independently written. FIG. 14A shows the difference in progress of the image writing on the left and right image planes. On the left image plane, which is rendered first, the button materials appear duly with letters reading "subtitles," "audio" and "bonus". On the right image plane, which is started to be written after the left image plane, only one button material appears duly with letters reading "subtitles".

As described above, each image plane according to the present embodiment is composed of a single buffer, so that the screen display of each image plane is updated by overwriting the stored image displayed in Frame j with an image to be displayed in Frame k. In FIGS. 14A and 14B, part of the image displayed in Frame j remains on the left image plane (see the cross-hatched part). The remaining part of the image displayed in Frame j exists only on the right image plane but not on the left image plane, which results inconsistency between the left and right eyes.

FIG. 14B shows a stereographic video image perceived by the viewer through the shutter glasses 500, when the image planes stores image data shown in FIG. 14A. Since the button material with the letters reading "subtitles" are commonly stored on both the left and right image planes, this button material appears closer toward the viewer due the stereoscopic viewing effect. In contrast to this, the button materials with letters reading the "audio," and "bonus" are not commonly stored on both the left and right image planes, so that stereoscopic viewing effect is not produced. Furthermore, different images are presented to the left and right eyes, which never occurs in real life. Such inconsistency between the images presented to the left and right eyes causes visual discomfort to the viewer.

Figure 15B:
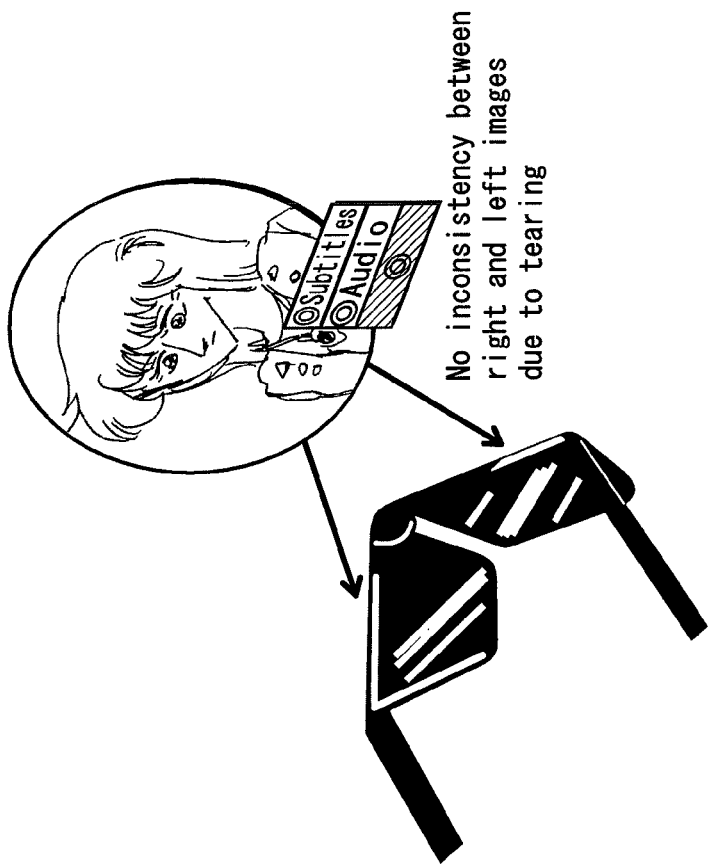
FIGS. 15A and 15B show the display presented as a result of image writing performed with the use of the StereoGraphics#drawImage method.
Figure 15A:
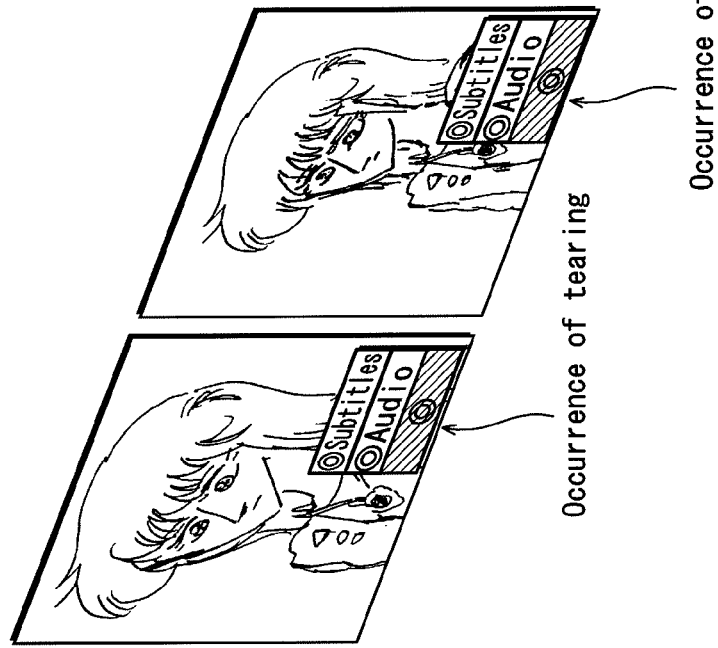

FIGS. 15A and 15B show the display presented as a result of image writing performed with the use of the StereoGraphics#drawImage method. That is, pixel data is written alternately to the left and right image planes on a line-by-line basis. FIG. 15A shows the difference in progress of the image rendering on the left and right image planes. Since the left and right image planes are alternately written line by line, the degrees of progress on the respective planes are about the same.

Each image plane is updated by overwriting the stored image displayed in Frame j with an image to be displayed in Frame k. As shown FIGS. 15A and 15B and similarly to FIGS. 14A and 14B part of the image displayed in Frame k remains on the left image plane (see the cross-hatched part).

More specifically, on the left and right image planes, only two button materials with letters reading "subtitles" and "audio" are stored. Such incomplete images on the respective image planes are displayed with tearing. Yet, the remaining part of the image displayed in Frame k are present commonly in the left and right image planes. That is, the presence of remaining part causes no inconsistency between the left and right video images.

FIG. 15B shows a stereographic video image perceived by the viewer through the shutter glasses 500, when the image planes stores image data shown in FIG. 15A. Since the button materials with the letters reading "subtitles" or "audio" are commonly stored on both the left and right image planes, the two button materials appear closer toward the viewer due the stereoscopic viewing effect. In addition, although rendering of both the left and right image planes is incomplete, both the left and right image planes store substantially the same image data. In addition, even if there is inconsistency between images stored on the respective planes, the difference is limited to the extent of one line of pixels, which do not cause visual discomfort to the viewer.

The following describes a program for causing the playback device to execute the rendering with the use of the StereoGraphics#drawImage method.

Figure 16:
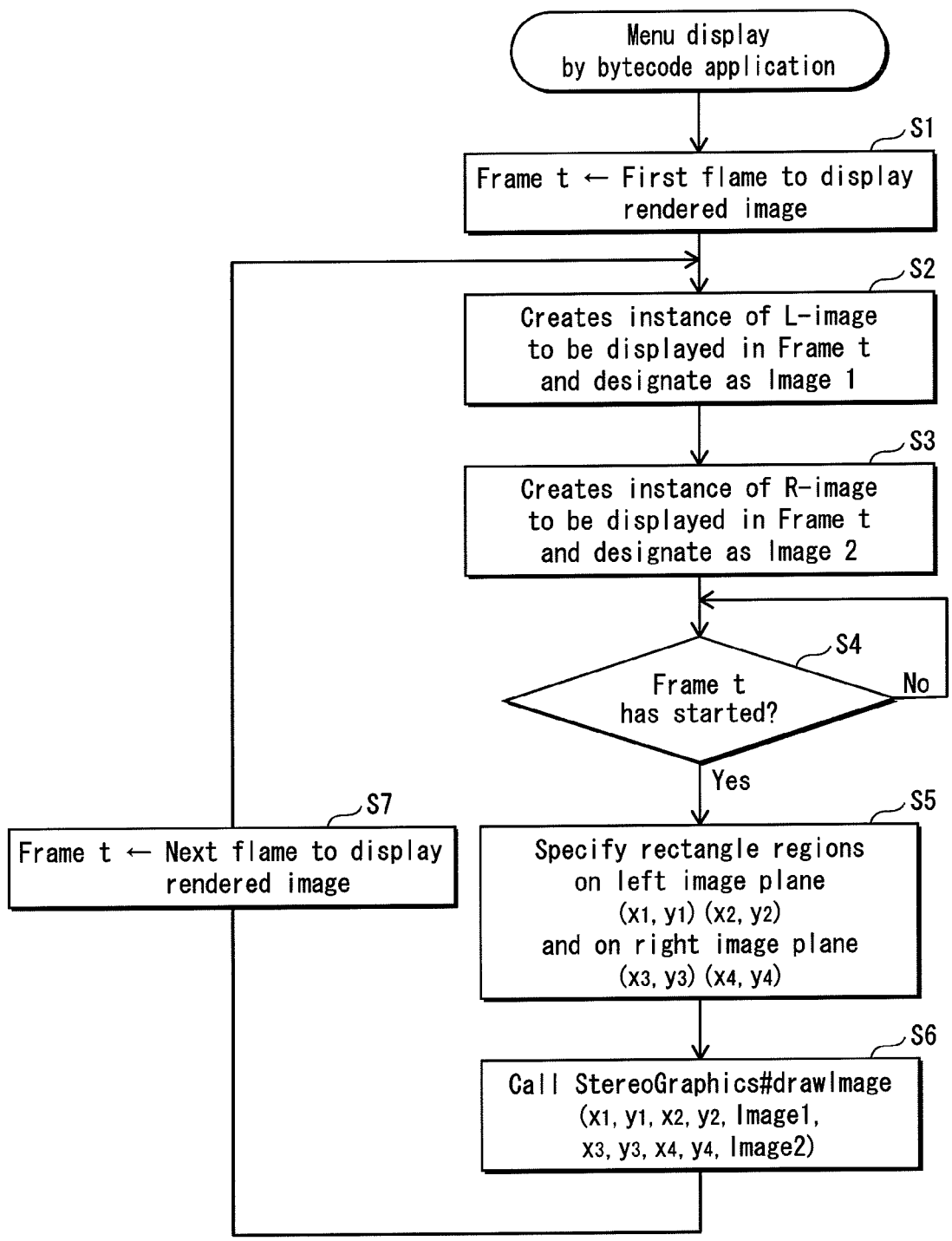
FIG. 16 is a flowchart showing the procedures performed by a bytecode application to display a menu.

FIG. 16 is a flowchart showing the procedures performed by a bytecode application to display a menu. In Step S1, the frame in which the rendered image is to be first displayed is designated as "Frame t" and executes the loop composed of Steps S2-S7. In the loop of Steps S2-Step S7, the bytecode application creates an instance of an L-image to be displayed in Frame t and designates the instance as Image 1 (Step S2), creates an instance of an R-image to be displayed in Frame t and designates the instance as Image 2 (Step S3), waits until Frame t starts (Step S4), and determines a rectangle region of the left image plane and a rectangle region of the right image plane at the start of Frame t (Step S5). Then, the bytecode application sets appropriate arguments specifying the determined rectangle regions on the left and right image planes and calls the StereoGraphics#drawImage method (Step S6) and designates a frame in which a rendered image is to be displayed next as a new Frame t (Step S7) and repeats the loop.

Figure 17:
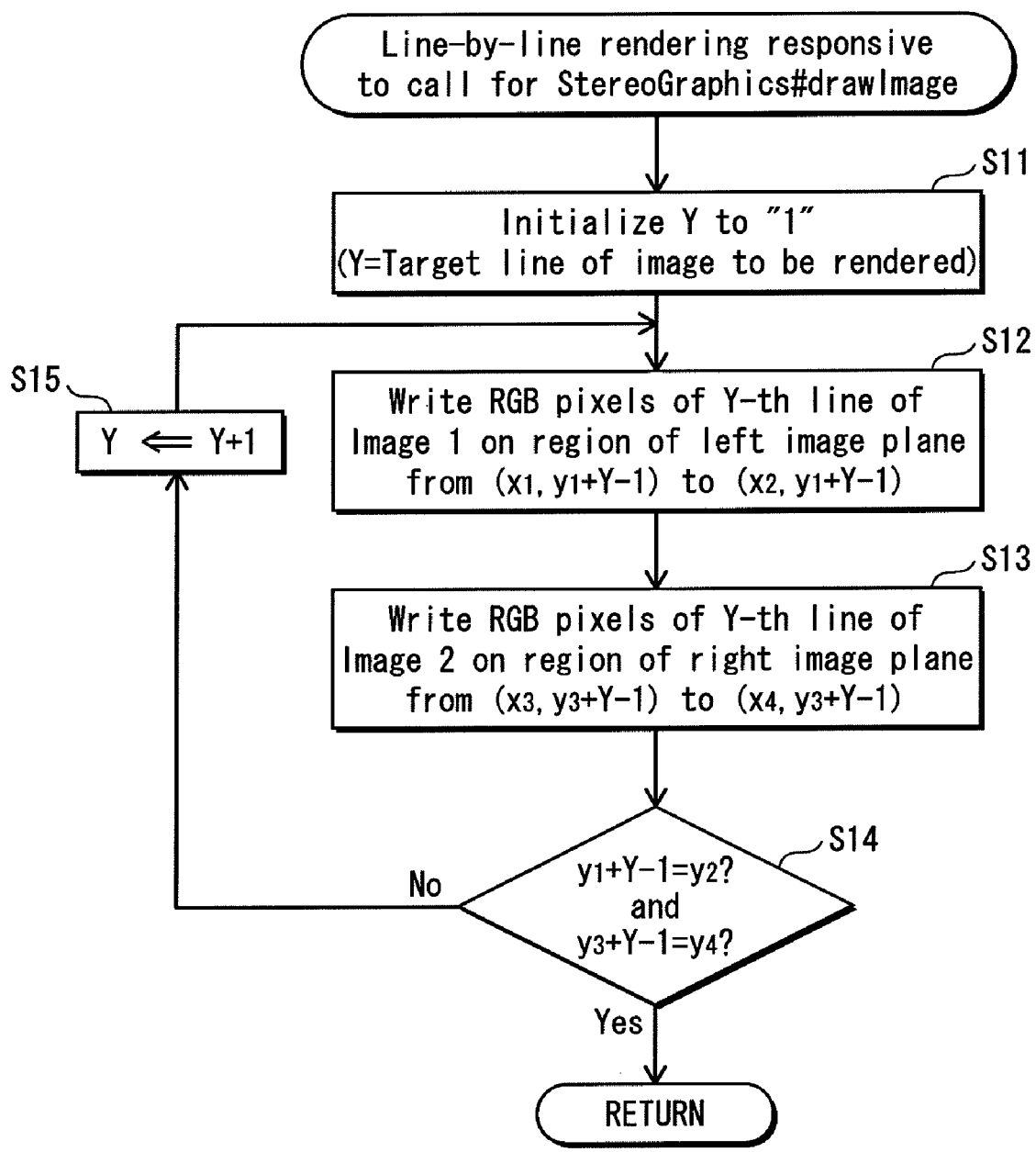
FIG. 17 is a flowchart showing the procedure for line-by-line rendering performed in response to a call for the StereoGraphics#drawImage method.

FIG. 17 is a flowchart showing the procedure for line-by-line rendering performed in response to a call for the StereoGraphics#drawImage method. First, a variable Y specifying the line to be written is initialized to "1" (Step S11) and then the loop composed of Steps S12-S14 is executed. In the loop, the following steps are performed. First, the RGB values of pixels on the Y-th line of the image specified by the second argument are written to the left image plane, staring from the point defined by the coordinates (x1,y1+Y−1) to the point defined by the coordinates (x2, y1+Y−1) (Step S12). Next, the RGB values of pixels on the Y-th line of the image specified by the fourth argument are written to the right image plane, stating from the point defined by the coordinates (x3, y3+Y−1) to the point defined by the coordinates (x4, y3+Y−1) (Step S13). Steps S12 and S13 are repeated until the judgment in Step S14 results in Yes. In Step S14, it is judged whether y1+Y−1=y2 and y3+Y−1=y4 are both satisfied. If either or both of the conditions are not satisfied, the variable Y is incremented in Step S15 and the processing goes back to Step S12. Through the iteration of the loop, pixels of Image 1 are written line by line to the specified rectangle region of the left image plane. Similarly, pixels of Image 2 are written line by line to the specified rectangle region of the right image plane.

As described above, the present embodiment ensures that a pair of specifications, one specifying writing to the left plane memory and the other specifying writing to the right plane memory, is passed from a bytecode application, when an application interface is called. By virtue of this, the playback device is implemented to alternately perform the writing of pixels to the left plane memory and the writing of pixels to the right plane memory. Accordingly, even if a frame period arrives before completion of writing of all the pixels to be displayed in the frame, the writing of the respective images for the left and right eyes have progressed to the same extent. That is, even if tearing occurs, the tearing in the image presented to the right eye and the tearing in the image presented to the left eyes are substantially the same. By virtue of this, it is avoided that video images presented to the respective eyes are inconsistent.

(Second Embodiment)

Figure 18:
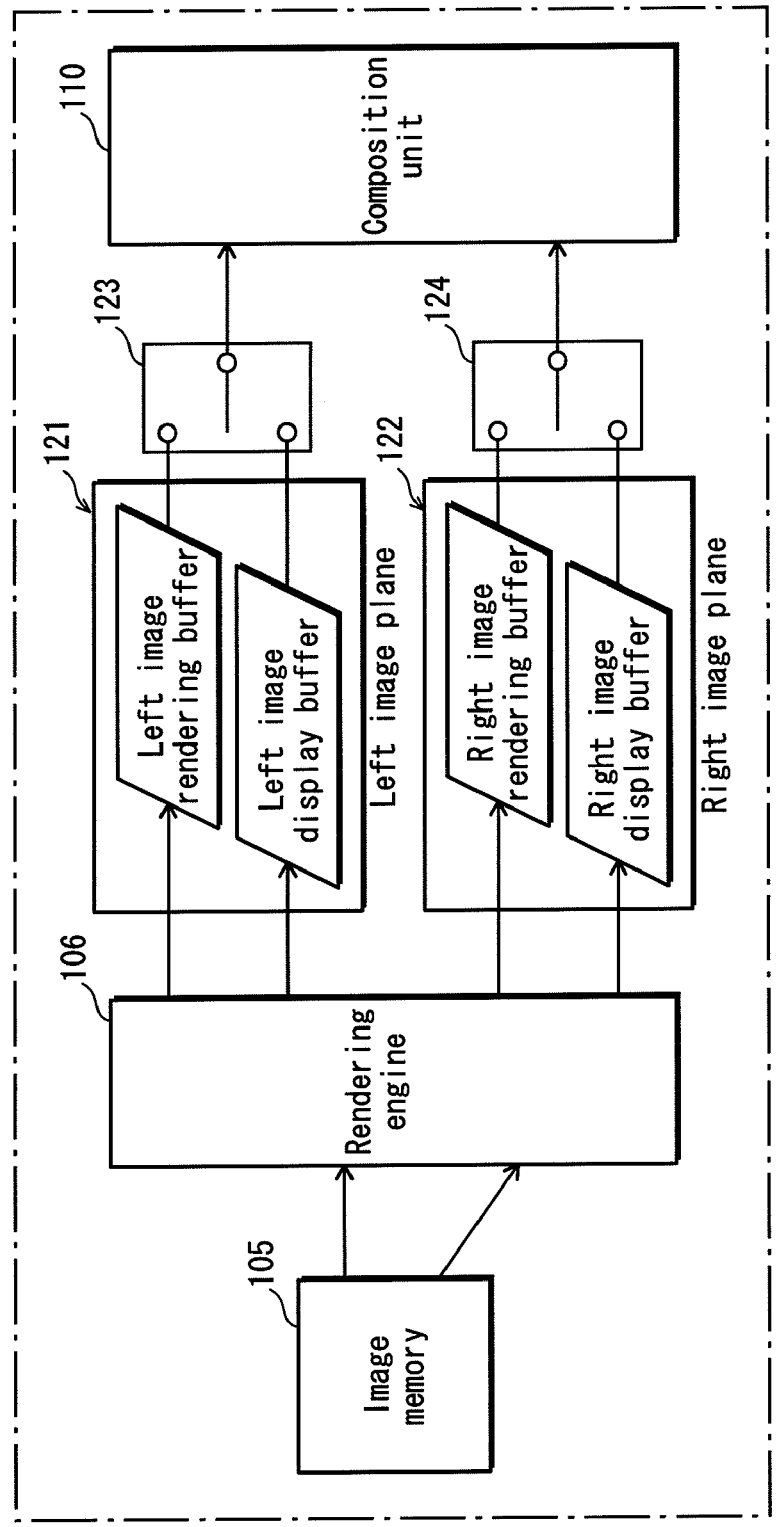
FIG. 18 shows part of a playback device according to a second embodiment, the part relevant to the improvements (an image memory, image planes, a rendering engine, and a composition unit) relevant to the improvements made on the first embodiment.

In a second embodiment of the present invention, a double-buffer model is adopted for each of the left and right image planes. FIG. 18 shows a playback device consistent with the second embodiment. Note that the figure only shows those portions (the image memory, image planes, the rendering engine, and composition unit) relevant to the improvements made on the first embodiment.

In the figure, the image memory 105, the rendering engine 107 and the composition unit 110 are the same as those described in the first embodiment. However, the image planes 104c and 104d are replaced with a left image plane 121 and a right image plane 122. In addition, a switch 123 is provided between the left image plane 121 and the composition unit 110, and a switch 124 is provided between the right image plane 122 and the composition unit 110.

The left image plane 121 is composed of two plane memories. Each of the two plane memories is selectable between an L-image display buffer and an L-image rendering buffer. When one of the plane memories is selected as an L-image display buffer, the other is selected as an L-image rendering buffer. The L-image display buffer is used for composition by the composition unit. The L-image rendering buffer is used for image writing by an bytecode application. Each of the buffers has enough capacity for storing pixel data (RGBa values) corresponding to a full-screen image.

The right image plane 122 is composed of two plane memories. Each of the two plane memories is selectable as an R-image display buffer and an R-image rendering buffer. When one of the plane memories is selected as an R-image display buffer, the other is selected as an R-image rendering buffer. The R-image display buffer is used for composition by the composition unit. The R-image rendering buffer is used for image writing by the bytecode application. Each of the buffers has enough capacity for storing pixel data (RGBa values) corresponding to a full-screen image.

The switch 123 is used for switching between the two memories of the left image plane 121, so that the pixel data stored on the one currently acting as the display buffer is output to the composition unit 110.

The switch 124 is used for switching between the two memories of the right image plane 122, so that the pixel data stored on the one currently acting as the display buffer is output to the composition unit 110.

Figure 19B:
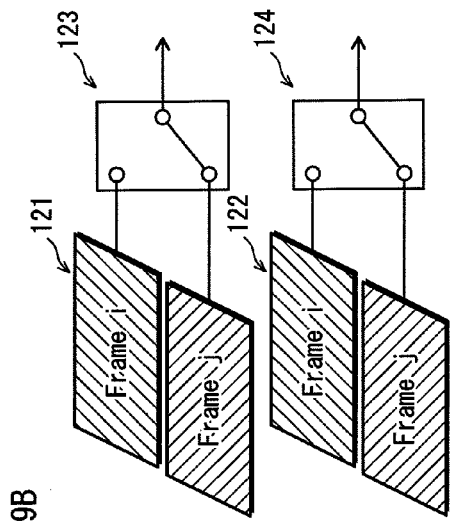
FIGS. 19A, 19B, 19C and 19D show the switching done by switches 123 and 124.
Figure 19D:
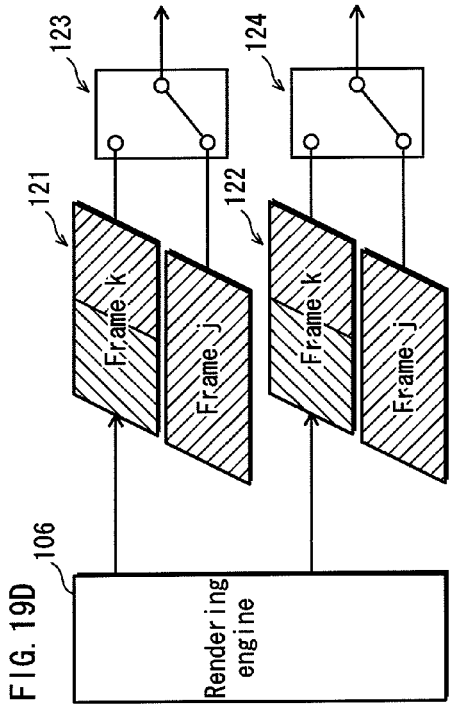
Figure 19A:
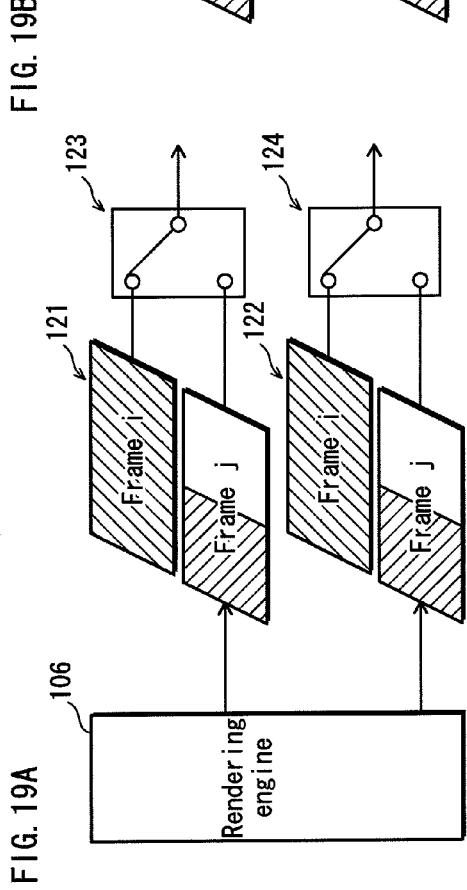

FIGS. 19A, 19B, 19C and 19D show the switching done by the switch 123 and the switch 124. FIG. 19A shows a state in which rendered images to be displayed in Frame i is being output. As shown in FIG. 19A, of the two buffers constituting the left image plane 121, the upper one in the figure is currently selected as the display buffer. Similarly, of the two buffers constituting the right image plane 122, the upper one in the in the figure is currently selected the display buffer. Thus, each display buffer stores a rendered image to be displayed in Frame i. On the other hand, the lower buffer in each pair is currently selected as a rendering buffer. Thus, an image to be displayed in Frame j, which is subsequent to Frame i, is being written in each rendering buffer. FIG. 19B shows a state in which writing of the respective images to be displayed in Frame j is completed. Since the writing to the lower buffer of each plane memory is completed, each of the switches 123 and 124 now selects the lower buffer as the display buffer. As a result, a pair of images rendered for Frame j is output and displayed.

Figure 19C:
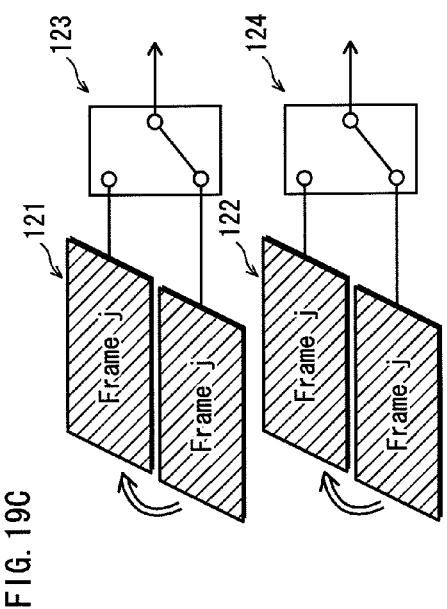

FIG. 19C shows a state in which the rendered image stored on each display buffer is copied to a corresponding rendering buffer. As a result, both the buffers constituting the left image plane 121 store the same image to be displayed in Frame j. Similarly, both the buffers constituting the right image plane 122 store the same image to be displayed in Frame j. In this way, each of a pair of images to be displayed in Frame k is generated by partly rewriting the image for the previous frame, so that the part of the image remaining without being overwritten is ensured to be consistent with the previous image displayed in Frame j. FIG. 19D shows a state in which each of a pair of images to be displayed in Frame k is being written in the upper plane memory. Upon completion of the writing to the upper plane memories, the switches 123 and 124 now connect to the respective upper buffers, so that each upper buffer is selected as the display buffer.

Figure 20:
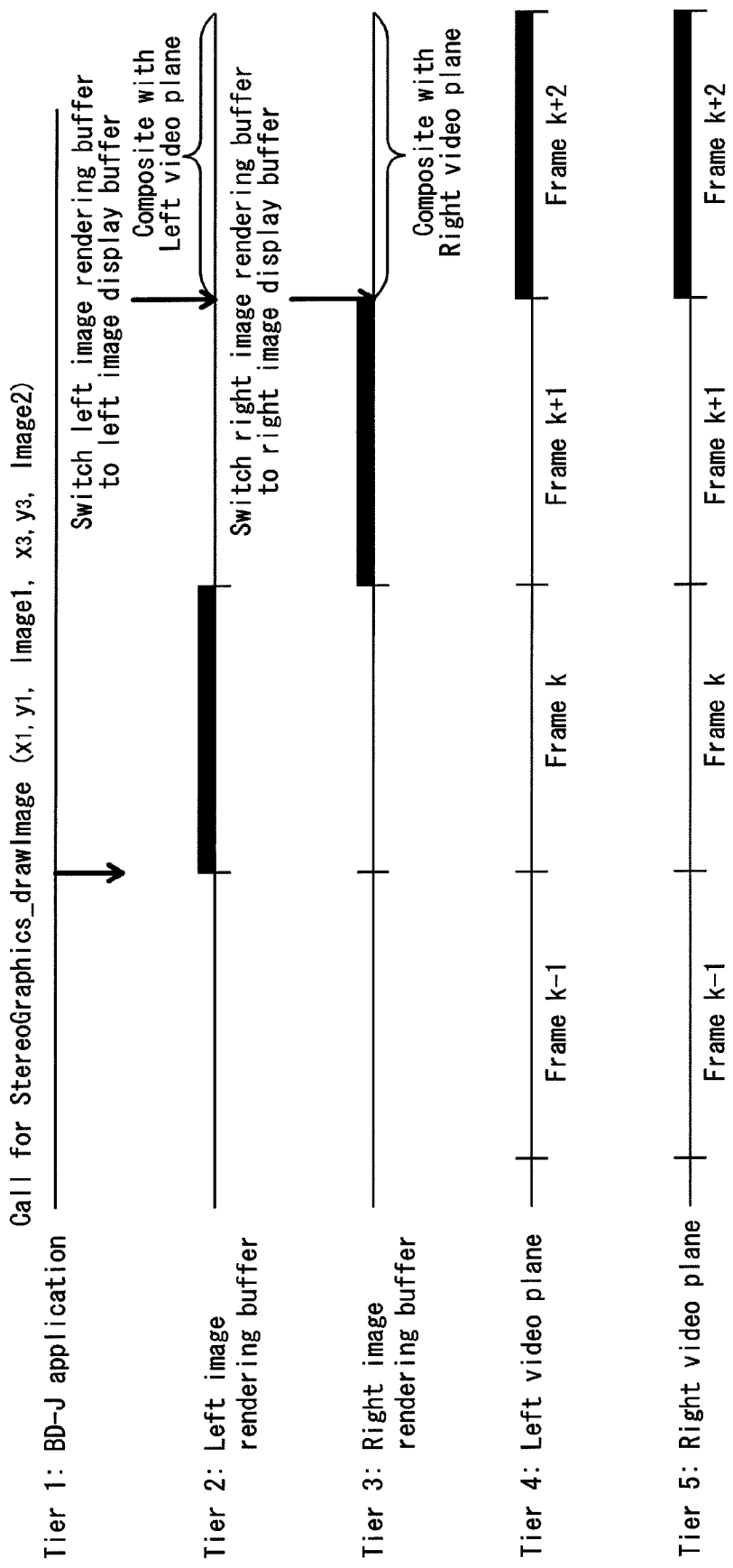
FIG. 20 shows the processes to be performed to complete the writing of the left and right image planes.

FIG. 20 shows the processes to be performed to complete the writing of the left and right image planes. Tier 1 shows the time axis of operation of a bytecode application. Tier 2 shows the L-image rendering buffer. Tier 3 shows the R-image rendering buffer. Tier 4 shows the left video plane. Tier 5 shows the right video plane. In Frame k+1, which is immediately subsequent to Frame k, an image is written to the R-image rendering buffer. In Frame k+2, an image is written to the L-image rendering buffer. Suppose that the writing to the left and right image planes takes two frame periods and that the bytecode application calls the StereoGraphics#drawImage method in Frame k, then the rendering process completes in Frame k+2, which is two frames after Frame k. When Frame k+2 starts, the L-image and R-image rendering buffers are switched to be the L-image and R-image display buffers, respectively. As a result of the switching, a new pair of images is displayed.

Figure 21:
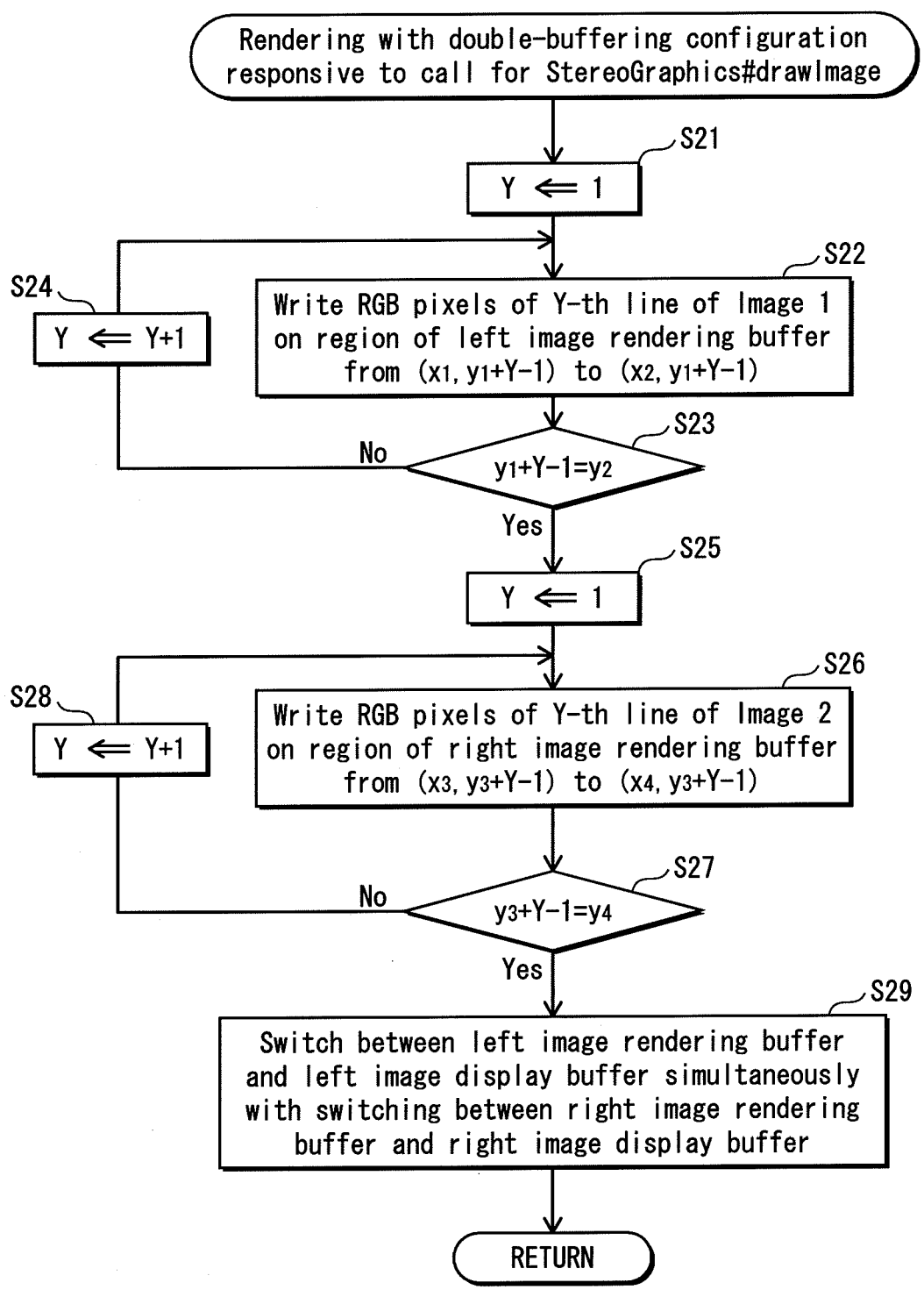
FIG. 21 is a flowchart showing the rendering procedure performed using the double buffers and in response to a call for the StereoGraphics#drawImage method

FIG. 21 is a flowchart showing the rendering procedure performed using the double buffers and in response to a call for the StereoGraphics#drawImage method. As shown in the flowchart, the variable Y specifying the line to be written is initialized to "1" (Step S21) and the loop composed of Steps S22-S24 is performed. In the loop, the RGB values of pixels on the Y-th line of the image specified by the second argument are written to the left image plane, starting from the point defined by the coordinates (x1, y1+Y−1) to the point defined by the coordinates (x2, y1+Y−1) (Step S22). This process is repeated until a judgment in Step S23 results in Yes. In Step S23, it is judged whether or not the condition y1+Y−1=y2 is satisfied. If the condition is not satisfied, the variable Y is incremented in Step S24 and then Step S22 is performed. Through the iterations of the loop, pixel data of Image 1 is written line by line in the specified rectangle region of the left image plane.

Then, the variable Y is initialized to "1" (Step S25) and the loop composed of Steps S26-S28 is performed. In the loop, the RGB values of pixels on the Y-th line of the image specified by the fourth argument are written to the right image plane, staring from the point defined by the coordinates (x3, y3+Y−1) to the point defined by the coordinates (x4, y3+Y−1) (Step S26). This process is repeated until a judgment in Step S27 results in Yes. In Step S27, it is judged whether or not the condition y3+Y−1=y4 is satisfied. If the condition is not satisfied, the variable Y is incremented in Step S28 and then Step S26 is performed. Through the iterations of Steps S26-S28, pixel data of Image 2 is written line by line in the specified rectangle region of the right image plane. After the loop of Steps S26-S28 ends, Step S29 is performed to switch between the L-image rendering buffer and the L-image display buffer simultaneously with switching between the R-image rendering buffer and the R-image display buffer. As a result, the display is updated.

As described above, the present embodiment employs a pair of image planes each composed of double buffers, occurrence of inconsistency between left and right video images is avoided.

(Third Embodiment)

A third embodiment of the present invention relates to an improvement in specification of the size of an image plane, during application signaling performed by a playback device. The lifecycle of the application signaling is bounded to a title stored on a recording medium.

In the present embodiment, the recording medium stores an index table and an operation mode object described below.

The index table is management information of the entire recording medium. After a disc is inserted into the playback device, the index table is first read, and the recording medium is thus uniquely recognized by the playback device.

The index table associates each of a plurality of title numbers that can be stored in the title number register of the playback device, with a corresponding operation mode object that determines the operation mode of the playback device. Each title stored on the recording medium refers to a combination of an operation mode object associated with a corresponding title number and a playlist that is played back by the operation mode object. A playlist is a playback unit that is determined by defining a playback sequence of digital stream containing a video stream.

The title numbers that the title number register may hold include 0, 1-999, an undefined value (0xFFFF). The title number 0 is of the top menu title that can be called by a user operation of menu call. The undefined title number (0xFFFF) is of the first play title for displaying a warning for viewers or the content provider's logo, etc. immediately after the recording medium is loaded.

The index table stores a plurality of entries (index table entries) for the respective title numbers. Each index table entry describes an operation mode object defining an operation mode in which a corresponding title operates.

Upon loading of the recording medium to the playback device, the value held by the title number register changes in the following order: 0xFFFF→1-999→0. The change of the title number indicates the following. That is, playback of the firstplay title starts upon loading of the recording medium. After the playback of the first title, the title specified by the title number falling within the range from 1 to 999 is played. After the playback of the specified title, the top-menu title is played and the playback device is placed in standby for a selection by a user. One of the titles corresponding to the title number that is currently held in the title number register is the title currently targeted for playback and such a title is referred to as "current title". The value held in the title number register is determined by a user operation made on the top-menu title or by settings by a program.

Figure 22:
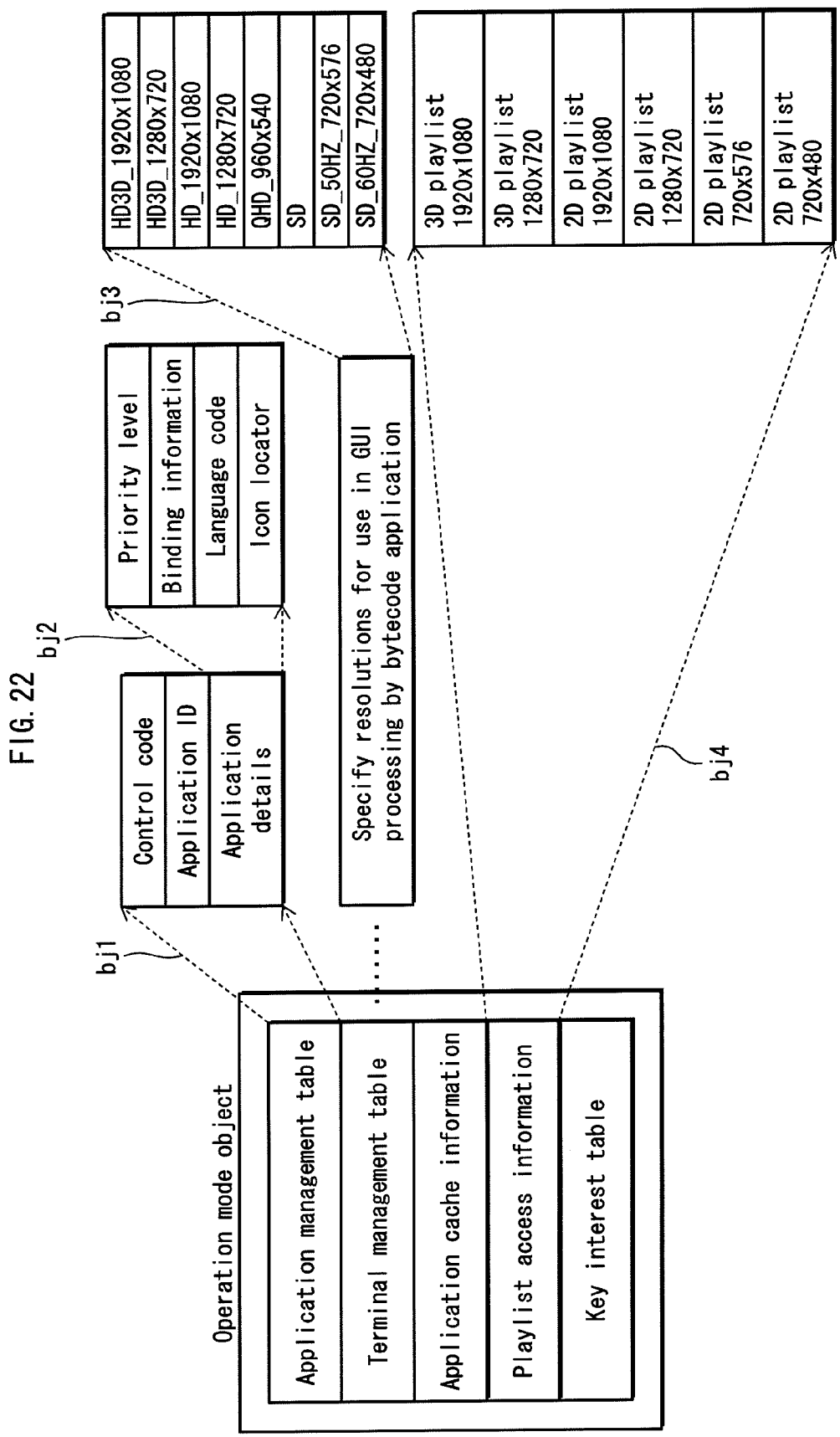
FIG. 22 shows one example of the internal structure of an operation mode object.

This concludes the description of the index table. The following now describes the details of operation mode objects An operation mode object is information defining a title by associating a playlist and an application. FIG. 22 shows one example of the internal structure of an operation mode object. As shown in the figure, the operation mode object is composed of an "application management table", a "terminal management table", "application cache information", "playlist access information" and a "key interest table".

The "application management table" includes a plurality of entries. A leader line bj1 indicates that the application management table is shown in close-up. As the leader line indicates, each entry of the application management table includes a "control code", an "application ID", and "application details" of a corresponding application. The "control code" indicates the startup method for the application in a title, i.e. whether the application is to be started automatically (AutoStart) or whether it should wait to start until it is called by another application (Present). The "application ID" indicates the targeted application using a set of five-digit numbers, which is used as the file name for the JAR file. A leader line bj2 indicates that the "application details" are shown in close-up. As the leader line indicates, the "application details" includes the following information items for each application: the "priority level" of the application when the application is loaded; "binding information" indicating whether the application is title unbound or not and whether it is disc unbound or not; a string of characters indicating the name of the application; a "language code" indicating to which language the application belongs; and an "icon locator" indicating the location of an icon associated with the application.

By determining a title as a lifecycle of a corresponding application, the consumption of memory resources and the like by each application is managed in units of titles (i.e., playback units). In this way, even if a resource conflict occurs among a plurality of applications during playback of a title causing deadlock, all the applications are all terminated in response to a user operation of selecting another title. Thus, the deadlock is forcibly resolved. Also, even if a runaway application occupies memory during playback of a title, the memory shortage is forcibly resolved in response to a user operation of selecting another title. In this way, memory resources are not consumed unnecessarily, permitting stable management of memory resources. Since stable management of memory resources is possible, such management is especially useful when implemented in an electric appliance with limited memory resource capacity.

The "terminal management table" is a management table defining processes to be performed by the application currently running for displaying GUI via HAVi interface, such as the one implemented by European digital broadcast terminal (DVB-MHP). Each entry of the table includes configuration information used for executing GUI display, font data to be used for GUI display, a mask flag indicating whether or not to mask a menu call or title call for GUI when such a call is made by the user. The configuration information is to instruct the playback device to reserve, on a memory device of the playback device, a graphics plane having a size corresponding to the resolution of a video stream to be played, before graphics rendering by an application to be activated in accordance with the application management table included in an operation mode object. A leader line bj3 indicates that the internal structure of the terminal management table is shown in close-up. As a leader line bj3 indicates, the terminal management table may be set to any of the following: HD3D_1920×1080, HD3D_1280×720, HD_1920×1080, HD_1280×720, QHD_960×540, SD, SD_50HZ_720×576, and SD_60HZ_720×480.

The "application cache information" is used when a title corresponding to an operation mode object becomes the current title. More specifically, the application cache information defines an application whose file needs to be read into the cache of the platform before AV playback by the title starts and includes entries for the applications whose lifecycle is defined in the application management table. Each entry is information that instructs the playback device to cache each application whose lifecycle is defined in the application management table. The ranks are assigned to the entries, so that the playback device is instructed to cache the applications one by one in the decreasing order of rank, i.e., starting from highest until the cache becomes full. With this arrangement, the startup delay due to the time taken for class load is decreased even when classes of bytecode applications are loaded from a low-speed optical disc medium.

The "playlist access information" includes specification of an auto-playback playlist to be automatically played back when a title corresponding to an operation mode object becomes the current title. Further, the playlist access information includes the specification of playlists selectable by an application set to run when a title corresponding to an operation mode object becomes the current title. A leader line bj4 indicates that the internal structure of information specifying auto-playback playlists is shown in close-up. As the leader line bj4 indicates, the specification of an auto-playback playlist may specify the following playlists: 3D playlist 1920× 1080, 3D playlist 1280×720, 2D playlist 1920×1080, 2D playlist 1280×720, 2D playlist 720×576, and 2D playlist 720×480.

In response to a selection of one of the titles, the playback device starts playback of a playlist specified by the playlist access information of the selected current title, without waiting for a playback instruction from the application. If execution of the bytecode application ends before playback of the playlist ends, the playback device continues the playback of the playlist.

By virtue of the advanced start of playback, playback images presented by playlist playback are output until an interactive screen is displayed, if the display of an interactive screen is delayed due to the delayed image rendering caused as a result of the time taken for the class loading by the application. That is, even if the delay of application activation is relatively long, playback images by the playlist playback is presented to the user for viewing for the time being. Since images are presented even during the time the application is brought into the state of readiness, user's anxiety is avoided.

In addition, the playlist playback and the application execution may not end at the same time, which leads to abnormal termination of the application due to the shortage of resources and thus GUI display by the application is automatically erased. Even so, playback images by the playlist remain on the display device as long as the display of such playback images is continued. Thus, even after abnormal termination of the bytecode application, the display device still presents some images, avoiding screen blackout.

The "key interest table" stores entries for a plurality of key entries corresponding to keys provided on the remote controller. The key entries include a playback key entry, a stop key entry, a fast-forward key entry, a reverse key entry, an up-direction key entry, a down-direction key entry, a right key entry, and a left key entry. Each key entry defines whether or not to generate a key event in response to a push of a corresponding key. The event manager of the playback device judges a generated event matches any key event listed in the key interest table. If there is a match, a corresponding key event is output to the bytecode application, so that the key event is processed.

On the other hand, if a generated event is not listed in the key interest table, the operation manager of the playback device causes the playback control engine to execute an AV function corresponding to the event. In this way, even if the bytecode application does not support every possible event or has bags, it is still ensured that the operation manger controls the playback control engine. Since the key interest table ensures adequate control without being affected by bugs that may be presented in the application, software houses of applications are encouraged not to care much about the risk of bugs and to implement playback control not realized by the other competitors.

Figure 23:
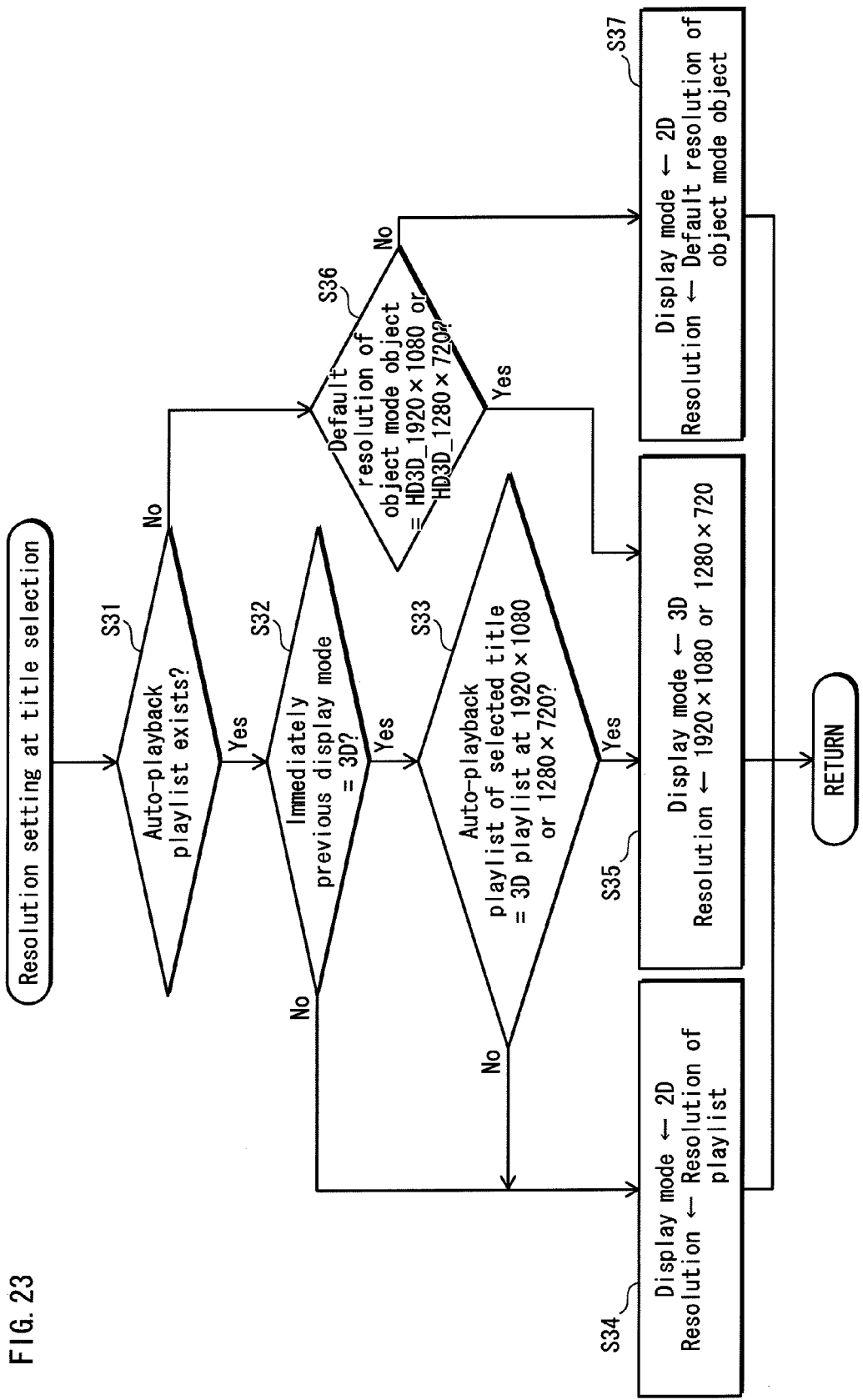
FIG. 23 is a flowchart showing one example of the procedures for setting the plane memory resolutions at the time of title switching.

FIG. 23 is a flowchart showing one example of the procedures for setting the plane memory resolutions at the time of title switching. As shown in the flowchart, Steps S34, S35 and S37 are selectively executed in accordance with the judgment results of Steps S31, S32, S33 and S36.

In Step S31, it is judged whether any auto-playback playlist exists or not. In Step S32, it is judged whether the immediately preceding display mode is a 3D display mode. In Step S33, it is judged whether or not the auto-playback playlist of the selected title is a 3D playlist with a resolution of 1920× 1080 or a 3D playlist with a resolution of 1280×720.

When no auto-playback playlist exists, it is judged in Step S36 whether the default resolution of the operation mode object is set to either HD3D_1920×1080 or HD3D_1280× 720. If the judgment of Step S36 results in Yes, the display mode is set to the 3D display mode and the resolution is set to the corresponding default resolution of 1920×1080 or 1280× 720 in Step S35. If the judgment of Step S36 results in No, then Step S37 is performed to set the display mode to 2D and the resolution to the default resolution of the operation mode object.

If no auto-playback playlist exists, Step S32 is performed to judge whether the immediately previous display mode is 2D and/or Step S33 is performed to judge whether the playlist is a 3D playlist at a resolution of either 1920×1080 or 1280× 720. If the judgment in either of Steps S32 and S33 results in No, Step S34 is performed to set the display mode to 2D and the resolution to the default resolution of the auto-playback playlist.

If the judgments in Steps S32 and S33 both result in Yes, Step S35 is performed to set the display mode to 3D and the resolution to either of 1920×1080 and 1280×720 depending on the resolution of the auto-playback playlist.

In the present embodiment, the bytecode application can use the getCurrentConfiguration method, the getBestConfiguration method, the setConfiguration method, and the setCoherentConfiguration method to access plane memories including image planes.

The getCurrentConfiguration is an API used for allowing the bytecode application to acquire the display settings of the plane memories. The getBestConfiguration method is used to return optimum setting information of the individual planes of the playback device to the bytecode application.

The setConfiguration method is used to exclusively change the settings of the plane specified by the argument.

The setCoherentConfigurations method is used for commonly setting a plurality of plane memories. For example, the setCoherentConfigurations method may be called after setting the argument to specify a resolution. As a result, all the plane memories are commonly set to the specified resolution.

Thus, at the time of starting a title, the bytecode application uses the getCurrentConfiguration method to acquire the resolution of image planes defined in the terminal management table or playlist access information of the operation mode object. Then, the bytecode application adjusts the occurrence of images to be rendered on the left and right image planes based on the acquired resolution and also adjusts the rendering position of the images. The bytecode application then issues the StereoGraphics#drawImage method.

Alternatively, the bytecode application may judge whether the resolution acquired by using the getCurrentConfiguration method is appropriate for the images to be rendered. On judging that the resolution is appropriate, the bytecode application issues the StereoGraphics#drawImage method without any adjustment.

On judging that the resolution is not appropriate, the bytecode application uses the setConfiguration method to set the image planes to an appropriate resolution and then calls the StereoGraphics#drawImage method.

Through the above steps, the bytecode application can acquire the resolution set for the image planes via an application program interface, which enables to specify an optimum rectangle region for calling the StereoGraphics#drawImage method.

As described above, according to the present embodiment, a rectangle region for image rendering is specified based on the coordinate system specified in the terminal management table and the playlist management table of the operation mode object.

(Fourth Embodiment)

A fourth embodiment of the present invention is an integration of the embodiments described above. In the present embodiment, the recording medium 100 is a BD-ROM and the playback device 200 is a BD-ROM playback device.

The present embodiment is described on the precondition that stereoscopic playback of video images stored on the BD-ROM recording medium is executed for viewing. According to the BD-ROM standard, playback of data stored on a local storage or on a removable medium in compliance with the BD-ROM standard is also possible. In view of the above, the following describes the embodiment in which the playback device 200 displays stereoscopic images stored on the above-mentioned medium and storage. Naturally, the present embodiment may be modified to be applicable to stereoscopic display of images supplied wirelessly on e.g., a broadcast wave or via a wired network such as a cable, or via another recording medium.

Figure 24:
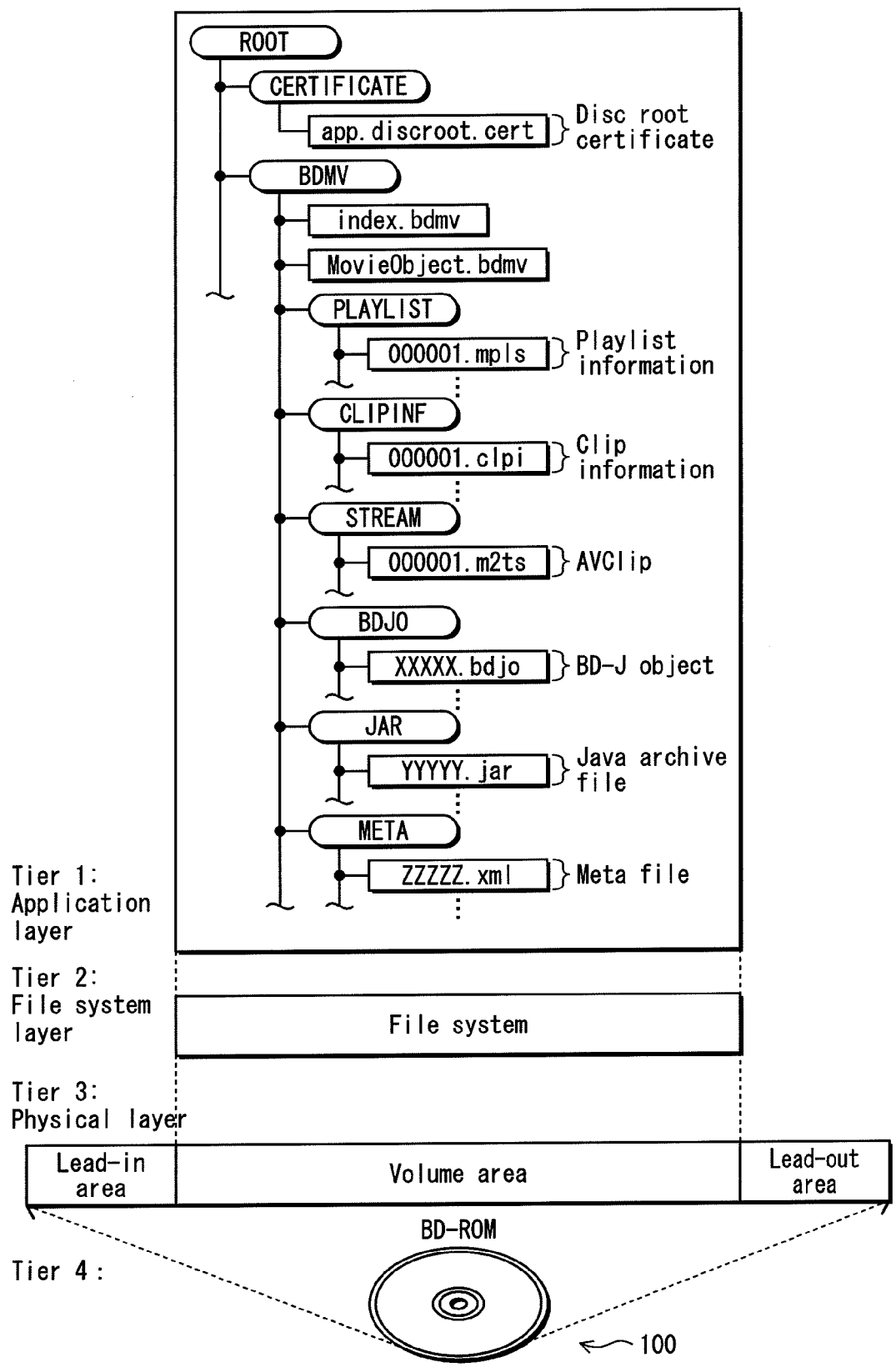
FIG. 24 shows the internal structure of a BD-ROM 100.

The following describes the internal structure of the BD-ROM 100 to be played back by the playback device 200. FIG. 24 shows the internal structure of the BD-ROM 100.

Tier 4 of FIG. 24 shows the BD-ROM, and Tier 3 shows a track on the BD-ROM. Although the track spirals outwards from the inner circumference of the BD-ROM, it is extended horizontally in the depiction in FIG. 24. The track consists of a lead-in area, a volume area and a lead-out area. In addition, a special area called a BCA (Burst Cutting Area) exists in the lead-in area. The BCA is readable only by a limited entity and therefore often used for copyright protection technology or the like.

The volume area in FIG. 24 has a layer model having a physical layer, a file system layer and an application layer. The volume area stores application data such as image data starting with file system information. The file system is UDF, ISO9660, or the like. In the same manner as a normal PC, logic data stored in the volume area is readable with use of a directory or a file structure. A file name or a directory name consisting of 255 characters can be read.

Tier 1 of FIG. 24 shows the application layer format (application format) of the BD-ROM expressed using a directory structure. As shown in Tier 1, the BD-ROM has a CERTIFICATE directory and a BDMV directory below a Root directory.

The BDMV directory is a directory in which data such as AV content and management information used in the BD-ROM are recorded. The BDMV directory has six sub-directories called a PLAYLIST directory, a CLIPINF directory, a STREAM directory, a BDJO directory, a JAR directory, and META directory. The BDMV directory stores two types of files, i.e. INDEX.BDMV and MovieObject.bdmv. The INDEX.BDMV file stores the index table described in the above embodiments, and the MovieObject.bdmv file stores a program for executing control that is compatible with DVD.

The STREAM directory is a directory for storing a file that is the body of a transport stream. A file having the extension "m2ts" (e.g., 00001.m2ts) exists in the STREAM directory.

The PLAYLIST directory is a directory for storing files each having the extension "mpls" (e.g., 00001.mpls).

The CLIPINF directory is a directory for storing file each having the extension "clpi" (e.g., 00001.clpi).

The BDJO directory is a directory for storing files each having the extension "bdjo" (e.g., XXXXX.bdjo).

The JAR directory is a directory for storing files each having the extension "jar" (e.g., YYYYY.jar).

The META directory is a directory for storing XML files (e.g., ZZZZZ.xml).

These files are described below.

First, a file having the extension "m2ts" is described. A file to which the extension "m2ts" is given stores a digital AV stream in the MPEG-TS (Transport Stream) format and is acquired by multiplexing various streams including a video stream, one or more audio streams, one or more graphics streams, and one or more text subtitle streams. The video stream represents the moving pictures of a movie, and the audio streams represent the audio of the movie.

A file to which the extension "mpls" is given stores information for the playback device to execute playlist playback. A "playlist" defines playback sections along the time axis of the transport stream (TS) and is a playback path defined by logically specifying the playback order of playback sections. More specifically, the playlist has the function of defining which part of the TS is played and in what order scenes unfold. The playlist information defines the "type" of the playlist. The playback path defined by a playlist is a so-called "multi-path" that bundles together a playback path (main-path) defined for the main AV stream and a playback path (sub-path) defined for a sub-stream. By defining a playback path for a left-eye video stream as the main path, and a playback path for a right-eye video stream as the sub-path, a multi-path that is suitable for stereoscopic playback of video streams is defined.

Chapter points are defined on the playback time axis of such a multi-path. By referring to the chapter points, the playback device is enabled to randomly access an arbitrary playback point in the time axis of the multi-path. A Java™ application for playback control instructs a Java™ virtual machine to create a JMF player instance for playback of the playlist information, so that the multi-path AV playback is started. The JMF (Java Media Frame work) player instance refers to actual data created from the JMF player class on the heap memory of the virtual machine.

A file to which the extension "clpi" stores Clip information. Files with the extension "clpi" are provided in one-to-one correspondence with MPEG2 stream files. With the Clip information, a corresponding stream file is managed as an "AV Clip". The Clip information has information on the encoding format, frame rate, bit rate, resolution, etc. of the stream in the AVClip, as well as an EP_map showing the starting point of GOPs. By loading the Clip information to the memory prior to access to a corresponding stream file, the playback device is informed of the transport stream contained in the stream file to be accessed. The Clip information and playlist information are classified as "static scenario".

A file to which the extension "BDJO" is given is a file storing a BD-J object. A BD-J object refers to an operation mode object described in the above embodiments and includes various pieces of information used for execution of a BD-Java application. According to the BD-ROM standard, an application program may be executed during video playback to handle any given computing during video playback. For example, dynamic playback control, interactivity with the user during playback, and so on are realized. The BD-ROM adopts Java™ as the application platform standard and the Java™ platform adopted according to the BD-ROM standard is referred to as BD-Java or BD-J and an execution application is referred to as a BD-Java application or a BD-J application.

A JAR file is an archive file containing a file of a BD-J application class structure (class file) combined with a digital certificate manifest file, a disc signature file, and disc signature encryption key file, and a permission request file. The above-described loading of application cache information to a cache is done collectively in the unit of a JAR file.

The following describes data elements archived into the JAR file.

(i) The BD-J application defined by the class structure file is a Java™ Xlet that is controlled via an Xlet interface by the application manager included in the platform. The Xlet interface has four states, "loaded," "paused," "active," and "destroyed," and is event driven, i.e. changes state and performs control in accordance with events. A key event that triggers operation of an application is prerecorded in the Xlet interface. Key events that triggers operation are registered in this way by an event listener.

(ii) The digital certificate manifest file corresponds to a digital certificate and contains information describing the attributes of the Java™ archive file and hash values of class files and data files in the Java™ archive file.

(iii) The disc signature file stores the hash value of the manifest file.

(iv) The disc signature encryption key file stores a "digital certificate chain" and the "signature information" of signature file.

The "signature information" is obtained by applying a signature process to the digital signature file. The signature process employs a secrete key paired with a public key used for the digital certificate chain contained in the digital signature file.

The "digital certificate chain" refers to a chain of a plurality of certificates in which the first certificate (root certificate) signs the second certificate and n-th certificate signs the (n+1)-th certificate. The last certificate in the digital certificate chain is referred to as a "leaf certificate". With this configuration, each certificate starting from the root certificate verifies the next certificate, so that all the certificates in the digital certificate chain are verified.

(v) The permission request file contains information indicating permissions given to the Java™ application to be executed. More specifically, credential (digital credential certificate) and the permission information regarding application-to-application communications.

The "credential" is information used for sharing files stored in an organization directory belonging to a specific organization. The files are shared by giving the right to use the files for an application belonging to a specific organization to an application belonging to another organization. For this purpose, the credential contains a provider organization ID identifying the organization that provides the usage right and a recipient organization ID identifying the organization that receives the right.

(vi) In addition to the files described above, a PNG file is stored. The PNG file is a data structure defining a rendering image. According to the present embodiment, a data structure defining a rendering image may be contained in the JAR file together with the class structure of the BD-J application and thus loaded collectively.

The class file defining the BD-J application is collectively loaded with the signature file, manifest file, digital certificate chain and permission request file described above. Therefore, before executing the BD-J application, the playback device can sign the BD-J application using the manifest file, digital certificate chain and permission request file. Note that a BD-J application that is signed by using the manifest file, digital certificate chain and permission request file is referred so as a "signed application." On the other hand, a BD-J application that is not signed and thus part or all of the functionality is limited is referred to as "unsigned application". By the signing described above, operation of the BD-J application is limited not to be disadvantages for content creation. With the use of the permission request file described above, only limited BD-J applications having specific right assigned are permitted to render images with the use of the StereoGraphics#drawImage method as well as to write other images on the plane memory for realizing stereoscopic playback.

A metafile (ZZZZZ.xml) stored in the META directory contains various information related to a movie stored on the disc. Examples of the information contained in the metafile include the name of the disc, an image of the disc, and the name of the creator of the disc, and the name of each title.

This concludes the description of the BDMV directory.

The CERTIFICATE directory stores a file of the disc root certificate (app.discroot.cert).

This file contains information about a digital certificate that is used in a process (herein after, "signature verification") to confirm that the BD-J application has not been tampered with and to authenticate the identify of the BD-J application.

This concludes the description of the BD-ROM 100. Some or the files including the metafile are not necessarily essential. Playback of the BD-ROM 100 as a video recording medium is duly possible according to the BD-ROM standard, even without one or more of the files described above.

Next, the playback device 200 according to the present embodiment is described in detail.

Figure 25:
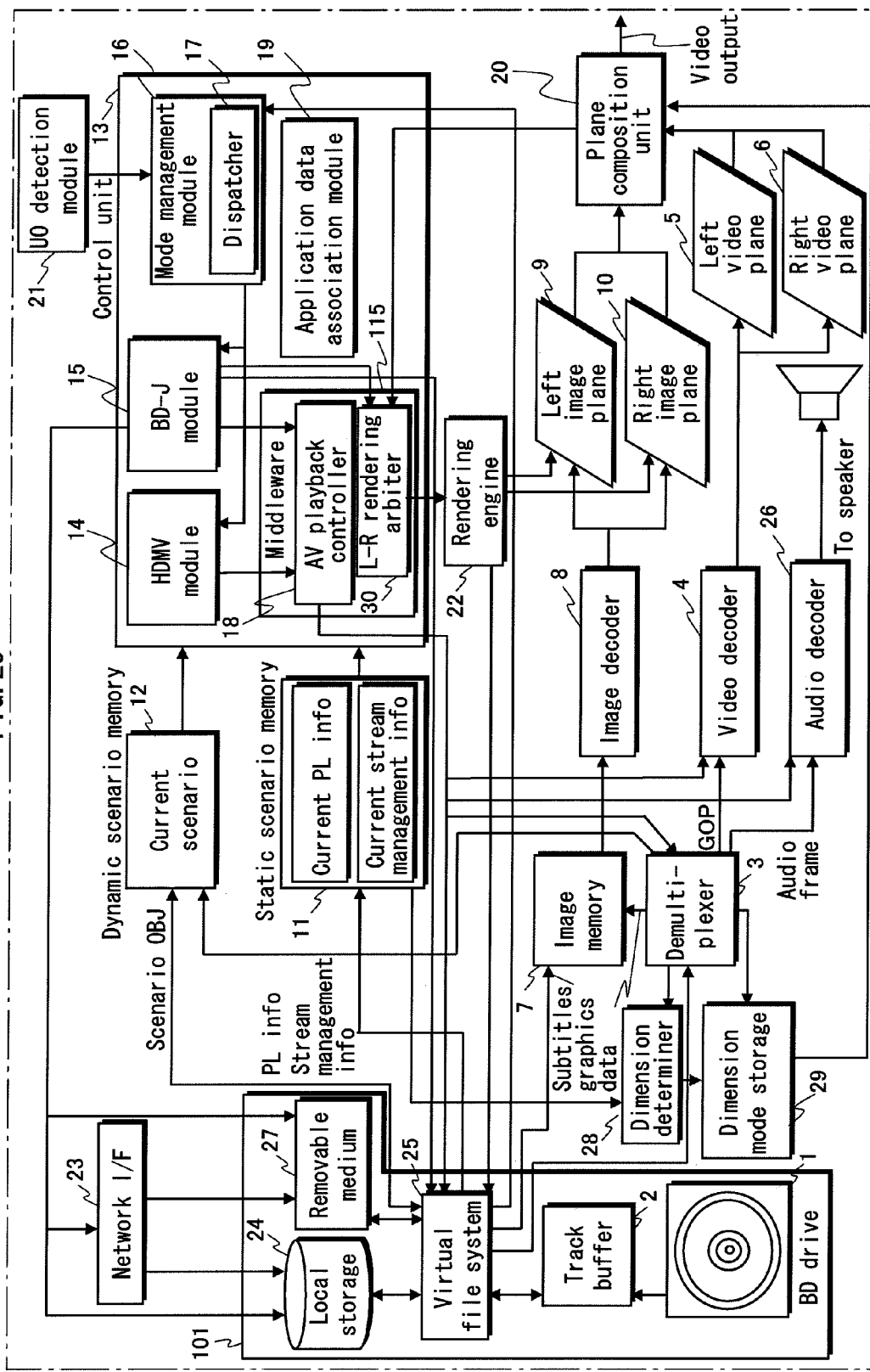
FIG. 25 is a block diagram showing the internal structure of a playback device according to a fourth embodiment.

FIG. 25 is a block diagram showing the internal structure of the playback device according to the fourth embodiment. As shown in FIG. 25, the playback device includes a BD drive 1, a track buffer 2, a demultiplexer 3, a video decoder 4, a left video plane 5, a right video plane 6, an image memory 7, an image decoder 8, the left image plane 9, the right image plane 10, a static scenario memory 11, a dynamic scenario memory 12, a control unit 13, an HDMV module 14, a BD-J module 15, a mode management module 16, a dispatcher 17, an AV playback control engine 18, an application data association module 19, a plane composition unit 20, a UO detection module 21, a rendering engine 22, a network interface 23, a local storage 24, a virtual file system 25, an audio decoder 26, a removable medium 27, a dimension determiner 28, a dimension mode storage 29, and a left-and-right rendering arbiter 30 (herein after L-R rendering arbiter 30).

The BD-ROM drive 1 loads/ejects the BD-ROM and performs an access to the BD-ROM.

The track buffer 2 is FIFO memory and stores source packets of a digital stream read from BD-ROM in the first-in first-out order.

The demultiplexer 3 demultiplexes transport streams recorded on either of the local storage 24 and the removable medium 27 which ever is currently loaded in the BD-ROM drive 1. As a result of demultiplexing, the demultiplexer 3 acquires video frames constituting GOPs, audio frames, a graphics stream, and scenario information. The video frames are output to the video decoder 4. The audio frames to be played in synchronism with the GOPs are output to the audio decoder 26. The graphics stream is stored to the image memory 7. The scenario information is stored to the dynamic scenario memory 12. Demultiplexing by the demultiplexer 3 involves the process of converting TS packets into PES packets. In addition, the demultiplexer 3 switches between the process for stereoscopic viewing (3D) and the process for 2D viewing.

The video decoder 4 is a decoder compliant with the modified MPEG-4 AVC/H.264 standard called Multiview Video Coding (MVC) and decodes a video stream having been coded according to MPEG-4 AVC, by way of motion prediction using the similarity between video images in a time sequence or between left and right video images.

Each of the left video plane 5 and the right video plane 6 is memory for storing an uncompressed picture obtained as a result of decoding by the video decoder 4. The left video plane 5 stores a video picture for left eye, where as the right video plane 6 stores a video picture for right eye.

The image memory 7 is a buffer for storing a graphics stream, subtitle data, and image data such as a picture image, read via the virtual file system 25 on the BD-J terminal.

The image decoder 8 decodes the graphics stream, subtitle data or image data stored on the image memory 7 and writes uncompressed data obtained by the decoding to the left and right image planes 9 and 10.

Each of the left and right image planes 9 and 10 is plane memory referred to as a GFX plane on the BD-J terminal and stores a corresponding piece of image data for left eye or for right eye in uncompressed format. The BD-ROM provides data for a plurality of image planes and the planes are separately overlaid with a video plane. Specific examples include the graphics stream, subtitle data, and image data that are output from the image decoder 8, image data generated as a result of the rendering process by the rendering engine 22, and a plane for background (still) image, which is not illustrated in the figure. Yet, in order to simplify the description, the present embodiment is described on the precondition that that there is one image plane. In addition, the following description focuses on the rendering process performed by the rendering engine 22.

The static scenario memory 11 is used to store a current playlist and current stream management information. The current playlist refers to one of the PLs that can be read via the virtual file system 25 and that is currently processed. The current stream management information refers to a piece of stream management information that is currently processed, out of the plurality of pieces of stream management information that are readable via the virtual file system 25.

The dynamic scenario memory 12 is used to store a current dynamic scenario and used for processing by the HDMV module 14 and the BD-J module 15. The current dynamic scenario refers to a dynamic scenario that is currently processed, out of the plurality of dynamic scenarios that are readable via the virtual file system 25.

The control unit 13 is a microcomputer system composed of ROM, RAM, and a CPU. The ROM stores a program controlling the playback device. The program in the ROM is read into the CPU, and by cooperating with the hardware resources, the program implements the functions the HDMV module 14, the BD-J module 15, the mode management module 16, the dispatcher 17, the AV playback control engine 18, the application data association module 19 and the L-R rendering arbiter 30.

The HDMV module 14 is a virtual player for DVD videos. The term DMV (High Definition Movie Mode) refers to a playback format that is compatible with DVD playback.

The BD-J module 15 is a module that implements the functions of some components of the platform unit described in the first embodiment. More specifically, the BD-J module 15 implements the functions of the heap memory 111, the bytecode interpreter 112, the class loader 113 and the application manager 114 and executes an BD-J application.

The mode management module 16 holds the mode management table read via the virtual file system 25 and handles the mode management and branch control. In the mode management by the mode management module 16, module allocation is performed to decide which of the HDMV module 14 and the BD-J module 15 is to execute a dynamic scenario.

The dispatcher 17 selects user operation (herein after may be referred to as "UO") appropriate in the current mode of the playback device, from among UOs received from the UO detection module 21 and passes the selected UOs to the module assigned to execute in the mode. Suppose, for example, when UOs for up, down, right, and left movements and for activation are received in the HDMV mode, the dispatcher 17 outputs the UOs to the HDMV mode module.

The AV playback control engine 18 executes AV playback functions and the playlist playback functions in response to a call from the HDMV module 14 or the BD-J module 15. AV playback functions are a function group inherited from DVD players and CD players, i.e. processing such as starting and stopping playback, pause, un-pause, cancel still picture function, fast forward at an indicated playback rate, rewind at an indicated playback rate, audio switching, sub-video switching, angle switching, etc. Playlist playback functions refer to starting or pausing playback in accordance with the playlist information.

The application data association module 19 generates and updates application data association information, based on information read via the virtual file system 25, results of computation within the playback device and the attribute information set by the application.

The UO detection module 21 accepts user operations (UOs) that the viewer made on the playback device. Such UOs may be made remotely on e.g., the remote controller or directly on the playback device via an interface such as a button provided on the playback device.

The plane composition unit 20 composites uncompressed picture data stored on either of the left video plane 5 and the right video plane 6 with the image data stored on a corresponding one of the left image plane 9 and the right image plane 10 and sequentially outputs composite images. In addition, upon completion of the composition for one plane, the plane composition unit 20 issues a composition completion notification to the L-R rendering arbiter 30. The composition completion notification indicates which of the left and right planes is completed.

The rendering engine 22 performs the process of rendering images on the left image plane 9 and the right image plane 10. The BD-J module 15 is provided with a library of rendering processes to be performed by the rendering engine 22 on the left image plane 9 and the right image plane 10. The rendering processes include the rendering of lines or an object such as a rectangle with a specified color, filling of a specified region, and copy and paste of a specified image. By continuously issuing requests for the rendering processes, the BD-J application realizes rendering of various graphics.

The network interface 23 is used for downloading BD-ROM supplemental contents publicly available on the Internet. Supplemental BD-ROM contents are contents not on the original BD-ROM, such as supplemental sub-audio, subtitles, bonus video, applications, etc. The BD-J module 15 controls the network interface 23, so that a supplemental content released on the Internet is downloaded to the local storage 24 or the removable medium 27.

The local storage 24 is a magnetic recording device, such as a hard disk, built into the playback device and stores various data used for the transport stream and playback in the file format of the BD-ROM 100 or in a compatible file format. The virtual file system 25 is a file system that provides the functionality of reading and writing files stored on the BD-ROM 100, the local storage 24, and the removable medium 27.

Usually, the playback device is required to access files on the BD-ROM 100 for executing playback of the BD-ROM. Yet, the virtual file system 25 provides the functionality of virtually converting file address so that files on the local storage 24 and the removable medium 27 are accessed as if they are stored on the BD-ROM 100. That is, the virtual file system 25 provides the functionality for implementing the abstraction of the physical recording medium.

The audio decoder 26 decodes audio frames output from the demultiplexer 3 into uncompressed audio data and outputs the uncompressed audio data.

The removable medium 27 is a storage medium that is inserted into an external slot attached to the playback device. A typical example of the storage medium may be a flash medium such as an SD card. Alternatively, a USB memory, removable hard disk, and any other storage medium may be used.

The dimension determiner 28 judges whether a video to be played back is for stereoscopic viewing (3D) or for 2D and outputs the result of judgment to the dimension mode storage 29. The current playlist or the current stream may contain a flag indicating whether the video supports stereoscopic viewing (3D). In that case, the dimension determiner 28 makes the judgment with reference to the flag. Alternatively, the judgment may be switched according to the specification of the user of the playback device.

The dimension mode storage 29 stores information indicating whether the video currently played is for stereoscopic viewing (3D) or for 2D.

The L-R rendering arbiter 30 is a component of the middleware 115 and divides the rendering requests that are continually issued by the BD-J module 15 into those for the left image plane 9 and for the right image plane 10. It is assumed that a typical BD-J application that renders stereoscopic graphics continuously repeats the process of rendering images of an object as seen from the left eye on the left image plane 9 and an image of the same object as seen from the right eye on the right image plane 10. In view of this assumption, the L-R rendering arbiter 30 extracts pairs of rendering requests each corresponding to the rendering processes of a stereo pair of images and controls the rendering engine 22 with respect to the timing and order of the rendering processes to ensure that the plane composition unit 20 does not output a video image causing visual inconsistency between the right eye and left eye. As a result, tearing of the stereoscopic image is suppressed.

The specific method for dividing the rendering requests into pairs and control of the rendering engine 22 for the rendering process is described later.

The following description of the present embodiment is given on the precondition that each playlist contains a dimension identifying flag identifying whether the playlist is for 2D playback or 3D playback.

First, how the playback device produces 3D images is described with reference to FIG. 25 showing the structure of the playback device. The BD-ROM may store separate streams one for left eye or another for right eye (herein after, "L-stream" and "R stream"). Alternatively, the BD-ROM may store one stream file in which L and R streams are emended under a specific rule. In the present embodiment, L and R streams are embedded into one stream file.

The demultiplexer 3 separate the R-stream and L-stream with reference to the header information.

According to the present embodiment, the playback device 200 includes a pair of video decoders, the left video plane 5, which is a video plane for left eye, and the right video plane 6, which is a video plane for right eye. To output stereoscopic video images, the pair of video decoders alternately process images for left eye and right eye and outputs the processed images alternately to a corresponding one of the left video plane 5 and the right video plane 6.

Figure 26:
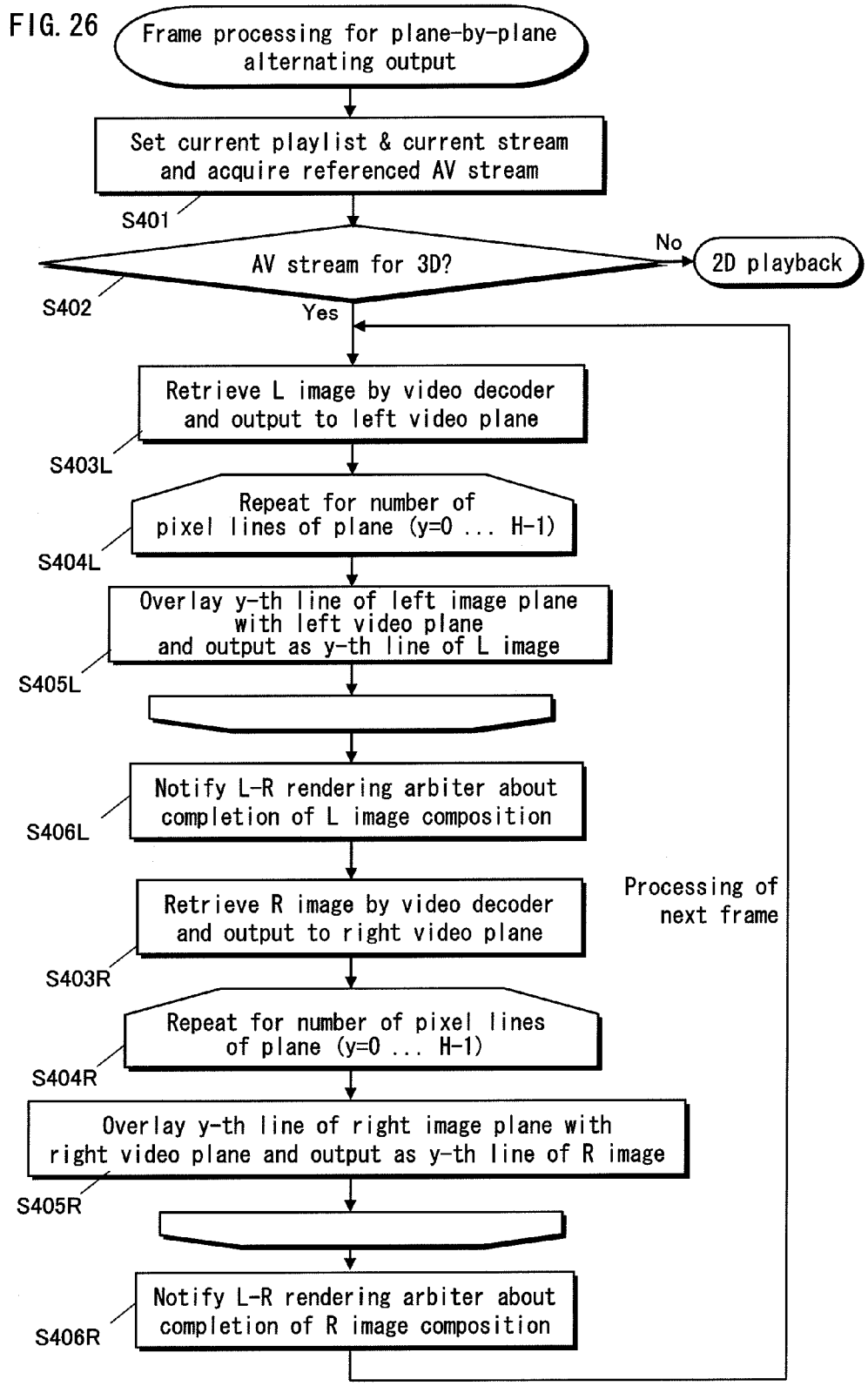
FIG. 26 is a flowchart showing the procedure for frame processing for the alternate output of the left and right planes.

Upon receipt of a playback instruction, the playback device 200 starts the processing shown in FIG. 26. A playback instruction is given in various ways. For example, a playback instruction is given in response to a user operation (a push of a playback button, for example) specifying playback time. Also, a playback instruction is given automatically upon insertion of the BD-ROM 100 to the playback device. Also, a playback instruction is given automatically according to settings of the playback device made, for example, by the BD-J module. In the present embodiment, a playback instruction is given in any appropriate way.

FIG. 26 is a flowchart showing the procedure for frame processing for the alternate output of the left and right planes. The frame processing is to read data from the video plane and the image plane during a frame period of the video signal and output the read data after overlaying. Since the writing processing conducted by the middleware on the mage planes has been described already in the first to third embodiments, the present embodiment mainly describes the reading of data from the image planes and video planes to the composition unit.

In Step S401, the AV playback control unit 18 extracts a playlist and a transport stream each specified as a current playback target, from among one or more playlists and a plurality of streams read via the virtual file system 25. The extracted playlist is set as the current playlist (PL) information, and the extracted transport stream is set as the current stream management information.

Also, the demultiplexer 3 obtains the transport stream targeted for processing with reference to current playlist information held in the static scenario memory 11.

In Step S402, the demultiplexer 3 obtains a dimension identifying flag from the current playlist information held in the static scenario memory 11, passes the flag to the dimension determiner 28, and obtains a result of judgment as to whether the stream to be played back is for 2D or for 3D.

If the judgment result shows that the stream is for 2D, 2D video images are started to be output. In this case, typically L- and R-images in a pair are identical, or even if the paired images differ from each other, either image is discarded and not displayed. Therefore, the playback processing is performed in the same manner as a conventional BD-ROM playback. In one exemplary configuration, the video plane to which 2D video images are output is limited to the left video plane 5, the image plane to which images are output from the image decoder 8 and the rendering engine 22 is limited to the left image plane 9. Naturally, the video and image planes used by the plane composition unit 20 to produce composite images are limited to the left video plane 5 and the left image plane 9.

If the judgment results shows that the stream is for 3D in step S402, 3D video playback is started.

In the present invention, the playback device 200 sequentially outputs images for the left eye (L-images) and images for the right eye (R-image) alternately one by one through the plane composition unit 20.

Once 3D video playback is started, the playback device 200 generates L-images and R-images in Steps S403L and onwards. L images are generated through Steps S403L, S404L, S405L, and S406L, and R-images are generated through Steps S403R, S404R, S405R, and S406R.

In Step S403L, the video decoder retrieves a video picture for left eye from transport streams targeted for the processing, and outputs the retrieved video picture to the left video plane 5.

Next, in Steps S404L and S405L, the plane composition unit 20 overlays the video picture stored on the left video plane 5 with image data stored on the left image plane 9 for the entire plane.

It is presumed here that the resolutions of the left video plane 5 and the left image plane 9 are the same, and both planes are W pixels wide by H pixels high. The composition processing is performed line by line from the top line (y=0) to the last line (y=H−1). More specifically, the y-th line of the L image is generated by overlaying the y-th line of the left image plane 9 on the y-th line of the left video plane 5. Ultimately, the lines of the entire images are overlaid and output as a complete composite image.

Upon completion of the composition of the entire plane, the plane composition unit 20 notifies the left-and-right rendering arbiter 30 about the completion of the L image composition in Step S406L.

Subsequently, R-image is generated in Steps S403R, S404R, S405R, and S406R. Yet, description thereof is omitted, because the steps are identical to steps S403L, S404L, S405L, and S406L.

This concludes the description of the generation and output of L-images and R-images in this embodiment.

In this configuration, image data stored on the left image plane 9 and an image stored on the right image plane 10 are alternately transmitted to the plane composition unit 20, starting with the image data stored on the left image plane 9.

Suppose, for example, that the rendering engine 22 rewrites images stored on the left image plane 9 and the right image plane 10 at the timing of Step S406L in which the entire image data stored on the left image plane 9 is transmitted. In this case, the R-image transmitted to the plane composition unit later in Step S403R reflects the rewriting.

On the other hand, the L-image transmitted before the rewriting to the plane composition unit does not reflect the rewriting, which results in inconsistency between the L-image and R-image as only the R-image reflects the rewriting.

Figure 27:
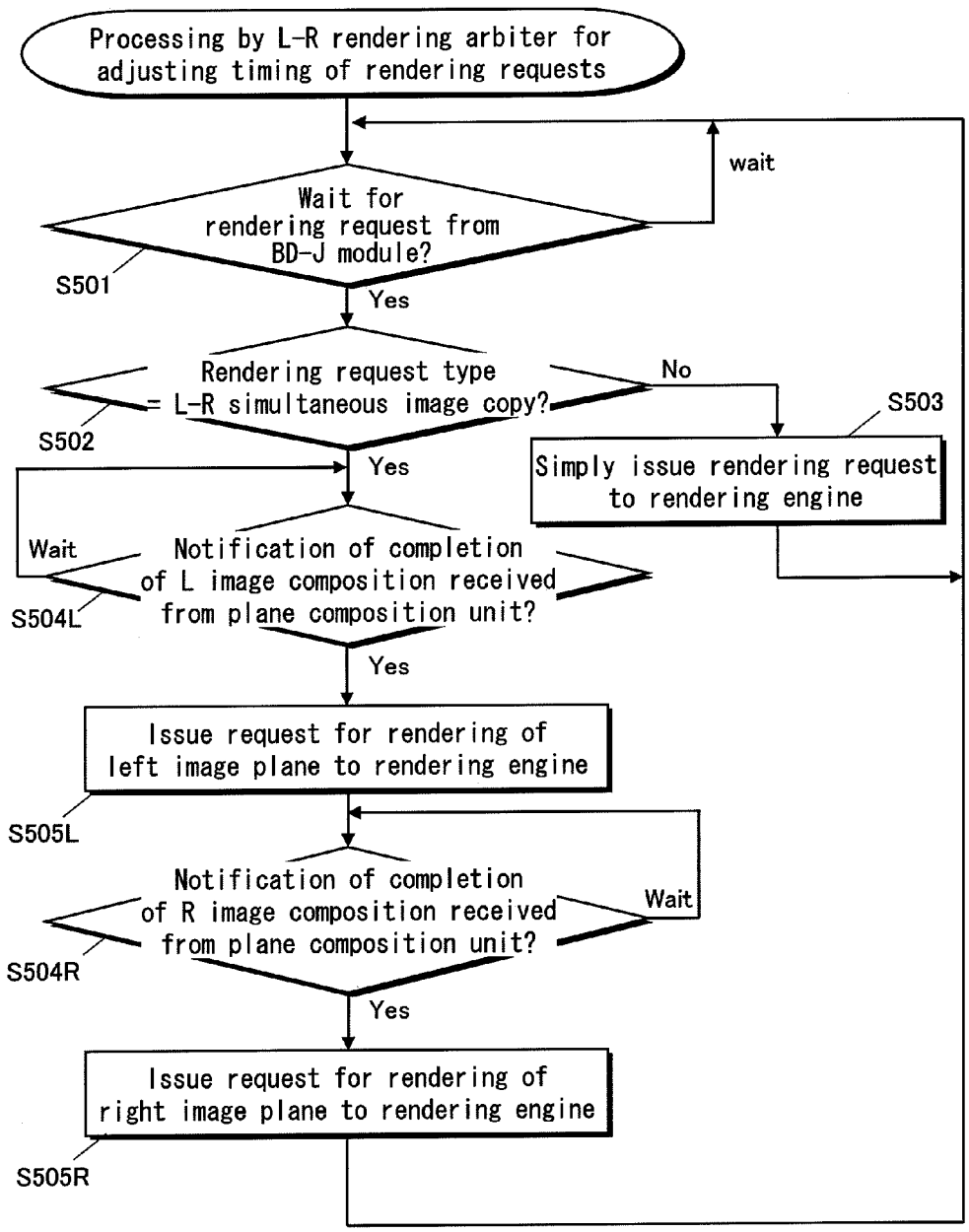
FIG. 27 is a flowchart showing the procedure performed by an L-R rendering arbiter 30 for adjusting the timing for issuing rendering requests.

In order to avoid the occurrence of such inconsistency, the present embodiment is configured to adjust the processing timing of the rendering engine 22 through the procedure shown in the flowchart in FIG. 27.

FIG. 27 is a flowchart showing the procedure performed by the L-R rendering arbiter 30 for adjusting the timing for issuing rendering requests.

In Step S501, the L-R rendering arbiter 30 waits for the BD-J module 15 to issue a rendering request in response to a rendering instruction given from the BD-J application. In step S502, the L-R rendering arbiter 30 judges whether the rendering Request received in Step S501 has the type information indicating the "L-R simultaneous image copy" described in the first embodiment.

If the type of the rendering request is not "L-R simultaneous image copy", the L-R rendering arbiter 30 moves onto Step S503 to issue a rendering request to the rendering engine 22 without any timing adjustment. Since this process is the same as a conventional process by the BD-J module 15, no description is given here.

If the type information of the rendering request is the "L-R simultaneous image copy", the L-R rendering arbiter 30 moves onto Steps S504L and onwards. When a rendering request of the "L-R simultaneous image copy" is issued, it is expected that the pair of left and right images to be rendered are of the same object as seen from the right and as seen from the left. Therefore, it is necessary to ensure that the two images resulting from the simultaneous image copying are processed by the plane composition unit 20 as a set of images to be output in the same frame. Otherwise, there will be inconsistency between left and right images.

To this end, in Step S504L, the L-R rendering arbiter 30 waits for a notification about completion of the composition of an L-image (i.e., the notification issued in Step S406L in FIG. 26) is received from the plane composition unit 20. Upon receiving the notification, the L-R rendering arbiter 30 issues to the rendering engine 22 a rendering request of image copying to the left image plane 9 in Step S505L. Through these steps, it is ensured that the image copied to the left image plane 9 in the "L-R simultaneous image copy" is used in the video image output in the next frame, on condition that the hardware employed is capable of image copying at a sufficiently high speed (more specifically, the hardware is capable of completing the image copying within about 0.5 frame period, which is a time period taken by the plane composition unit 20 to complete the composition of an R-image).

Similarly to the steps relating to the L-image, in step S504R, the L-R rendering arbiter 30 waits for a notification about completion of the composition of an R-image (i.e., the notification issued in Step S406R in FIG. 26) is received from the plane composition unit 20. Upon receiving the notification, the L-R rendering arbiter 30 issues to the rendering engine 22 a rendering request of image copying to the right image plane 10 in Step S505R. Through these steps, it is ensured that the image copied to the right image plane 10 in the "L-R simultaneous image copy" is used in the video image output in the next frame in FIG. 26.

With the procedure described above, the two images copied through the "L-R simultaneous image copy" are used by the plane composition unit 20 to be reflected in the same frame, and thereby the occurrence of flickering resulting from inconsistency between L-image and R-image is prevented.

Note that according to the present embodiment, the L-R rendering arbiter 30 waits for a composition completion notification in Steps S504L and S504R. Note that the number of times that "L-R simultaneous image copy" is performed is limited to one per frame. In the case where images for one frame are rendered in response to a plurality of rendering requests in combination, an interim image is stored on the "buffered image" described above and the ultimate copying to the left and right image planes is performed by executing "L-R simultaneous image copy" one time. This method is frequently used in executing a conventional BD-J application to prevent flickering.

In this embodiment, only the "L-R simultaneous image copy" is described to be processed in Steps S504L and onwards. As for the other rendering requests, the conventional processing is performed, so that occurrence of tearing is possible. However, the present embodiment may be modified to perform additional processing, such as "L-R simultaneous rectangle fill", in Steps S504L and onwards. With this modification, a wider variety of rendering processes are ensured to prevent occurrence of tearing.

In addition, a further modification may be made to implement forced copying at the time of the mode switching from 3D to 2D. More specifically, if the judgment in Step S402 shows that the stream is for 2D playback, video images in the 2D mode are output only to the left video plane 5, and the rendering engine 22 performs the rendering of the left image plane 9 only, and the plane composition unit 20 performs composition of the combination of the left video plane 5 and the left image plane 9 only, as has been described above.

At this time, suppose that playback of the 2D stream is ended and playback of a 3D stream started subsequently. During playback of the 2D stream, the BD-J application operates as an application for 2D rendering. That is, images are rendered only on the left image plane 9, where as the right image plane 10 entirely remains in black, for example. If the playback mode is switched to 3D stream with this state, the plane composition unit 20 outputs data stored on the right image plane 10 in Steps S404R and S405R, although no image is rendered thereon. The BD-J application is expected to start operating as an application for 3D rendering immediately upon the switching the 3D mode. However, if there is a time lag between the switching from the 2D modes to the 3D mode, tearing occurs because the R image that is entirely black is momentary output.

In order to avoid the occurrence of such tearing, the data stored on the left image plane 9 is forcibly copied to the right image plane 10 at a timing when an operation of the plane composition unit 20 is switched from the 2D mode to the 3D mode.

The copying performed at the timing of switching as described above is effective to prevent occurrence of this kind of tearing in the case of switching from a 2D stream to a 3D stream. In addition, the copying is also effective in the case where the operation mode of the BD-J module is switched from the 2D mode to the 3D mode, provided that the BD-J module has the functionality of separately switching the operation mode from the 2D mode to the 3D mode. In this way, regardless of the functionality implemented by a BD-J application, this kind of tearing can be prevented from occurring.

Further, in the case where the BD-J module supports the "1 plane+Offset" mode of rendering 3D images with the use of the left image plane 9 only, inconsistency between L-image and R-image is eliminated by performing the copying process and the shifting process.

In the "1 plane+Offset" mode, both L-image and R-image are rendered on the left image plane 9 but an L-image is rendered at a position entirely shifted to the left by n pixels and an R-image is rendered at a position entirely shifted to the right by n pixels. In this way, the composite image on the left image plane 9 is displayed to appear closer or further away from the viewer. In this "1 plane+Offset" mode, the image data stored on the left image plane 9 is copied to the right image plane 10 after the image stored on the left image plane 9 is shifted to the right by n pixels. The image on the left image plane 9 is then shifted to the left by n pixels after the copying. This arrangement ensures that the L- and R-images output before and after the rendering mode switching are consistent, so that occurrence of tearing is prevented.

The process of shifting and copying described above is effective when the "1 plane+Offset" mode is switched to the 3D rendering mode in which both the left and right image planes are used.

This concludes the description of the embodiments of the stereoscopic video display method according to the present invention.

(Fifth Embodiment)

In a fifth embodiment of the present invention, another embodiment of the plane composition unit 20 and the L-R rendering arbiter 30 is described.

The components other than the plane composition unit 20 and the L-R rendering arbiter 30 are the same as the corresponding components described in the fourth embodiment. Thus, the description of such components are omitted and only different parts are described.

Figure 28:
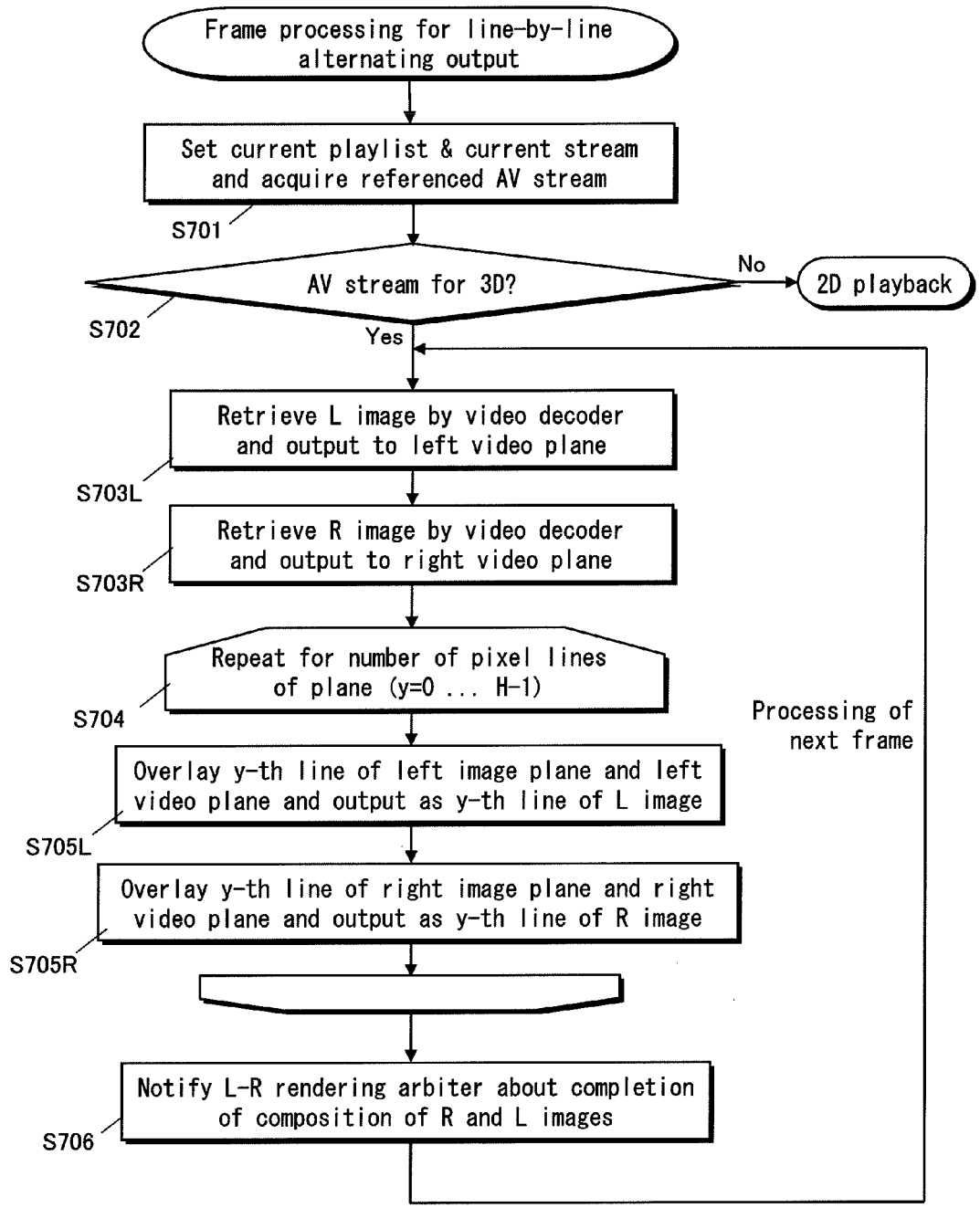
FIG. 28 is a flowchart showing the procedure for the frame process in which an R-image and an L-image are alternately output line by line.

FIG. 28 is a flowchart showing the procedure for the frame process in which an R-image and an L-image are alternately output line by line.

Steps S701 and S702 are the same as Steps S401 and S402 shown in FIG. 26. If the judgment in Step S702 shows that the stream is for 3D, playback of 3D video images is started.

After the 3D video playback is started, the playback device 200 generates an L-image and an R-image in Steps S703L and onwards. More specifically, first in Step S703L and S703R, the video decoder extracts video pictures for left eye and for right eye from the currently processed transport stream and outputs the respective pictures to an appropriate one of the left video plane 5 and the right video plane 6.

Then, in the loop starting with Step S704, the plane composition unit 20 composites the entire image data stored on the left plane with the entire image data stored on the firth plane.

It is presumed here that the resolutions of the left and right video planes as well as of the left and right image planes are the same. That is, each plane is W pixels wide by H pixels high. In this case, the composition processing is performed line by line from the top line (y=0) to the bottom line (y=H–1).

In the line-by-line processing, Step S705L is performed first in which the y-th line of the image stored on the left video plane 5 is overlaid with the y-th line of the image stored on the left image plane 9 to produce the y-th line of the composite L-image to make final output.

Next, in Step S705R, the y-th line of the image stored on the right video plane 6 is overlaid with the y-th line of the image stored on the right image plane 10 to produce the y-th line of the composite R-image image to make final output. Although the line-by-line processing is described to be performed sequentially from the top line to the bottom line, the processing may be performed in different order, for example, in the order starting from the bottom to the top. In addition, although the resolutions of the video planes and the image planes are described to be the same, they may be different.

Upon completion of the composition processing of the entire plane, the plane composition unit 20 issues a notification to the L-R rendering arbiter 30 in Step S706 to inform that the composition processing of both L-image and R-image has been completed.

This concludes the description of the processing for displaying stereoscopic video images according to this embodiment.

In this configuration, image data stored on the left image plane 9 and image data stored on the right image plane 10 are alternately transmitted line by line in this order to the plane composition 20. In other words, the images on the respective planes are transmitted in parallel when one frame is considered as a unit.

Suppose, for example, that a BD-J application renders a pair of images of the same object, one as seen from the left and the other as seen from the right, in the order starting with the image as seen from the left. In this case, the rendering engine 22 first rewrites an image stored on the left image plane 9. However, if the L-image and R-image are output at this stage, the L-image reflects the rewriting of the left image plane 9, where as the R-image remains unwritten since the right image plane 10 is not rewritten yet. Thus, there is inconsistency between the L-image and R-image.

Figure 29:
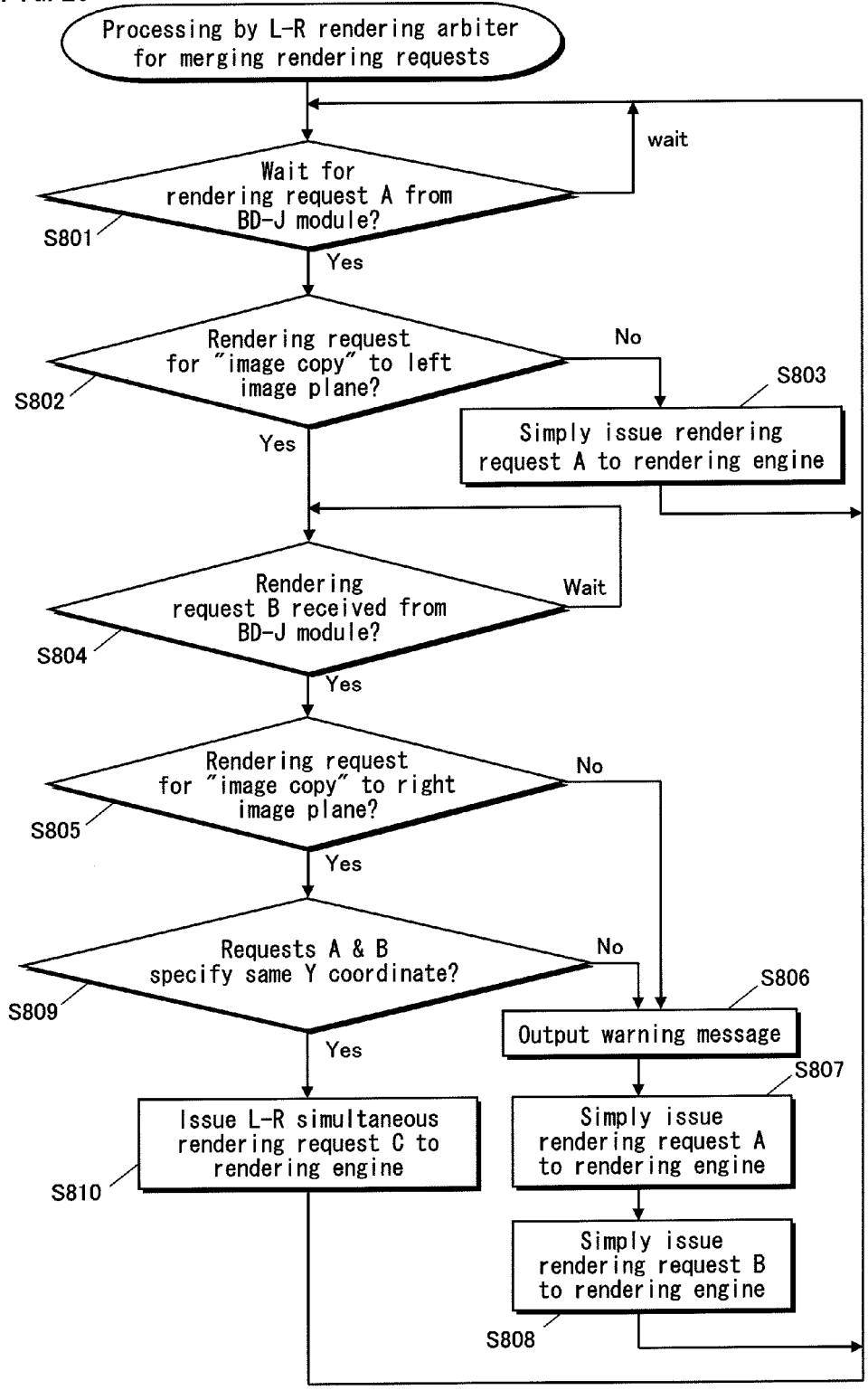
FIG. 29 is a flowchart showing the procedure involving merging of rendering requests performed by the L-R rendering arbiter 30.

In order to avoid displaying such inconsistent images, the L-R rendering arbiter 30 according to the present embodiment performs the procedure shown in FIG. 29 to control the order of processes to be performed by the rendering engine 22. FIG. 29 is a flowchart showing the procedure performed by the L-R rendering arbiter 30 for merging rendering requests into one.

First, in step S801, the L-R rendering arbiter 30 waits until the BD-J module 15 issues a rendering request A in response to a rendering instruction given by the BD-J application. The rendering request issued herein has the same configuration as that described in the previous embodiment.

Next, in Step S802, the L-R rendering arbiter 30 judges whether the rendering request A received in step S801 has the type information indicating "image copy" or not, and in addition, whether the rendering is to be performed on the left image plane 9 or not.

If the conditions in Step S802 are not satisfied, Step S803 is performed in which the L-R rendering arbiter 30 simply issues the rendering request A to the rendering engine 22. That is, the processing performed in Step S803 is the same as conventional processing by the BD-J module 15. Thus, no relevant description is given here.

If the conditions in Step S802 are both satisfied, the L-R rendering arbiter 30 does not issue the rendering request A at this stage and waits until the BD-J module 15 issues a rendering request B in the subsequent step, which is Step S804.

In Step S805, the L-R rendering arbiter 30 judges whether the rendering request B received in Step S804 has the type information indicating "image copying" and specifying the right image plane 10 as the plane on which the image is to be rendered.

If the conditions in Step S805 are both satisfied, Step S809 is performed next. In Step S5809, the rendering position for image copying as specified by the rendering request A is compared with the rendering position for image copying as specified by the rendering request B. More specifically, it is judged whether the values of y1 and y2 each indicating the Y coordinate of a rectangle area matches or not.

It is assumed that a typical BD-J application that renders stereoscopic graphics continuously repeats the process of rendering an image of an object as seen from the left eye on the left image plane 9 and an image of the same object as seen from the right eye on the right image plane 10. It is also assumed that the respective rendering images have the same Y coordinate but different X coordinates shifted by the amount corresponding to the binocular parallax because the difference between a pair of L-image and R-image are due to the binocular parallax. By judging that the rendering requests A and B request image copying to the left and right image planes 9 and 10, respectively, and that the respective rendering positions differ only in X coordinates, it is predicated that the BD-J application is in the process of rendering a pair of images of the same object, one as seen from the right and the other as seen from the left. Thus, it is necessary to ensure that the plane composition unit 20 processes the pair of copied images to output in the same frame.

Therefore, if the conditions in Step S809 are met, the L-R rendering arbiter 30 performs Step S810 to issue to the rendering engine 22 a left-and-right simultaneous rendering request C (herein after "L-R simultaneous rendering request C") instead of the rendering requests A and B. The "L-R simultaneous rendering request C is generated by merging the rendering requests A and B.

FIG. 30A shows the L-R simultaneous rendering request C obtained by the merging. More specifically, the L-R simultaneous rendering request 903 (rendering request C) shown in FIG. 30A is obtained by merging the rendering request 901 (the rendering request A) shown in FIG. 30B and the rendering request 902 (the rendering request B) shown in FIG. 30C into one.

Upon receipt of the L-R simultaneous rendering request C, the rendering engine 22 performs copying of the left bitmap image to the left image plane 9 and copying of the right bitmap images to the right image plane 10 alternately line by line, starting from the top line, rather than by performing image copying to the left image plane 9 and the image copying to the right image plane 10 one after another. In this manner, the left and right image planes are rendered substantially simultaneously in parallel. As a consequence, regardless of whether the plane composition unit 20 executes the composition processing in any timing corresponding to Steps S704, S705L and S705R shown in FIG. 28, inconsistency between a pair of an L-image and an R-image to be output is kept to a minimum.

Note that in this example, the rendering engine 22 alternately renders left and right images line by line. Yet, the rendering of L-image and R-image may be altered in the units other than lines. In addition, the playback device may be provided with two rendering endings to render of L-image and R-image completely in parallel.

On the other hand, if any of the conditions is not satisfied in Steps S805 and S809, it is judged that the rendering requests A and B are not for rendering of a pair of images of the same object as seen from left and right. Accordingly, the respective requests are processed in a conventional manner, so that occurrence of display tearing is possible.

In view of this, in Step S806 that follows, a warning message may be output to inform the developer of the BD-J application or the user of the playback device 200 that tearing may occur during execution of the BD-J application. The warning may be issued by, for example, throwing an Exception message according to the BD-Java specifications. Alternatively, the warning message may be presented on the display device 400 to inform the developer of the BD-J application or the user of the playback device 200.

Next, in Steps S807 and S808, the rendering requests A and B having been withheld are issued to the rendering engine 22, so that the rendering processes are preformed in the same manner as in the embodiments described above.

Through the above steps, if a pair of images are copied through the processes satisfying the conditions in Steps S802, S805 and S809, it is ensured that the plane composition unit 20 processes a pair of images to output the images in the same frame. Accordingly, although the occurrence of flickering (tearing) is possible, the occurrence of flickering due to inconsistency between the L-image and R-image is suppressed.

Note that the above judgment may be additionally applied to other processes. That is, in the present embodiment, the judgments in Steps S802 and S805 are made regarding the process of "image copying", where as rendering requests for other processes are processed in a conventional manner according to which the occurrence of tearing is possible. By additionally making the above judgments on the other processes such as "rectangle fill", the occurrence of tearing are prevented regarding wider variety of rendering processes.

According to the present embodiment, in addition, the L-R simultaneous rendering request is immediately issued in Step S810. Alternatively, however, the L-R simultaneous rendering request may be issued after receipt of a composition completion notification in Step S706 shown in FIG. 28. With this configuration, provided that the hardware is capable of completing the image copying at a sufficiently high speed, the image copying is completed before Steps S705 L and S705R shown in FIG. 28 are performed for the next frame. Consequently, the displayed images are updated at improved image quality without occurrence of tearing.

According to the present embodiment, in addition, L-image and R-image are alternately processed line by line, starting from the top line. As a result, the L- and R-images are generated in a pseudo-parallel manner. Yet the units of processing is not limited to one line.

For example, two separate output systems may be employed. More specifically, depending on the hardware configuration of the playback device, the demultiplexer 3 may implement another output method. In the exemplary structure shown in FIG. 25, the playback device has one set of a video decoder, an image decoder, and a plane composition unit. With the hardware configuration provided with two sets of video decoders, and image decoders, and plane composition units, it is possible to process video images for left eye and video images for right eye in separate systems. More specifically, the video decoder for left eye stores a video picture into the left video plane 5, where as the image decoder for left eye stores image data into the left image plane 9. Then, the plane composition unit for left eye composites the pictures on the left video plane 5 with the left image plane 9. In a similar manner, the system for right eye separately conducts the processing images for right eye. With this configuration, a pair of an L-image and an R-image are separately generated completely in parallel.

According to the present embodiment, in addition, the plane composition unit 20 is configured to alternately output an L-image and an R-image on a line-by-line basis. However, the video output is not limited to this scheme. For example, with the hardware configuration having the two separate systems for left image output and right image output, the video output may also employ two systems, one for left eye and the other for right eye. In addition, by employing a buffer for temporarily storing video output of the plane composition unit 20, the playback device is enabled to alternate output of images for the left eye (L-images) and images for the right eye (R-images), in a similar manner to the first embodiment.

(Sixth Embodiment)

A sixth embodiment of the present invention relates to an improvement on the video output achieved by issuing display update requests in addition to rendering requests.

FIG. 30D shows a display update request 904. The display update request 904 is defined as the java.awt.Toolkit#sync method according to the BD-Java standards. The display update processing is to allow a BD-J application to ensure that the image currently stored on an image plane is reliably transmitted to the display device. This processing is especially effective with the double-buffer configuration for image planes, i.e., with the configuration in which a rendering buffer and a display buffer are separately implemented to suppress the occurrence of tearing.

Figure 31:
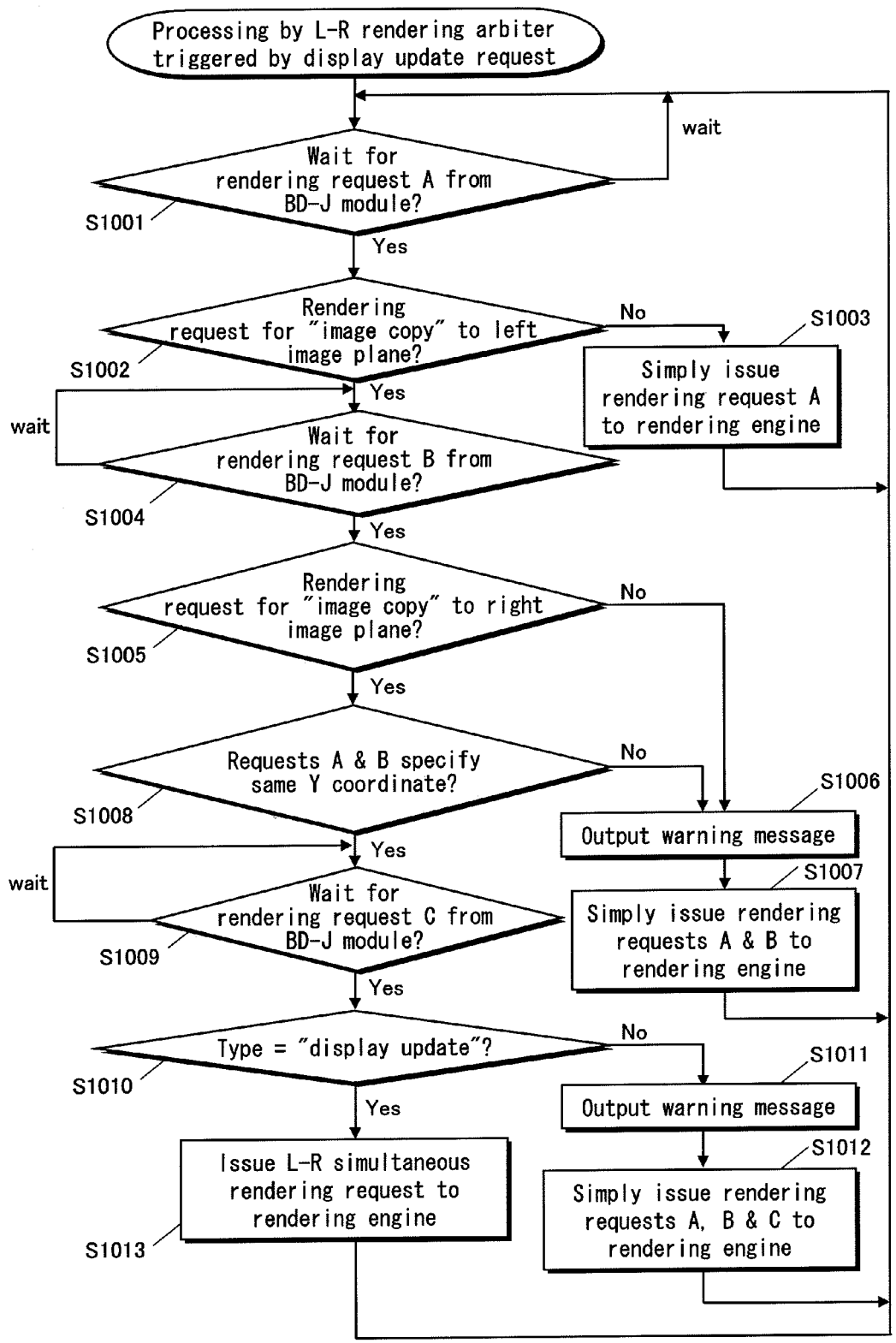
FIG. 31 is a flowchart showing the procedure performed by the L-R rendering arbiter 30 triggered by a display update request.

FIG. 31 is a flowchart showing the procedure performed by the L-R rendering arbiter 30 triggered by a display update request.

In the flowchart, Steps S1001, S1002, S1003, S1004, S1005, S1006, S1007, and S1008 are the same as Steps S801, S802, 5803, S804, S805, S806, S807, S808, and S809, respectively.

If the conditions in Steps S1002, S1005, and S1008 are each satisfied, it means that the rendering requests A and B are for rendering a pair of images of the same object as seen from left and right. In that case, the rendering requests A and B are not processed at this time. That is, the L-R rendering arbiter 30 withholds the rendering requests A and B and moves onto Step S1009 to wait for the BD-J module 15 to issue a next rendering request C.

In Step S1010 that follows, the L-R rendering arbiter 30 judges whether or not the type of the rendering request C indicates "display update". If the rendering request C is for "display update", the L-R rendering arbiter 30 performs Step S1013 to issue an L-R simultaneous rendering request to the rendering engine 22, instead of issuing the rendering requests A and B.

If the rendering request C is not for "display update", the L-R rendering arbiter 30 performs Step S1011 to issue a warning message and moves onto Step S1012 to issue the suspended rendering requests A, B and C in the stated order to the rendering engine 22. Thereafter, the rendering process are performed in the similar manner as the embodiments described above.

This concludes the description of the procedure performed by the L-R rendering arbiter 30 according to the present embodiment.

With a playback device employing image planes each of which is in a single buffer configuration, issuance of display update requests may or may not be effective. It is because an image stored on each image plane is output with the timing required by operation of the plane composition unit 20, regardless of whether a display update request is issued or not. Yet, with a playback device employing image plane each of which is in a double buffering configuration, issuance of display update requests are significantly effective. According to the present embodiment, a warning message will be output unless the BD-J application calls for the "image copy" to the left image plane 9, the "image copy" to the right image plane 10, and "display update" in this order. With this structure, it is possible to encourage developers of the BD-J application to develop highly-compatible BD-J applications which is executed by a variety of playback device.

(Seventh Embodiment)

According to the fourth, fifth and sixth embodiments described above, the left image plane 9 and the right image plane 10 are separate image planes. Thus, the BD-J application issues rendering requests on the precondition that images are rendered on different planes. According to a seventh embodiment of the present invention, the BD-J application treats the left image plane 9 and the right image plane 10 as a single plane.

Figure 32A:
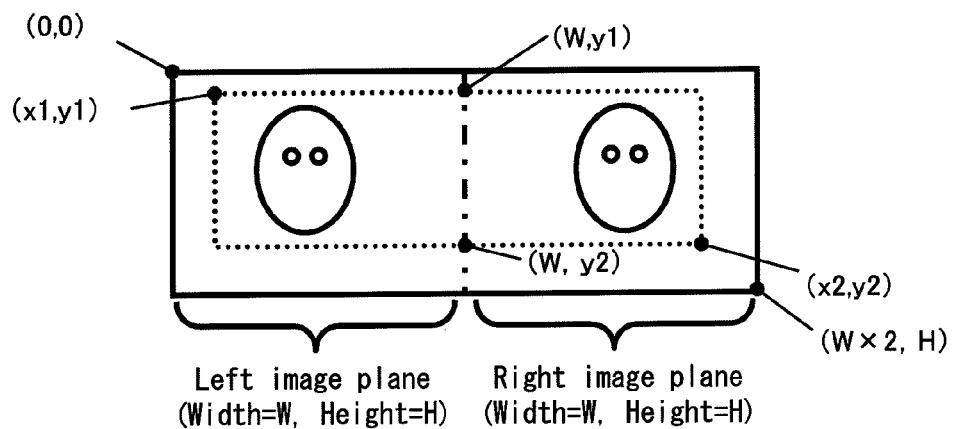
FIGS. 32A and 32B show examples a connected image plane composed of a left image plane 9 and a right image plane 10.

FIG. 32A shows a connected image plane composed of the left image plane 9 and the right image plane 10 that are disposed next to each other (herein after referred to as a side-by-side configuration). With this configuration, the connected image plane is W×2 pixels wide by H pixels high, suppose that the resolution of each of the left and right plane is W pixels wide by H pixels high.

Such a connected image plane of the side-by-side configuration is realized by configuring the left and right image planes as a single piece of memory that is physically contiguous.

Alternatively, it is possible to configure the left image plane 9 and the right image plane 10 as separate pieces of memory and employ such a mechanism that the BD-J application handles the separate planes virtually as a single plane.

Figure 32B:
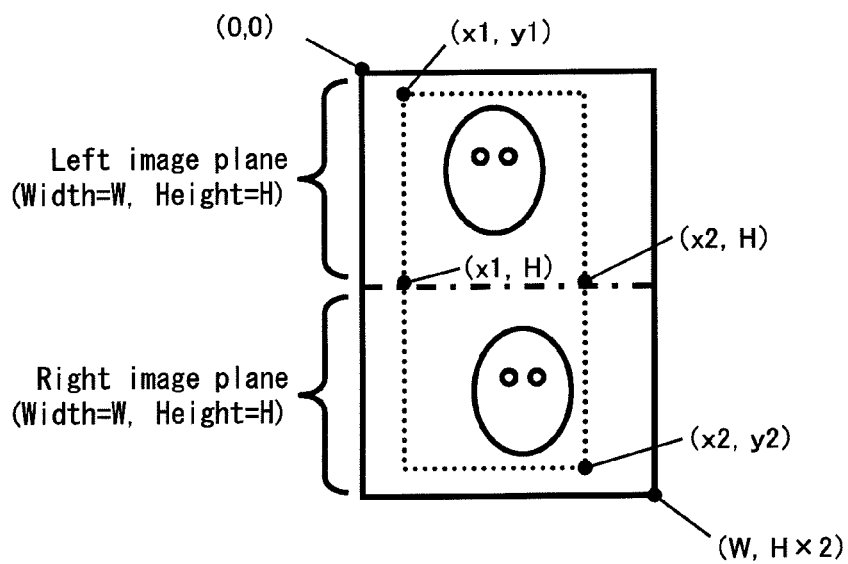

FIG. 32B shows a connected image plane composed of the left image plane 9 and the right image plane 10 disposed one above the other (herein after referred to as a top-and-bottom configuration). With this configuration, the connected image plane is W pixels wide by H×2 pixels high, suppose that the resolution of each of the left and right plane is W pixels wide by H pixels high.

Also in this top-and-bottom configuration, it is preferred that the left and right image planes are configured as a single piece of memory that is physically contiguous. Alternatively, it is possible to configure the left image plane 9 and the right image plane 10 as separate pieces of memory and employ such a mechanism that the BD-J application handles the separate planes virtually as a single plane.

With the image plane of the top-and-bottom configuration, the BD-J application may copy an image into a rectangle area that vertically extends from the left to right image planes as shown in FIG. 32B.

Figure 33:
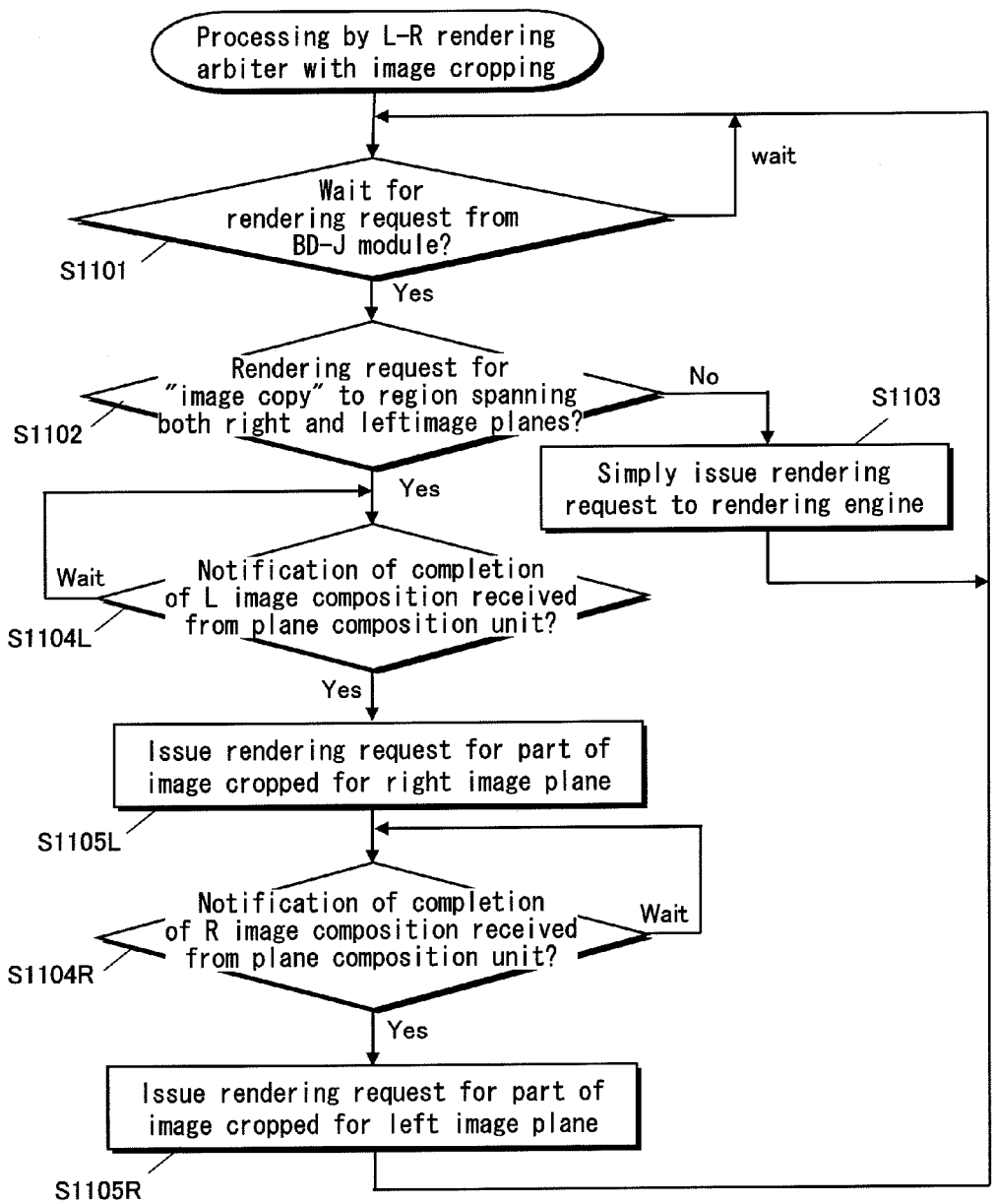
FIG. 33 a flowchart showing the procedure involving a cropping process by the L-R rendering arbiter 30.

Note that the playback device 200 according to the present embodiment displays stereoscopic video images onto the display device 400 through the procedure shown in FIG. 33.

FIG. 33 a flowchart showing the procedure performed by the L-R rendering arbiter 30.

First, in Step S1101, the L-R rendering arbiter 30 waits for the BD-J module 15 to issue a rendering request in response to a rendering instruction given by the BD-J application. Upon issuance of a rendering request, the L-R rendering arbiter 30 moves onto Step S1102 to judge whether the rendering request received in Step S1101 has the type information indicating "image copying" and the rendering position covers at least part of both the left and right image planes.

If the conditions in Step S1102 are not satisfied, Step S1103 is performed in which the L-R rendering arbiter 30 simply issues the rendering request to the rendering engine. As a result, the rendering process is performed in the similar manner to the embodiments described above.

If the conditions in Step S1102 are both satisfied, then Step S1104L is performed.

When a rendering request specifying a rendering position that covers both the left and right image planes, it is expected the BD-J application is requesting to render a pair of left and right images of the same object as seen from the right and as seen from the left. In view of this, in this embodiment, Steps S1104L and onwards are performed through which the L-R rendering arbiter 30 adjusts the timing of processes by the rendering engine 22 to avoid displaying inconsistent L-image and R-image.

First, in Step S1104L, the L-R rendering arbiter 30 waits for a notification indicating that the composition of L-image image is completed (issued in Step S406L shown in FIG. 26) is received from the plane composition unit 20.

Next, in Step S1105L, the L-R rendering arbiter 30 issues to the rendering engine 22 a rendering request for image copying specifying a rendering position that crops only part corresponding to the left image plane 9. For example, the rendering request to be issued here is for image copying specifying a region of the rectangle area 1301 shown in FIG. 32A and having the top left pixel at (x1, y1) and the bottom right pixel at (W, y2).

Similarly, in Step S1104R, the L-R rendering arbiter 30 waits for a notification indicating that the composition of R-image image is completed (issued in Step S406R shown in FIG. 26) is received from the plane composition unit 20. Upon receipt of a composition completion notification, the L-R rendering arbiter 30 moves onto Step S1105R to issue to the rendering engine 22 a rendering request for image copying specifying a rendering position that crops only part corresponding to of the right image plane 10. For example, the rendering request to be used here is for image copying specifying a region of the rectangle area 1301 shown in FIG. 32A and having the top left pixel at (W, y1) and the bottom right pixel at (x2, y2).

Through these steps, as long as the hardware employed is capable of image copying at a sufficiently high speed, it is ensured that the image copied to the left image plane 9 is used in Step S404L shown in FIG. 26 and thus output in the next frame and that the image copied to the right image plane 10 is used in Step S404R shown in FIG. 26 and thus output in the next frame. That is, the pair of images copied through the two image copying processes are both used by the plane composition unit 20 to be output in the same frame, so that flickering occurring as a result of inconsistency between L-image and R-image is prevented.

In this embodiment, the judgment in Step S1102 is made regarding the process of "image copying" where as rendering requests for other processes are performed in a conventional manner, so that the occurrence of tearing is possible. By additionally making the above judgment on the other processes such as "rectangle fill", so that the occurrence of tearing are prevented regarding wider variety of rendering processes.

(Eighth Embodiment)

In an eighth embodiment of the present invention, a rendering request for rendering to a connected image plane is proceed in two separate processes. More specifically, in one of the two processes, of a rectangle region specified by the rendering request, only part of the rectangle region corresponding to the left image plane 9 is cropped and copied. In the other process, only part of the rectangle region corresponding to the right image plane 10 is cropped and copied. The two image copying processes are performed simultaneously.

FIGS. 34A and 34B show a rendering request and an L-R simultaneous rendering request.

In the figure, a rendering request 1401 requests image copying of "bitmap image 1" into a rectangle region of the connected image plane of a top-and-bottom configuration.

The bitmap image 1 to be rendered has a width of 1000 pixels and a height of 1500 pixels. The rectangle region into which the image is to be rendered is defined by (x1, y1)=(200, 300) and (x2, y2)=(1200, 1800).

The L-R simultaneous rendering request 1402 is an L-R simultaneous rendering request obtained by converting the rendering request 1401. Thus, the L-R simultaneous rendering request 1402 simultaneously requests the part corresponding to the left image plane 9 is cropped and copied and the part corresponding to the right image plane 10 is cropped and copied.

More specifically, in the cropping and copying of the part corresponding to the left image plane 9, a rectangle area of the "bitmap image 1" defined by x1=0, y1=0, x2=1000, y2=780 is to be copied to a rectangle region of the connected image plane defined by (x1, y1)=(200, 300) and (x2, y2)=(1200, 1080).

In the cropping and copying of the part corresponding to the right image plane 10, a rectangle area of the "bitmap image 1" defined by x1=0, y1=780, x2=1000, y2=1500 is to be copied to a rectangle region of the connected image plane defined by (x1, y1)=(200, 0) and (x2, y2)=(1200, 720).

Figure 35:
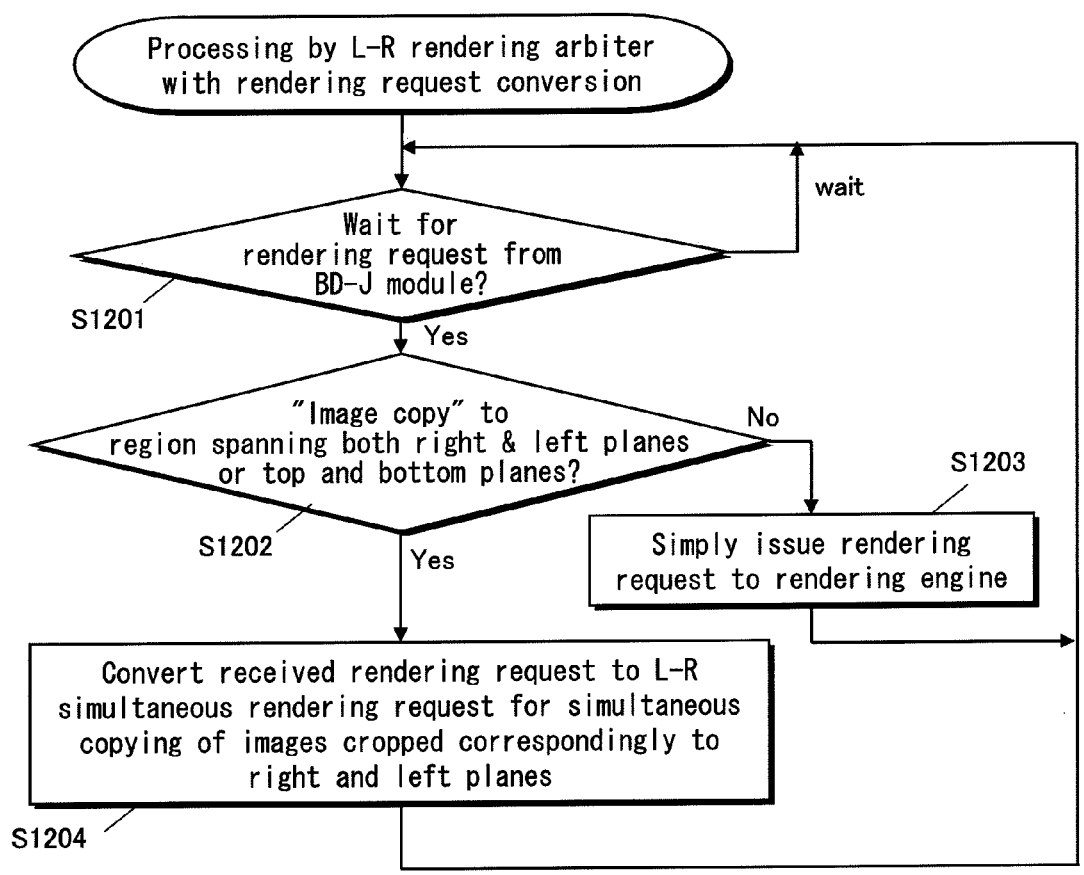
FIG. 35 is a flowchart showing the procedure involving conversion of a rendering request by the L-R rendering arbiter 30.

FIG. 35 is a flowchart showing the procedure for the L-R rendering arbiter 30 according to the present embodiment. First, in Step S1201, the L-R rendering arbiter 30 waits for the BD-J module 15 to issue a rendering request in response to a rendering instruction given from the BD-J application.

Next, in Step S1202, the L-R rendering arbiter 30 judges whether the rendering request received in Step S1201 has the type information indicating "image copying" and specifying a rendering region that spans both the left and right regions or both the top and bottom regions. That is, in the case of the connected image plane of the top-and-bottom configuration, a BD-J application can request image copying to a rectangle area spanning both the top and bottom regions.

In the case of the connected image plane of the side-by-side configuration, a BD-J application can request image copying to a rectangle region spanning both the left and right regions.

If the conditions in Step S1202 are not satisfied, the rendering request is issued to the rendering engine 22 in Step S1203 without any additional operation. As a result, the rendering process is performed in the manner described in the above embodiments.

If the conditions in Step S1202 are satisfied, Step S1204 is performed in which the L-R rendering arbiter 30 converts the received request into an L-R simultaneous rendering request. The L-R simultaneous rendering request requests that part of the specified image corresponding to the left image plane be cropped and copied, simultaneously with cropping and copying of the specified image corresponding to the right image plane 10. The L-R simultaneous rendering request is then issued to rendering engine 22.

In the case where a rendering request specifies a rendering region that spans both the left image plane and the right image plane, it is expected that the BD-J application requests rendering of a stereographic pair of images of the same object one seen from the right and the other from the left. In view of this, Step S1204 is performed in which the rendering request for one image copying process is converted into an L-R simultaneous rendering request for two image copying processes to be simultaneously processed. With the L-R simultaneous rendering request, the order of processes performed by the rendering engine 22 is duly controlled to avoid that inconsistent L-image and R-image are displayed.

In the above description, the rendering engine 22 may perform the image copying to the left image plane 9 and the right image plane 10 one after another in response to the L-R simultaneous rendering request 1402, as described in the above embodiments. Alternatively, the two image copying processes may be performed alternately on a line-by-line basis. By alternately rendering the left and right bitmap images line by line from the top, occurrence of inconsistency between L-image and R-image of the output video is kept to a minimum.

Note, however, that the Y coordinate of the rendering position on the left image plane 9 may not be equal to that of the right image plane 10. For this reason, instead of alternately copying the respective images line by line simply from the top, it is preferable to perform the copying processes in the following order. That is, after copying to the y-th line of the left image plane 9, copying to the y-th line of the right image plane 10 is performed.

Further, in this embodiment, the judgment in Step S1202 is made regarding the process of "image copying", where as rendering requests for other processes are performed in a conventional manner, so that the occurrence of tearing is possible. By additionally judging whether or not to issue an L-R simultaneous rendering request regarding the other processes such as "rectangle fill", the occurrence of tearing are prevented regarding wider variety of rendering processes.

(Supplemental Note)

Up to this point, the best mode know to the applicant at the time the present application has been described. It is naturally appreciated, however, that further improvements or modifications may be made regarding the technological issues shown below. The decision to implement the present invention precisely according to the embodiments or by applying these improvements or modifications is arbitrary; consideration is thus made for the subjectivity of the person implementing the invention.

(Stereoscopic Viewing Methods)

According to the parallax image method used in the first embodiment, the left-eye and right-eye images are displayed alternately in the time axis direction. As a result, for example, when 24 images are displayed per second in a normal two dimensional movie, 48 images, for the combination of the left-eye and right-eye images, should be displayed per second in a three dimensional movie. Accordingly, this method is suitable for display devices that rewrite each screen at relatively high speeds. The stereoscopic viewing using the parallax images is used in the play equipment of the amusement parks, and has been established technologically. Therefore, it may be said that this method is closest to the practical use in the homes. There have been proposed various other technologies such as the two-color separation method, as the methods for realizing stereoscopic viewing using the parallax images. In the embodiments, the sequential segregation method and the polarization glasses method have been used as examples. However, the present invention is not limited to these methods as far as the parallax images are used.

Also, not limited to the lenticular lens, the television 400 may use other devices, such as the liquid crystal element, that have the same function as the lenticular lens. It is further possible to realize the stereoscopic viewing by providing a vertical polarization filter for the left-eye pixels, and providing a horizontal polarization filter for the right-eye pixels, and causing the viewer to view the screen through a pair of polarization glasses that is provided with a vertical polarization filter for the left eye and a horizontal polarization filter for the right eye.

(Program Embodiment)

Application programs shown in the flowcharts in the respective embodiments can be created in the following manner. First, using a programming language, a software developer writes source program to implement each flowchart and the functional elements shown in the flowchart. In accordance with the syntax of the programming language, the software developer writes source program to embody the flowchart and functional elements using class structures, variables, array variables, and calls to external functions.

The written source program is provided to a compiler as a file. The compiler translates this source program into one or more object programs.

Translation by the compiler involves a process of syntax analysis, optimization, resource allocation, and code generation. During syntax analysis, the compiler performs lexical analysis, syntax analysis, and semantic analysis on the source program to convert the source program into intermediate program. During optimization, the compiler divides the intermediate program into basic blocks, performs control flow analysis, and data flow analysis. During resource allocation, in order to adapt to the instruction set of the target processor, the compiler allocates the variables in the intermediate program to the register or the memory of the target processor. During code generation, the compiler converts each intermediate instruction in the intermediate program into program code to obtain object programs.

The generated object programs consist of one or more program codes to cause a computer to execute each step in the flowcharts shown in each embodiment and each procedure in the functional elements. There are many varieties of program code, such as the processor's native code, JAVA bytecode, etc. There are many ways to implement each step by a program code. When each step can be implemented using an external function, the call to the external function is the program code. A program code implementing one step may also belong to different object programs. In a RISC processor, in which instruction types are restricted, each step in the flowcharts can be implemented by combining arithmetic calculation instructions, logical calculation instructions, branch instructions, etc.

After object programs are generated, the programmer uses a linker on these object programs. The linker allocates the object programs and associated library programs to memory and combines them to generate a load module. A load module generated in this way is assumed to be read by a computer, and the load module causes a computer to execute the procedures shown in each flowchart and the procedures for the functional elements. The program is recorded on a computer readable recording medium and provided to users.

(Variation on Recording Medium)

The recording medium in the embodiments includes package media in general, such as an optical disc, semiconductor memory card, etc. An optical disc with necessary data pre-recorded (e.g. an existing readable optical disc, such as a BD-ROM or DVD-ROM) is used as an example of a recording medium in the embodiments. The recording medium need not be limited, however, in this way. For example, 3D contents including the data necessary for implementing the present invention could be broadcast or could be transmitted over a network and then recorded on a writable optical disc (e.g. an existing writeable optical disc, such as a BD-RE or DVD-RAM) using a terminal device having a function to write on an optical disc. This function could be embedded in the playback device, or could be an device separate from the playback device. The optical disc recorded in this way could then be used by a playback device according to the present invention, thereby to practice the present invention.

(Structure of Video Decoders)

Although in the embodiments, it is described that the left eye video decoder 5a and the left eye video decoder 5b are separately employed, these may be incorporated as one.

(Embodiments as Semiconductor Memory Card Recording Device and Playback Device)

The following describes an embodiment of a semiconductor memory that recodes the data structure described in the above embodiments, and of a playback device that plays back such semiconductor memory.

First, the following describes a mechanism for protecting a copyright of data recorded on a BD-ROM, as the precondition of the following description.

From a standpoint, for example, of improving the confidentiality of data and copyright protection, there are cases in which part of the data recorded on the BD-ROM are encoded as necessary.

For example, the encoded data of the data recorded on the BD-ROM may be, for example, data corresponding to a video stream, data corresponding to an audio stream, or data corresponding to a stream that includes both video and audio.

The following describes deciphering of encoded data, which is part of the data recorded on the BD-ROM.

The semiconductor memory card playback device stores in advance data corresponding to a key necessary for deciphering encoded data on the BD-ROM (for example, a device key).

Meanwhile, the BD-ROM stores data corresponding to the key necessary for deciphering encoded data (for example, an MKB (media key block) corresponding to the device key mentioned above) and data in which the key per se, for deciphering the encoded data, is encoded (for example an encoded title key corresponding to the device key and the MKB). Here, the device key, the MKB, and the encoded title key correspond to each other, and furthermore correspond to an identifier (for example, a volume ID) written in an area that cannot be normally copied on the BD-ROM (an area called BCA). If this combination is not correct, the code cannot be deciphered. Only if the combination is correct, the key necessary for deciphering the code (for example, a decoded title key obtained by decoding the encoded title key based on the device key, the MKB and volume key, can be derived, and with use of the key necessary for the encoding, the encoded data can be deciphered.

When the inserted BD-ROM is played back in the playback device, encoded data cannot be played back unless the BD-ROM includes a device key that is paired with a title key or MKB (or corresponds to a title key or MKB). The reason is that the key necessary for deciphering the encoded data (the title key) per se is recorded in encrypted form on the BD-ROM (as an encoded title key), and if the composition of the MKB and the device key is not correct, the key necessary for deciphering the code cannot be derived.

On the other hand, the playback device is configured so that, if the combination of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

This completes the description of the mechanism for protecting the copyright of data recorded on the BD-ROM. This mechanism is not necessarily limited to the BD-ROM, and may be applicable to, for example, a readable/writable semiconductor memory (for example, a semiconductor memory card having a nonvolatile property such as an SD card).

The following describes the playback procedure of a semiconductor memory card playback device. In contrast to an optical disk that is configured so that data is read via, for example, an optical disk drive, when using a semiconductor memory card, data may be read via an I/F for reading the data on the semiconductor memory card.

More specifically, when the semiconductor memory card is inserted into a slot (not depicted) in the playback device, the playback device and the semiconductor memory card are electrically connected via the semiconductor memory card I/F. The data recorded on the semiconductor memory card may be read via the semiconductor memory card I/F.

By way of e.g., electronic distribution, data related to an original content stored on the recording medium 100 shown in FIGS. 1 and 24 may be distributed. Examples of distribution data include the entire data of an original content stored on the recording medium 100 shown in FIGS. 1 and 24 (such as video streams, audio streams, subtitle data, background images, GUIs, applications, and application management tables), partial data of the original content (such as update of data necessary for playback), and an additional content. The following describes operation for recoding such distribution data onto a semiconductor memory.

The playback device according to the embodiments described above may be configured to perform the above-mentioned operation of recoding distribution data to a semiconductor memory. Alternatively, the operation for recoding distribution data may be performed by a dedicated terminal device provided separately from the playback device according to the above embodiments. The following describes an example in which the playback device records distribution data and an SD memory card is used as the semiconductor memory for recording the distribution data.

Suppose that the playback device is to record distribution data into an SD memory card inserted in the slot of the playback device. First, the playback device issues a request for transmission of distribution data, to a distribution server (not illustrated) that stores the distribution data. In so doing, the playback device reads identification information uniquely identifying the inserted SD memory card (for example, identification information uniquely assigned to each SD memory card, more specifically, the serial number or the like of the SD memory card), from the SD memory card, and transmits the identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in encrypted form such that the necessary data can be decrypted by using a predetermined key (for example, a title key).

For example, the distribution server holds a private key so that it can dynamically generate different pieces of public key information in correspondence with the respective identification numbers uniquely assigned to each semiconductor memory card.

Also, the distribution server is structured to be able to encrypt the key (title key) per se that is necessary for decrypting the encrypted data (that is to say, the distribution server is structured to be able to generate an encrypted title key).

The generated public key information includes, for example, information corresponding to the above-described MKB, volume ID, and encrypted title key. With a correct combination of (i) the identification number of the semiconductor memory card, (ii) the public key contained in the public key information which will be explained later, and (iii) the device key that is recorded in advance in the playback device, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information includes, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might execute unauthorized playback. The information, for example, is used to uniquely identify the devices, parts of the devices, and functions (programs) that might execute unauthorized playback, and is composed of, for example, the device key and the identification number of the playback device that are recorded in advance in the playback device, and the identification number of the decoder provided in the playback device.

The following describes playback of the encrypted data among the distribution data recorded in the recording area of the semiconductor memory card.

First, it is checked whether or not the decryption key per se is permitted to be used, before the encrypted data is decrypted by using the decryption key.

More specifically, the following checks are conducted:

(1) a check on whether the identification information of the semiconductor memory card contained in the public key information matches the identification number of the semiconductor memory card preliminarily stored in the semiconductor memory card;

(2) a check on whether the hash value of the public key information calculated in the playback device matches the hash value included in the signature information; and (3) a check, based on the information included in the device list, on whether the playback device to perform the playback is authentic (for example, the device key shown in the device list included in the public key information matches the device key preliminarily stored in the playback device).

These checks may be performed in any order.

After the above described checks (1) through (3), the playback device performs a control not to decrypt the encrypted data when any of the following conditions is satisfied:

(i) the identification information of the semiconductor memory card contained in the public key information does not match the identification number of the semiconductor memory card preliminarily stored in the semiconductor memory card;

(ii) the hash value of the public key information calculated in the playback device does not match the hash value included in the signature information; and (iii) the playback device to perform the playback is not authentic.

On the other hand, suppose that all of the following conditions (i), (ii) and (iii) are satisfied: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied. In that case, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key per se) when the playback device includes anything shown in the list. Therefore, even if the combination of the identification number of the semiconductor memory, the public key per se contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, although unique ( )) different identification numbers are assigned to semiconductor memory cards, if the identification numbers are tampered with to be the same, the above-described judgment in (1) does not make sense, and as many semiconductor memory cards as tampering may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (herein after, the recording area is referred to as a second recording area) is provided separately from a recording area for recording regular data (herein after, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read out from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information, and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

Industrial Applicability

The present invention is applicable to a technique for a playback device for playback of stereoscopic video images in order to suppress tearing occurring at display updates. The technique is suitably applicable to a stereoscopic video playback device that updates screen display asynchronously with video output.

What is claimed is:
1. A playback method, comprising:
   storing first data into a first image plane memory during a first period;
   outputting the first data from the first image plane memory during the first period, no data being outputted from a second image plane memory during the first period;
   copying the first data from the first image plane memory to the second image plane memory during a second period, the second period being a period immediately after the first period;

outputting the first data from the first image plane memory and the first data from the second image plane memory during the second period;

storing second data into the first image plane memory and third data into the second image plane memory during a third period, the third period being a period immediately after the second period; and outputting the second data from the first image plane memory and the third data from the second image plane memory during the third period.

2. The playback method of claim 1, further comprising:

receiving an instruction to output data from both the first image plane memory and the second image plane memory during the first period.

3. The playback method of claim 2, wherein no data except the first data is outputted from the first image plane memory during the first period, wherein no data except the first data is outputted from the first image plane memory during the second period, wherein no data except the first data is outputted from the second image plane memory during the second period, wherein no data except the second data is outputted from the first image plane memory during the third period, and wherein no data except the third data is outputted from the second image plane memory during the third period.

* * * * *